(12) United States Patent
Kobayashi

(10) Patent No.: US 10,554,348 B2
(45) Date of Patent: Feb. 4, 2020

(54) INFORMATION PROCESSING SYSTEM, INFORMATION PROCESSING METHOD, AND INFORMATION PROCESSING DEVICE

(71) Applicant: NEC Corporation, Tokyo (JP)

(72) Inventor: Yoshikazu Kobayashi, Tokyo (JP)

(73) Assignee: NEC Corporation, Tokyo (JP)

(*) Notice: Subject to any disclaimer, the term of this patent is extended or adjusted under 35 U.S.C. 154(b) by 316 days.

(21) Appl. No.: 15/527,598

(22) PCT Filed: Nov. 18, 2015

(86) PCT No.: PCT/JP2015/082360
§ 371 (c)(1),
(2) Date: May 17, 2017

(87) PCT Pub. No.: WO2016/080427
PCT Pub. Date: May 26, 2016

(65) Prior Publication Data
US 2017/0366309 A1 Dec. 21, 2017

(30) Foreign Application Priority Data
Nov. 19, 2014 (JP) ................ 2014-235109

(51) Int. Cl.
*H04L 1/24* (2006.01)
*G06F 5/14* (2006.01)
(Continued)

(52) U.S. Cl.
CPC .............. *H04L 1/24* (2013.01); *G06F 5/14* (2013.01); *G06F 13/4282* (2013.01); *H04L 1/205* (2013.01); *G06F 2205/126* (2013.01)

(58) Field of Classification Search
CPC ... H04L 1/24; H04L 1/205; G06F 5/14; G06F 13/385; G06F 13/4282; G06F 2205/126
See application file for complete search history.

(56) References Cited

U.S. PATENT DOCUMENTS

2009/0168923 A1* 7/2009 Imamura ............. H04L 25/0204
375/316
2013/0007289 A1 1/2013 Seo et al.
(Continued)

FOREIGN PATENT DOCUMENTS

JP 04-241547 8/1992
JP 2001-308917 11/2001
(Continued)

OTHER PUBLICATIONS

JP2009-031882A machine translation into English. 12 pages. (Year: 2009).*

(Continued)

*Primary Examiner* — Kyle Vallecillo
(74) *Attorney, Agent, or Firm* — Finnegan, Henderson, Farabow, Garrett & Dunner, L.L.P.

(57) ABSTRACT

This information processing system inputs/outputs data normally, even when a serial communication bus is extended by network communication. The information processing system is provided with: a device; a device control unit for controlling the device; a device interface unit which interfaces with the device control unit; an information processing device provided with an application interface unit which interfaces with an application; a channel establishment unit which connects, via a communication unit, the application interface unit and the device interface unit, and establishes a control channel and a data channel between the application and the device; and an error suppression unit which suppresses the occurrence of error in data transfer over the channel established by the channel establishment unit.

10 Claims, 39 Drawing Sheets

(51) Int. Cl.
*G06F 13/42* (2006.01)
*H04L 1/20* (2006.01)

(56) References Cited

U.S. PATENT DOCUMENTS

2014/0307597 A1* 10/2014 Kim .................. H04L 5/0055
370/280
2015/0180964 A1 6/2015 Sasaki

FOREIGN PATENT DOCUMENTS

| JP | 2009-031882 | 2/2009 |
| JP | 2013-16165 | 1/2013 |
| WO | WO 2014/045417 | 3/2014 |

OTHER PUBLICATIONS

Notification of First Office Action dated Mar. 6, 2018, by the Japanese Patent Office in counterpart Japanese Application No. 2016-560257.
Hewlett-Packard Company: "Universal Serial Bus 3.1 Specification; USB_3_rl.0", IEEE Draft; USB_3_1_R1.0, IEEE-SA, Piscataway, NJ USA, vol. 1149.10, No. r1.0, Jul. 31, 2013, pp. 1-631, XP068066249.
Supplementary European Search Report dated Jun. 22, 2018 in counterpart European Patent Application No. EP 15 86 0997.
International Search Report and Written Opinion dated Jan. 19, 2016, in corresponding PCT International Application.

* cited by examiner

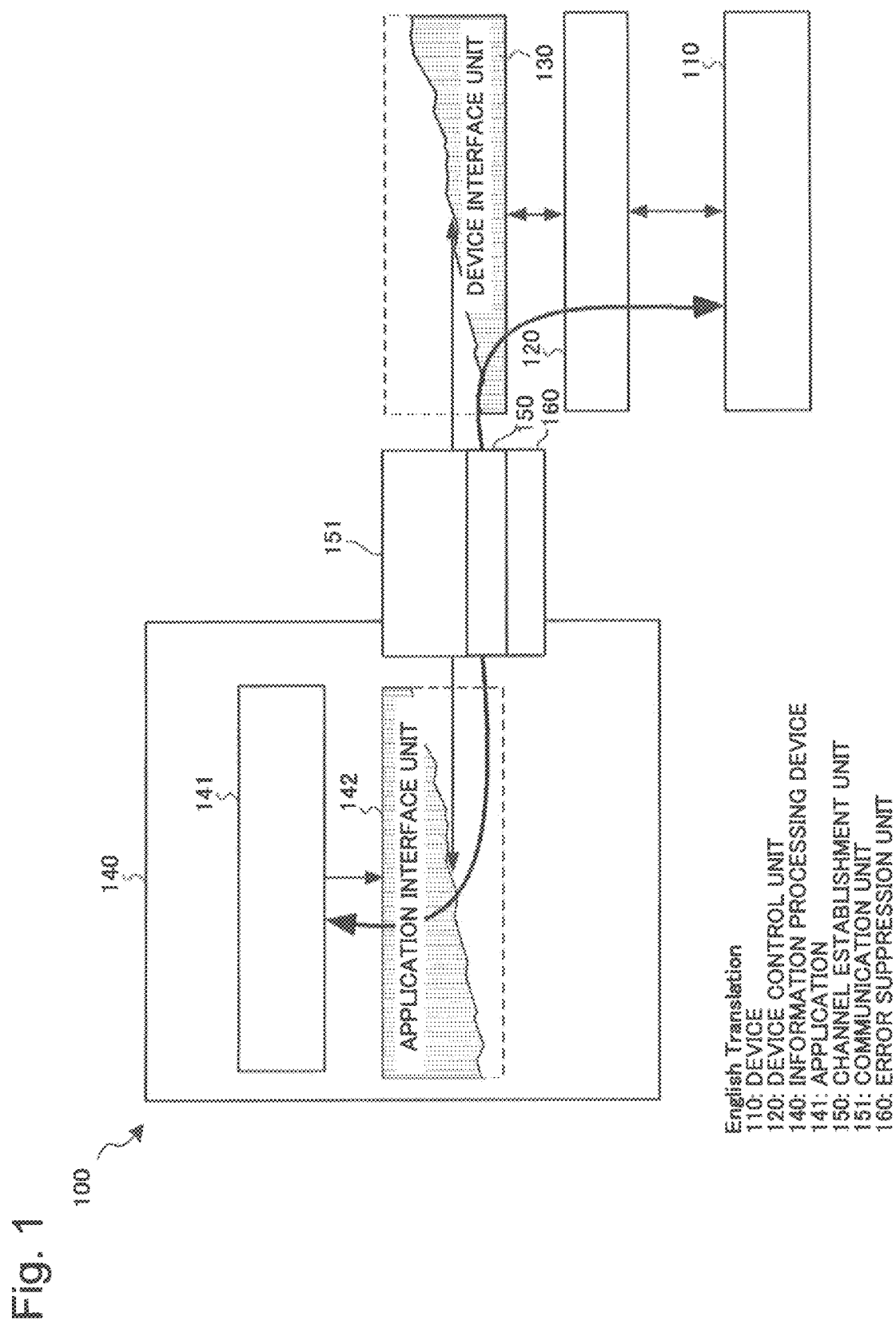

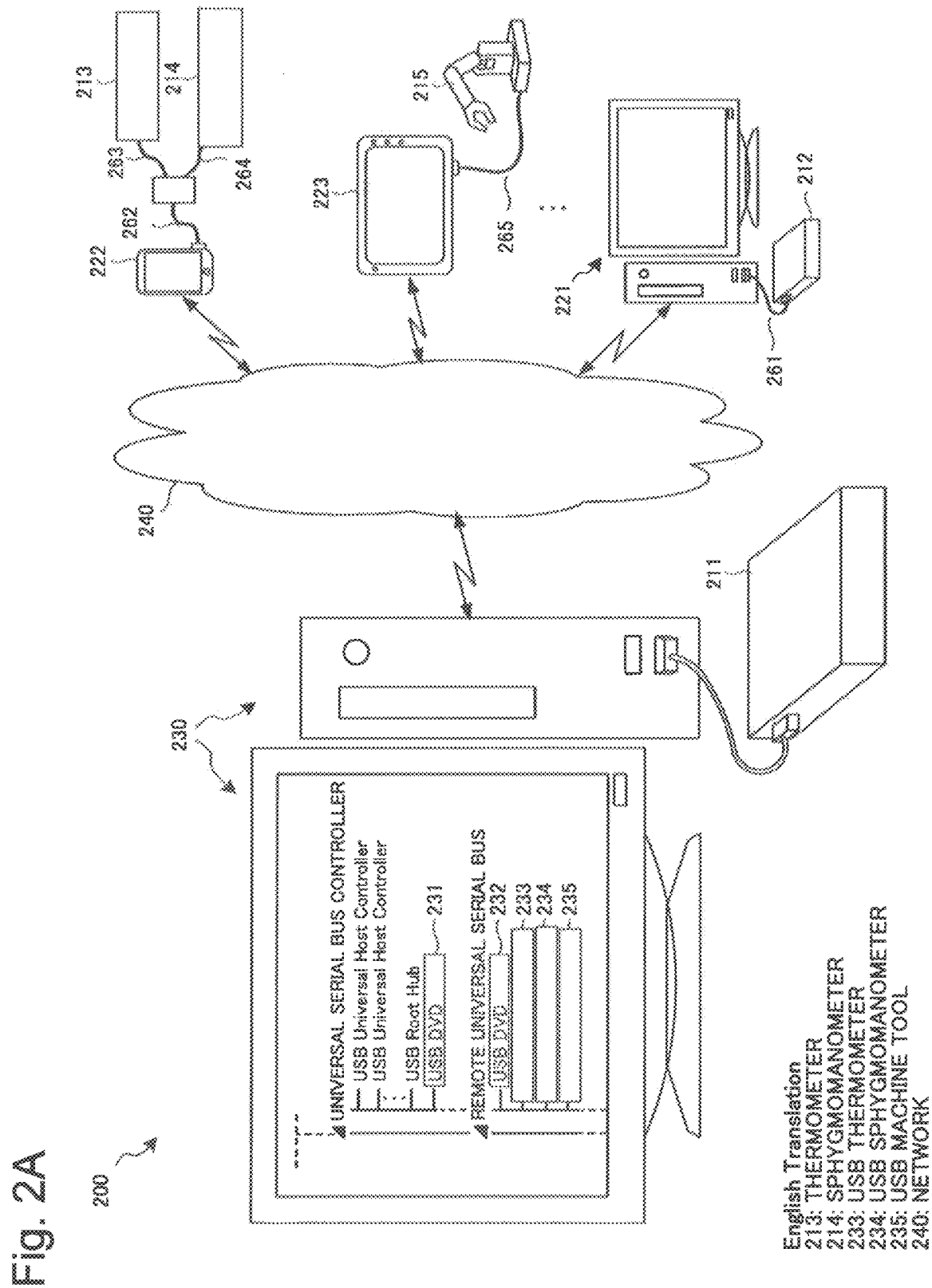

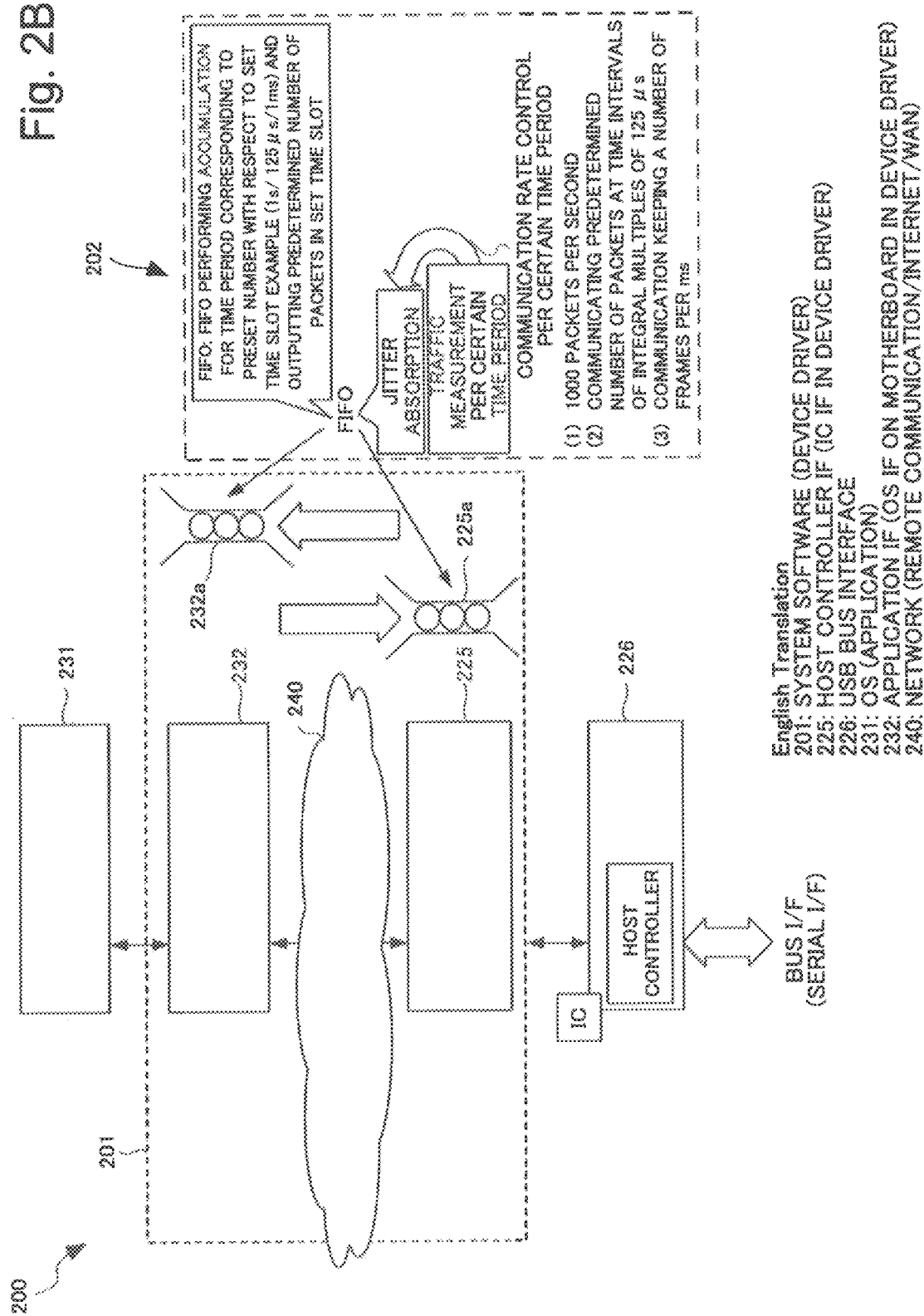

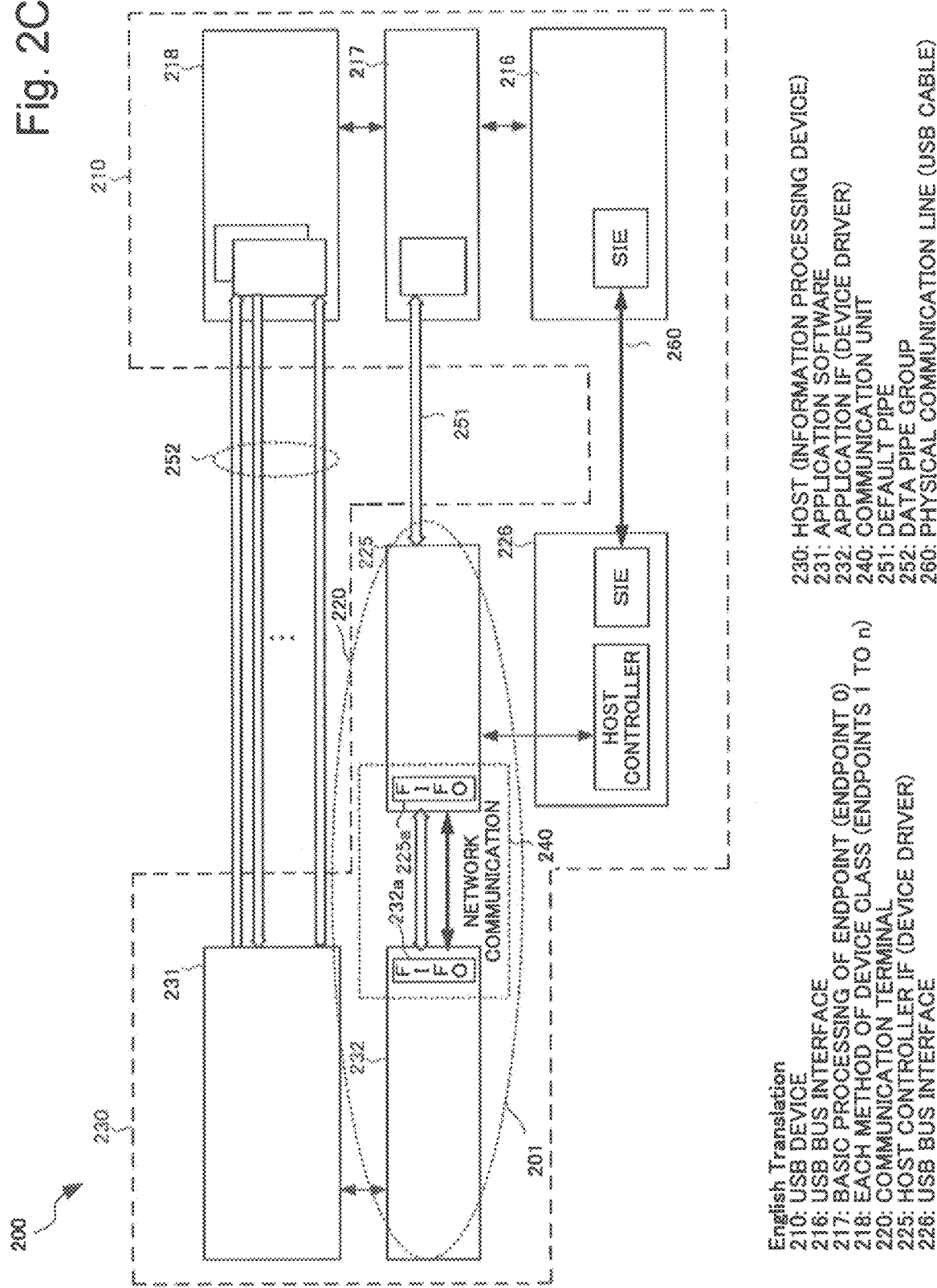

Fig. 2C

English Translation
210: USB DEVICE
216: USB BUS INTERFACE
217: BASIC PROCESSING OF ENDPOINT (ENDPOINT 0)
218: EACH METHOD OF DEVICE CLASS (ENDPOINTS 1 TO n)
220: COMMUNICATION TERMINAL
225: HOST CONTROLLER IF (DEVICE DRIVER)
226: USB BUS INTERFACE
230: HOST (INFORMATION PROCESSING DEVICE)
231: APPLICATION SOFTWARE
232: APPLICATION IF (DEVICE DRIVER)
240: COMMUNICATION UNIT
251: DEFAULT PIPE
252: DATA PIPE GROUP
260: PHYSICAL COMMUNICATION LINE (USB CABLE)

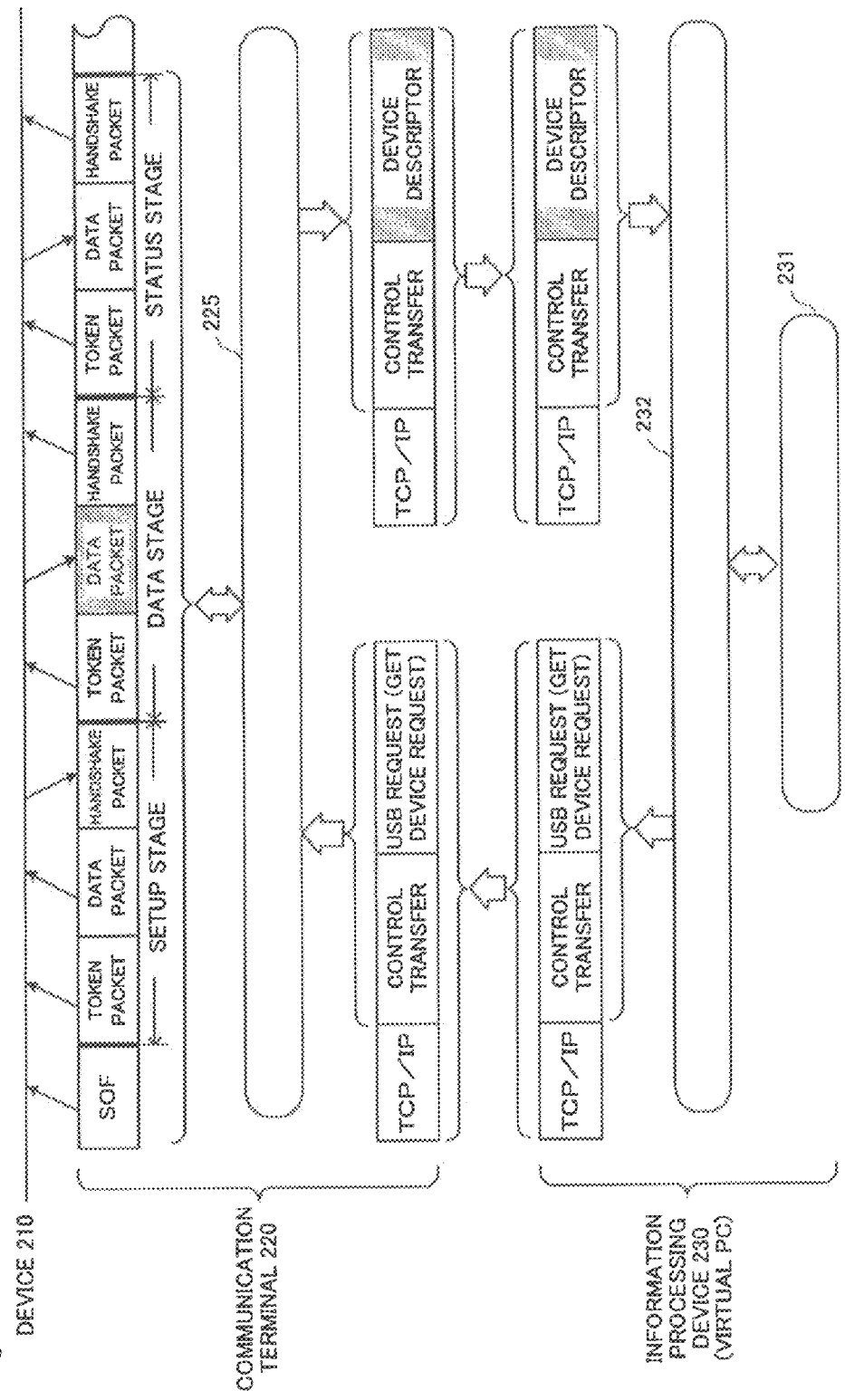

English Translation
325: IC IF IN DEVICE DRIVER
226: USB BUS INTERFACE
231: OS (APPLICATION)
240: NETWORK (REMOTE COMMUNICATION/INTERNET/WAN)
302: SYSTEM SOFTWARE (DEVICE DRIVER)
332: OS IF ON MOTHERBOARD IN DEVICE DRIVER

Fig. 3C

| ITEM | CONTROL TRANSFER 311 | BULK TRANSFER 312 | INTERRUPT TRANSFER 313 | ISOCHRONOUS TRANSFER 314 |
|---|---|---|---|---|
| FEATURE | HALF-DUPLEX COMMUNICATION FOR LIGHT DATA TRAFFIC | SIMULTANEOUS, HIGH-RELIABILITY TRANSFER OF LARGE CAPACITY DATA | PERIODIC TRANSFER OF SMALL-CAPACITY DATA | TRANSFER GUARANTEEING DATA TRAFFIC PER CERTAIN TIME PERIOD |
| PURPOSE | FOR SETUP, AND TRANSFER OF SETTING PARAMETER | TRANSFER OF LARGE-CAPACITY, HIGH-SPEED DATA SUCH AS STORAGE DEVICE AND SCANNER | DATA TRANSFER FOR MEASUREMENT AND HUMAN-MACHINE EQUIPMENT | REAL-TIME TRANSFER SUCH AS VOICE |
| TRANSFER RATE | 1.5Mbs/12Mbs | 12Mbs | 1.5Mbs/12Mbs | 12Mbs |
| TRANSFER CYCLE | UNDEFINED | UNDEFINED | Nmsec(N=1~255) | 1 ms/FRAME |
| DATA TRAFFIC/PACKET | 1 TO 64 BYTES (FULL) 1 TO 8 BYTES (LOW) | 8/16/32/64 BYTES | 1 TO 64 BYTES (FULL) 1 TO 8 BYTES (LOW) | 1 TO 1023 BYTES |
| RELIABILITY TRANSFER RATE DELAY TIME | RETRANSMISSION SUPPORTED | RETRANSMISSION SUPPORTED | RETRANSMISSION SUPPORTED | RETRANSMISSION NOT SUPPORTED |

English Translation
721: OVERALL STRUCTURE
722: FRAME STRUCTURE
723: TRANSACTION STRUCTURE

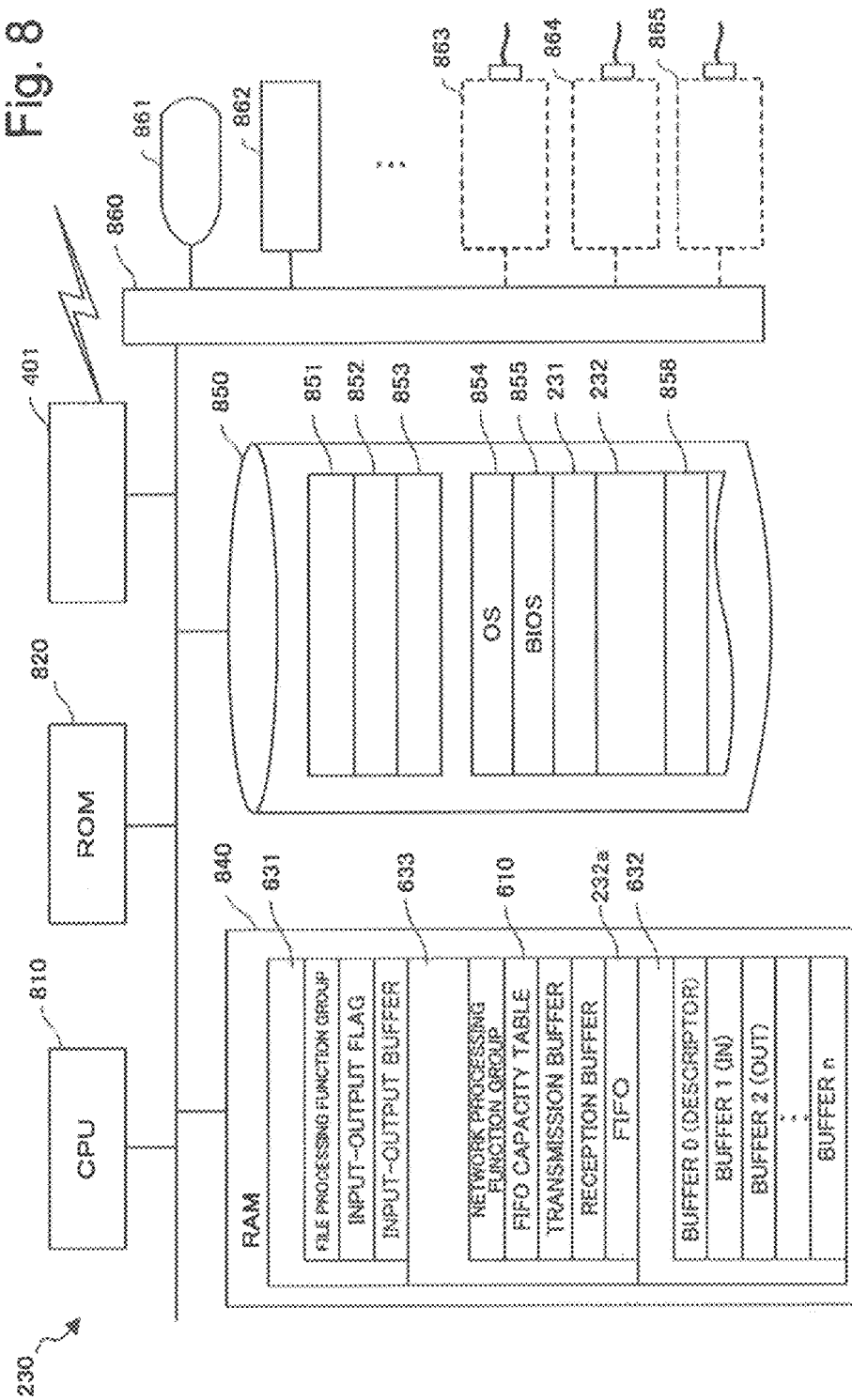

Fig. 8

English Translation
231: APPLICATION SOFTWARE
232: APPLICATION IF (UPPER LAYER OF DEVICE DRIVER)
401: COMMUNICATION CONTROL UNIT
631: INPUT-OUTPUT FILE STRUCTURE
632: USB BUFFER
633: COMMUNICATION STRUCTURE
850: STORAGE
851: APPLICATION STORAGE
852: FUNCTION GROUP STORAGE
853: DRIVER STORAGE
858: COMMUNICATION CONTROL PROGRAM
860: INPUT-OUTPUT INTERFACE
861: DISPLAY
862: OPERATION UNIT
863: USB CONTROLLER (CONNECTOR)
864: SCSI CONTROLLER (CONNECTOR)
865: HDMI® CONTROLLER (CONNECTOR)

English Translation
S901: ACQUIRE INPUT-OUTPUT FILE STRUCTURE
S903: SECURE USB BUFFER
S905: GENERATE COMMUNICATION STRUCTURE
S907: REQUEST DEVICE DESCRIPTOR
S909: DESCRIPTOR RECEIVED?
S911: SET TO USB BUFFER
S913: TRANSFER TO INPUT-OUTPUT FILE STRUCTURE
S915: DATA TRANSFER MODE?

Fig. 9B

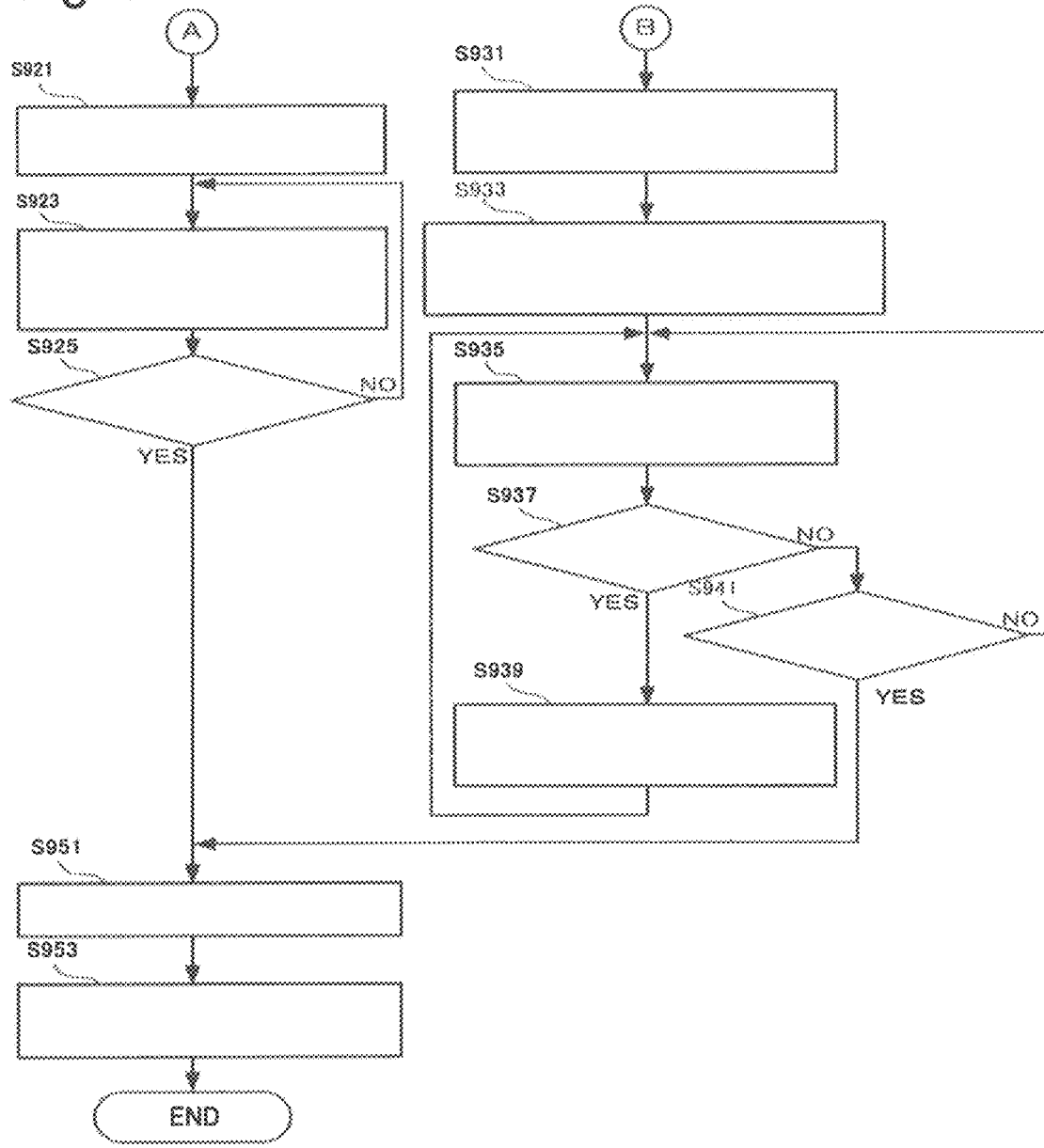

English Translation
S921: INSTRUCT BULK TRANSFER
S923: TRANSFER DATA BETWEEN USB BUFFER AND INPUT-OUTPUT FILE STRUCTURE
S925: TRANSFER COMPLETED?
S951: ACQUIRE INPUT-OUTPUT STATUS
S953: WRITE INTO INPUT-OUTPUT FILE STRUCTURE
S931: INSTRUCT INTERRUPT TRANSFER/ISOCHRONOUS TRANSFER
S933: SECURE FIFO IN ACCORDANCE WITH TRANSFER MODE/RATE AND
      COMMUNICATION MODE/RATE
S935: TRANSFER DATA BETWEEN USB BUFFER AND INPUT-OUTPUT FILE STRUCTURE
S937: COMMUNICATION CHANNEL DATA ERROR?
S941: TRANSFER COMPLETED?
S939: CHANGE FIFO CAPACITY OR CHANGE COMMUNICATION BAND

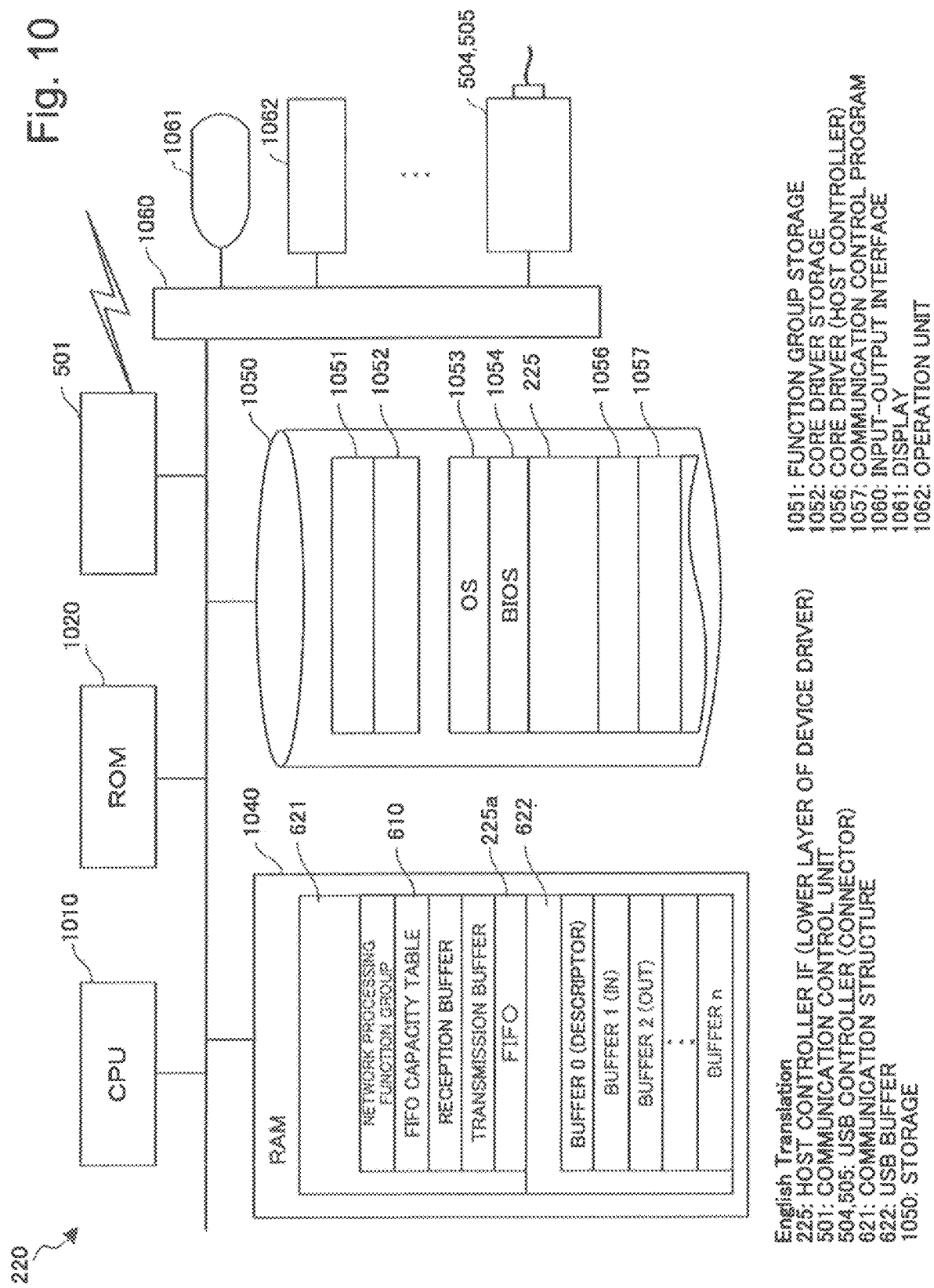

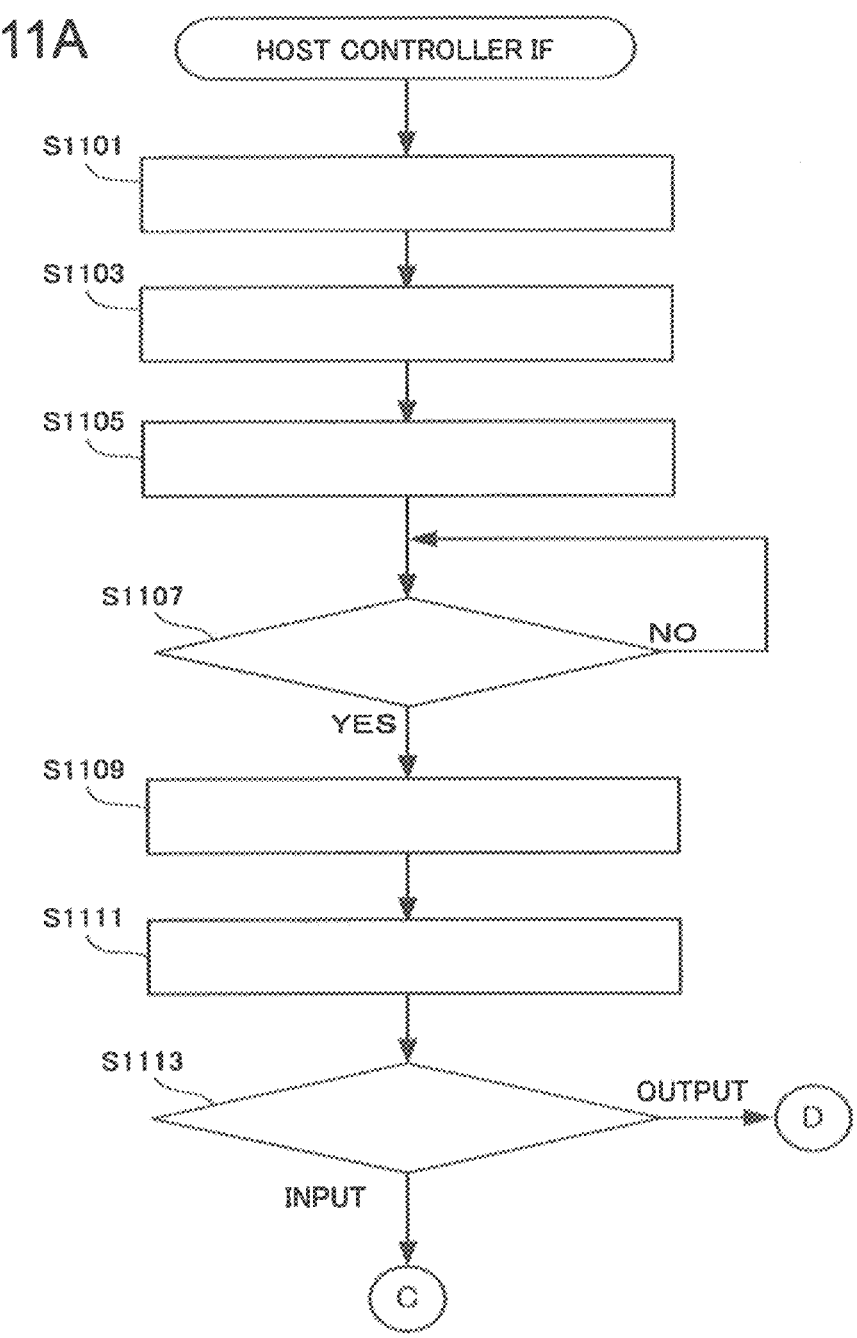

Fig. 11B

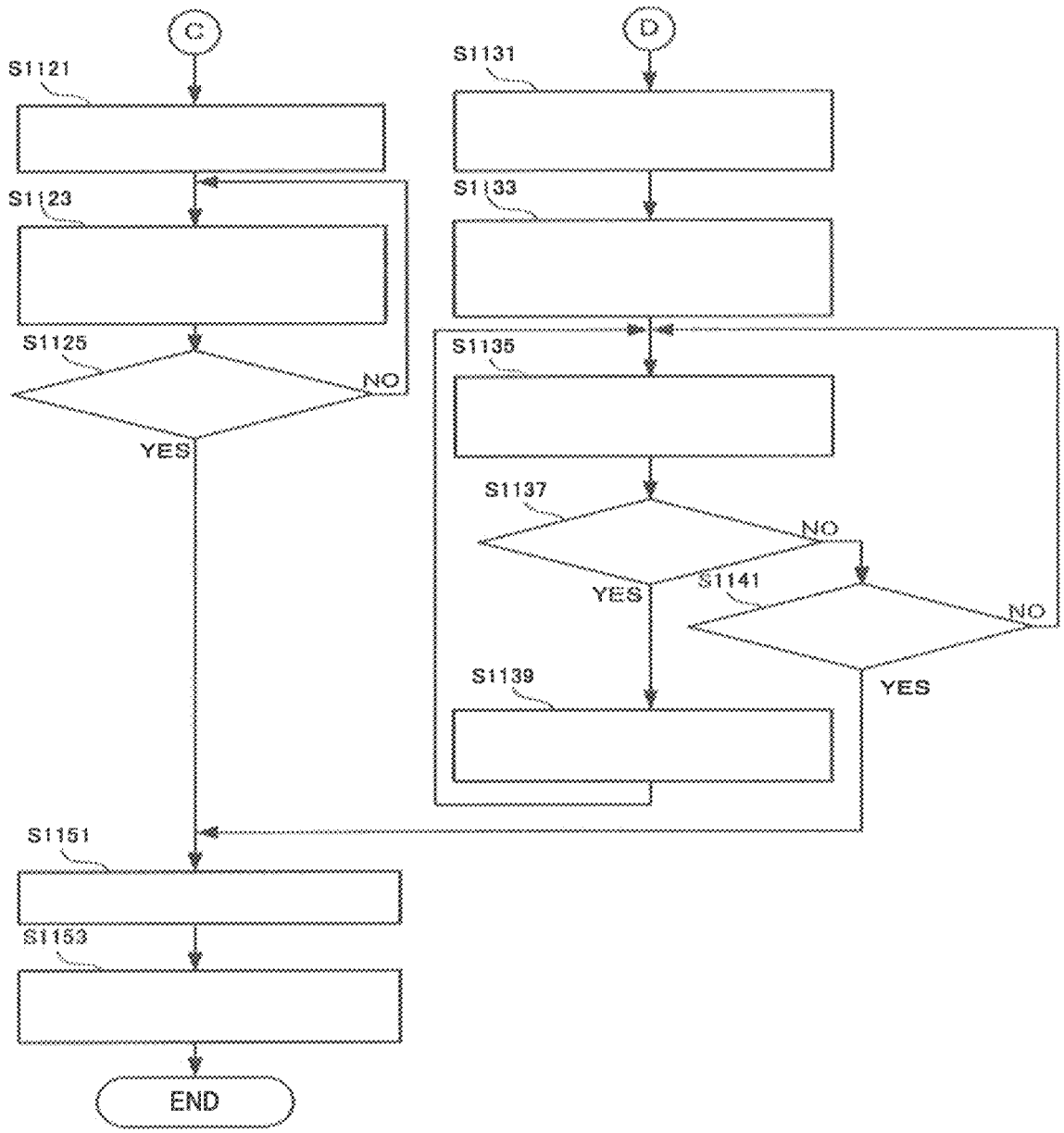

English Translation
S1121: INSTRUCT BULK TRANSFER
S1123: TRANSFER DATA BETWEEN USB BUFFER AND DEVICE
S1125: TRANSFER COMPLETED?
S1151: RECEIVE DEVICE STATUS
S1153: TRANSMIT DEVICE STATUS
S1131: INSTRUCT INTERRUPT TRANSFER/ISOCHRONOUS TRANSFER
S1133: SECURE FIFO IN ACCORDANCE WITH TRANSFER MODE/RATE AND
       COMMUNICATION MODE/RATE
S1135: TRANSFER DATA BETWEEN USB BUFFER AND DEVICE
S1137: COMMUNICATION CHANNEL ERROR?
S1141: TRANSFER COMPLETED?
S1139: CHANGE FIFO CAPACITY

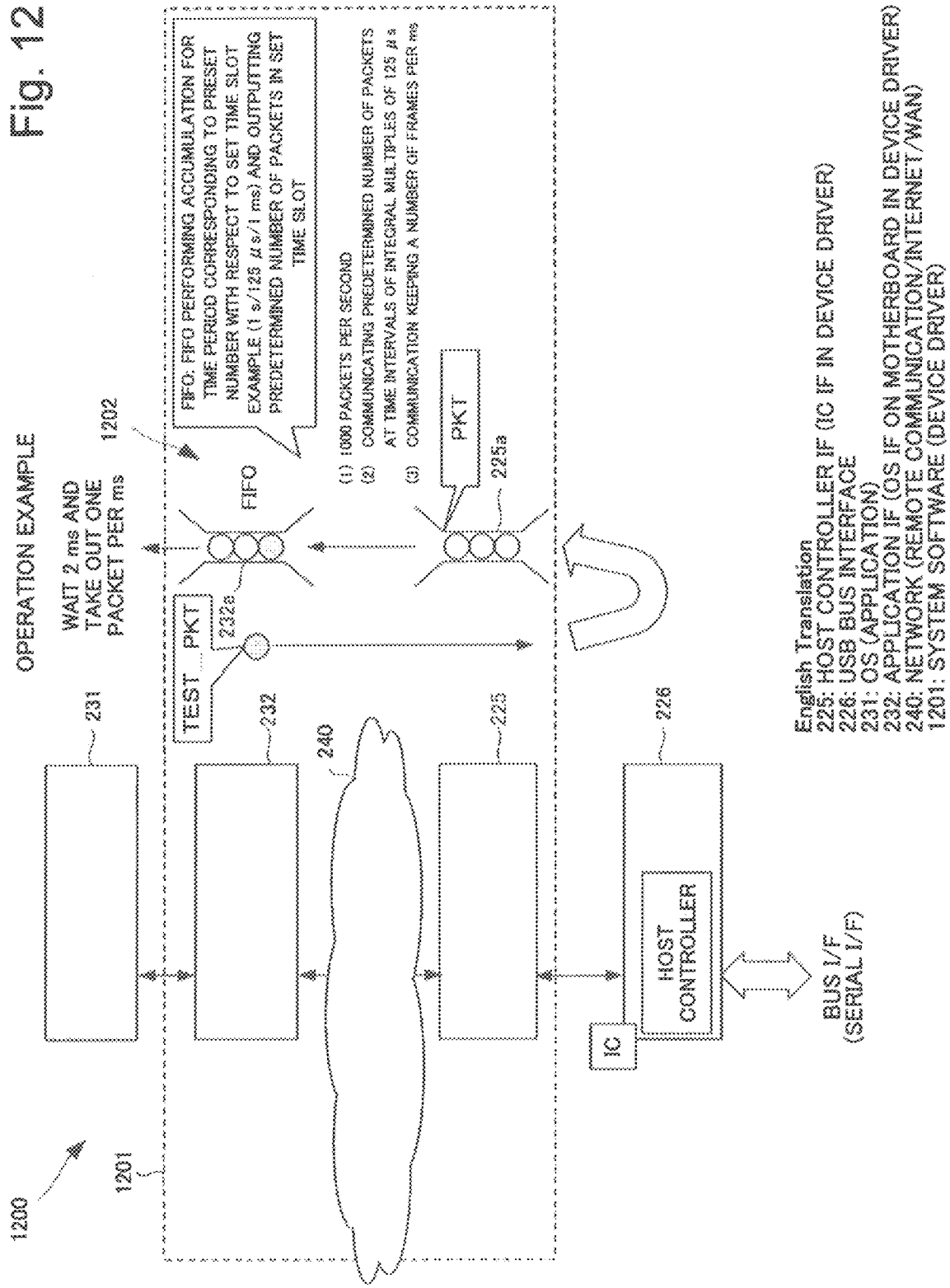

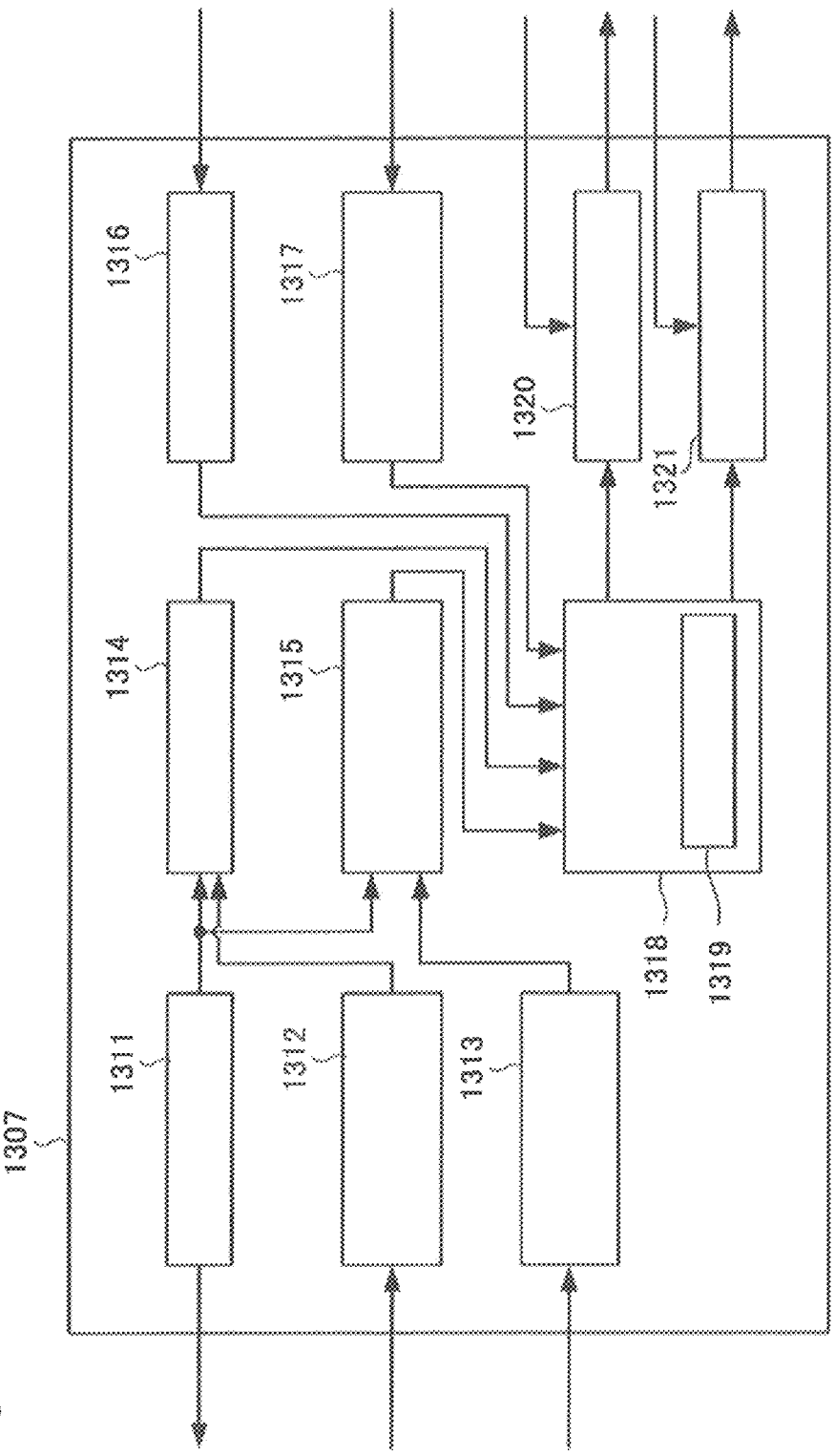

English Translation
2130: CLOUD SERVER
2131: VIRTUAL PC
213n: VIRTUAL PC
2201: COMMUNICATION CONTROL UNIT
2202: PARAMETER RECEPTION UNIT
2203: CONNECTION-ENVIRONMENT-AND-CONDITION-BASED SETTING PARAMETER ACCUMULATION UNIT
2204: SYSTEM PARAMETER DB
2205: PARAMETER REQUEST RECEPTION UNIT
2206: PARAMETER SELECTION UNIT
2207: PARAMETER TRANSMISSION UNIT

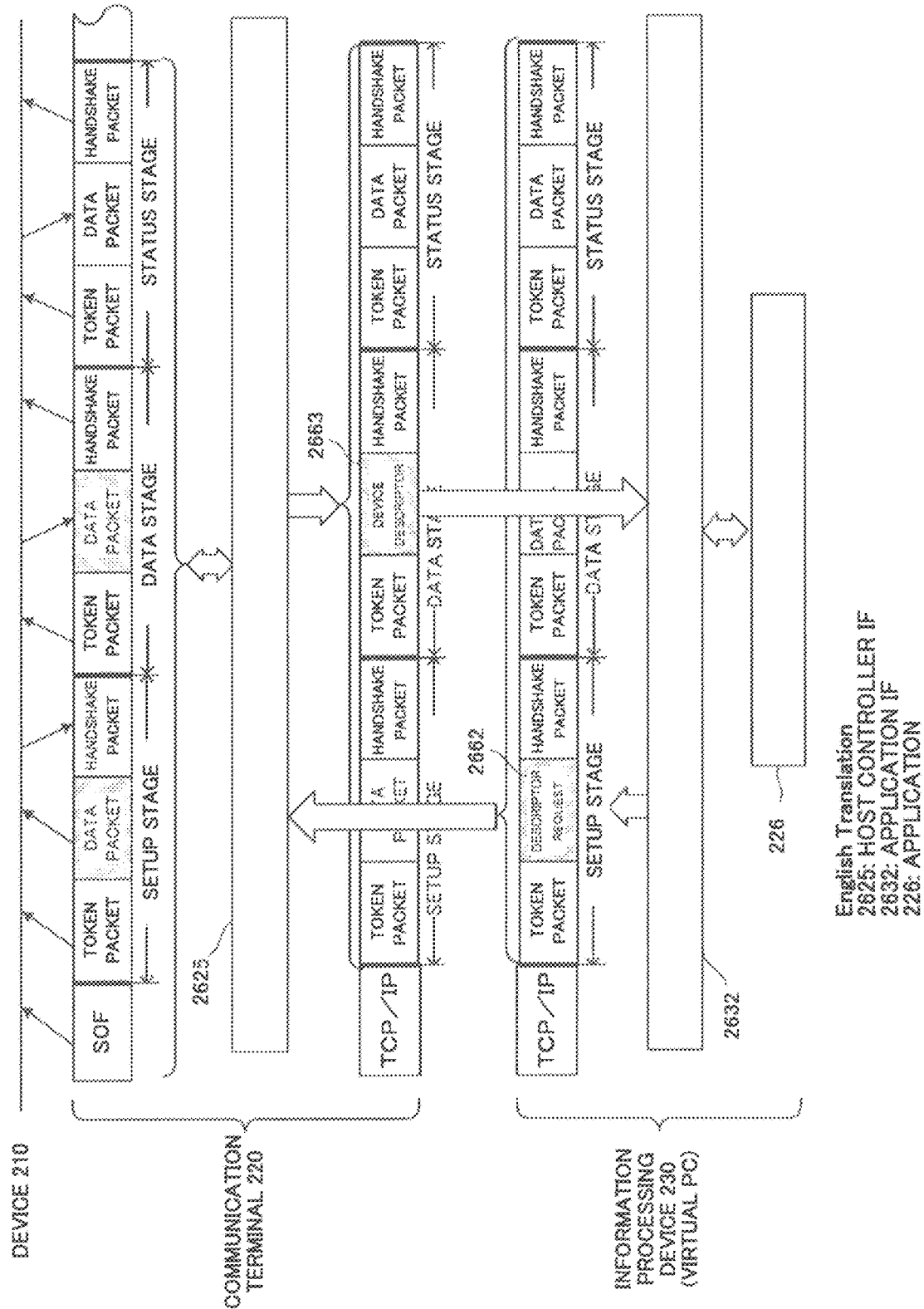

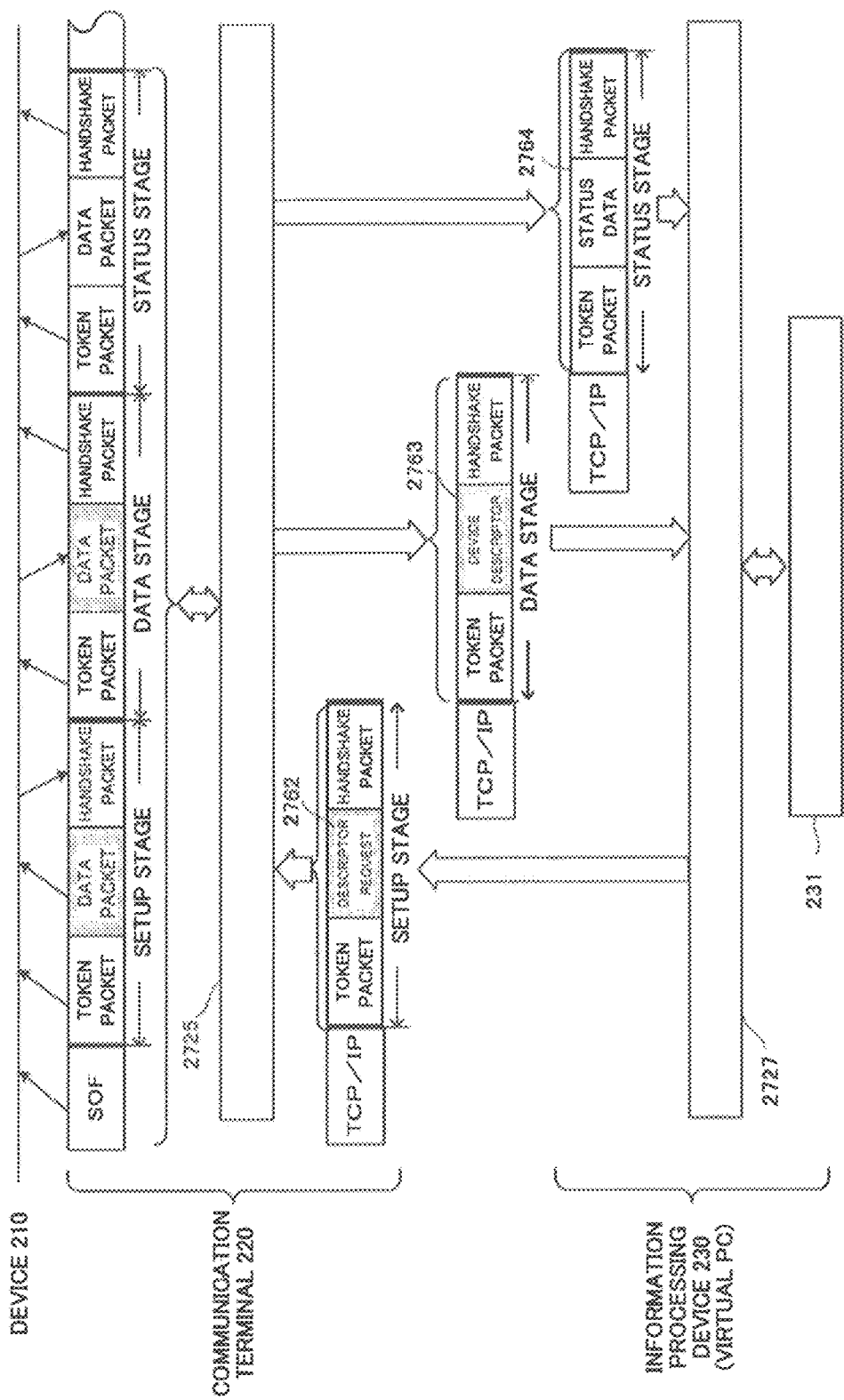

INFORMATION PROCESSING SYSTEM, INFORMATION PROCESSING METHOD, AND INFORMATION PROCESSING DEVICE

CROSS-REFERENCE TO RELATED PATENT APPLICATIONS

This application is a National Stage Entry of International Application No. PCT/JP 2015/082360, filed Nov. 18, 2015, which claims priority from Japanese Patent Application No. 2014-235109, filed Nov. 19, 2014. The entire contents of the above-referenced applications are expressly incorporated herein by reference.

TECHNICAL FIELD

The present invention relates to an information processing system, an information processing method, a server, an information processing device, a communication terminal, and a control method and a control program therefor.

BACKGROUND ART

In the aforementioned technical field, PTL 1 discloses a technology of connecting a function driver and a hub driver that constitute a device driver, by communication through a network, and controlling a USB device.

CITATION LIST

Patent Literature

PTL 1: Japanese Unexamined Patent Application Publication No. 2013-016165

SUMMARY OF INVENTION

Technical Problem

However, in the technology described in the aforementioned literature, when a situation that a data transfer in network communication is not able to keep up with a data transfer in USB communication occurs, an overflow (overrun) or an underflow (underrun) causes a data transfer error, and data cannot be normally input and output.

An object of the present invention is to provide a technology for solving the problem described above.

Solution to Problem

To achieve the object of the present invention, an information processing system recited in the present invention includes:
a device;
a device control unit that controls the device;
a device interface unit that interfaces with the device control unit;
an information processing device that includes an application and application interface unit that interfaces with the application;
a channel establishment unit that, when being connected to the application interface unit and the device interface unit, establishes a control channel and a data channel between the application and the device; and
an error suppression unit that suppresses occurrence of error caused by a data transfer through a channel established by the channel establishment unit.

To achieve the object of the present invention, an information processing method recited in the present invention includes:
activating a device interface unit that interfaces with a device control unit that controls a device in a communication terminal;
activating an application interface unit that interfaces with an application in an information processing device;
connecting the application interface unit in the information processing device to the device interface unit in the communication terminal through a communication unit and establishing a control channel and a data channel between the application and the device; and
suppressing occurrence of error caused by a data transfer through a channel established.

To achieve the object of the present, invention, an information processing device recited in the present invention includes:
an application;
an application interface unit that interfaces with the application;
a channel establishment unit that connects, through a communication unit, the application interface unit to a device interface unit that interfaces with a device control unit that controls a device, and establishes a control channel and a data channel between the application and the device; and
an error suppression unit that suppresses occurrence of error caused by a data transfer through a channel established by the channel establishment unit.

To achieve the object of the present, invention, a control method for an information processing device recited in the present invention, the control method includes:
activating an application interface unit that interfaces with an application;
connecting through a communication unit, the application interface unit to a device interface unit that interfaces with a device control unit that controls a device, and establishing a control channel and a data channel between the application and the device; and
suppressing occurrence of error caused by a data transfer through a channel established.

To achieve the object of the present invention, a non-transitory program storage medium storing a control program for an information processing device recited in the present invention, the control program causing a computer to perform:
activating an application interface unit that interfaces with an application;
connecting, through a communication unit, the application interface unit to a device interface unit that interfaces with a device control unit that controls a device, and establishing a control channel and a data channel between the application and the device; and
suppressing occurrence of error caused by a data transfer through a channel established.

To achieve the object of the present invention, a communication terminal recited in the present invention includes:
a device control unit that controls a device;
a device interface unit that interfaces with the device control unit;
a channel establishment unit that connects, through a communication unit, the device interface unit to an application interface unit that is included in an information processing device and interfaces with an application, and establishes a control channel and a data channel between the application and the device; and an error suppression unit that suppresses occurrence of error caused by a data transfer through a channel established by the channel establishment unit.

To achieve the object of the present invention, a control method for a communication terminal recited in the present invention, the control method includes:

activating a device interface unit that interfaces with a device control unit that controls a device;

connecting, through a communication unit, the device interface unit to an application interface unit that is included in an information processing device and interfaces with an application, and establishing a control channel and a data channel between the application and the device; and suppressing occurrence of error caused by a data transfer through a channel established.

To achieve the object of the present invention, a non-transitory program storage medium storing a control program for a communication terminal, the control program causing a computer to perform:

activating device interface means for interfacing with device control means for controlling a device;

activating a device interface unit that interfaces with a device control unit that controls a device;

connecting, through a communication unit, the device interface unit to an application interface unit that is included in an information processing device and interfaces with an application, and establishing a control channel and a data channel between the application and the device; and suppressing occurrence of error caused by a data transfer through a channel established.

To achieve the object of the present invention, a server recited in the present invention includes:

an acquisition unit that, when connecting, through a communication unit, an application interface unit that interfaces with an application of an information processing device to a device interface unit that interfaces with a device control unit of a communication terminal and establishing a control channel and a data channel between the application and the device, acquires a parameter set by an error suppression unit that suppresses occurrence of error caused by a data transfer through a channel established;

a database that accumulates the parameter acquired; and a provision unit that, selects a proper parameter from the database based on a connection condition and provides the proper parameter for error suppression unit, when newly connecting, through a communication unit, an application interface unit in an information processing device to a device interface unit in a communication terminal and establishing a control channel and a data channel between an application and a device.

Advantageous Effects of Invention

The present invention is able to normally input and output data even when a serial communication bus is extended by network communication.

BRIEF DESCRIPTION OF DRAWINGS

FIG. 1 is a block diagram illustrating a configuration of an information processing system according to a first example embodiment of the present invention.

FIG. 2A is a block diagram illustrating a configuration of an information processing system according to a second example embodiment of the present invention.

FIG. 2B is a diagram illustrating an overview of the information processing system according to the second example embodiment, of the present invention.

FIG. 2C is a block diagram illustrating a functional configuration of the information processing system according to the second example embodiment of the present invention.

FIG. 2G is a diagram representing data transmission in the information processing system according to the second example embodiment of the present invention.

FIG. 3C is a diagram illustrating USB transfer modes according to the underlying technology.

FIG. 8 is a block diagram illustrating a hardware configuration of the information processing device according to the second example embodiment of the present invention.

FIG. 9B is a flowchart illustrating a processing procedure of the information processing device according to the second example embodiment of the present invention.

FIG. 10 is a block diagram illustrating a hardware configuration of the communication terminal according to the second example embodiment of the present invention.

FIG. 11A is a flowchart illustrating a processing procedure of the communication terminal according to the second example embodiment of the present invention.

FIG. 11B is a flowchart illustrating a processing procedure of the communication terminal according to the second example embodiment of the present invention.

FIG. 12 is a diagram illustrating an overview of an information processing system according to a third example embodiment of the present invention.

FIG. 13B is a block diagram illustrating a functional configuration of a communication test unit according to the third example embodiment of the present invention.

FIG. 26 is a diagram illustrating data transmission in an information processing system according to a fifth example embodiment of the present invention.

FIG. 27 is a diagram illustrating another data transmission in the information processing system according to the fifth example embodiment of the present invention.

DESCRIPTION OF EMBODIMENTS

Figure 2D:
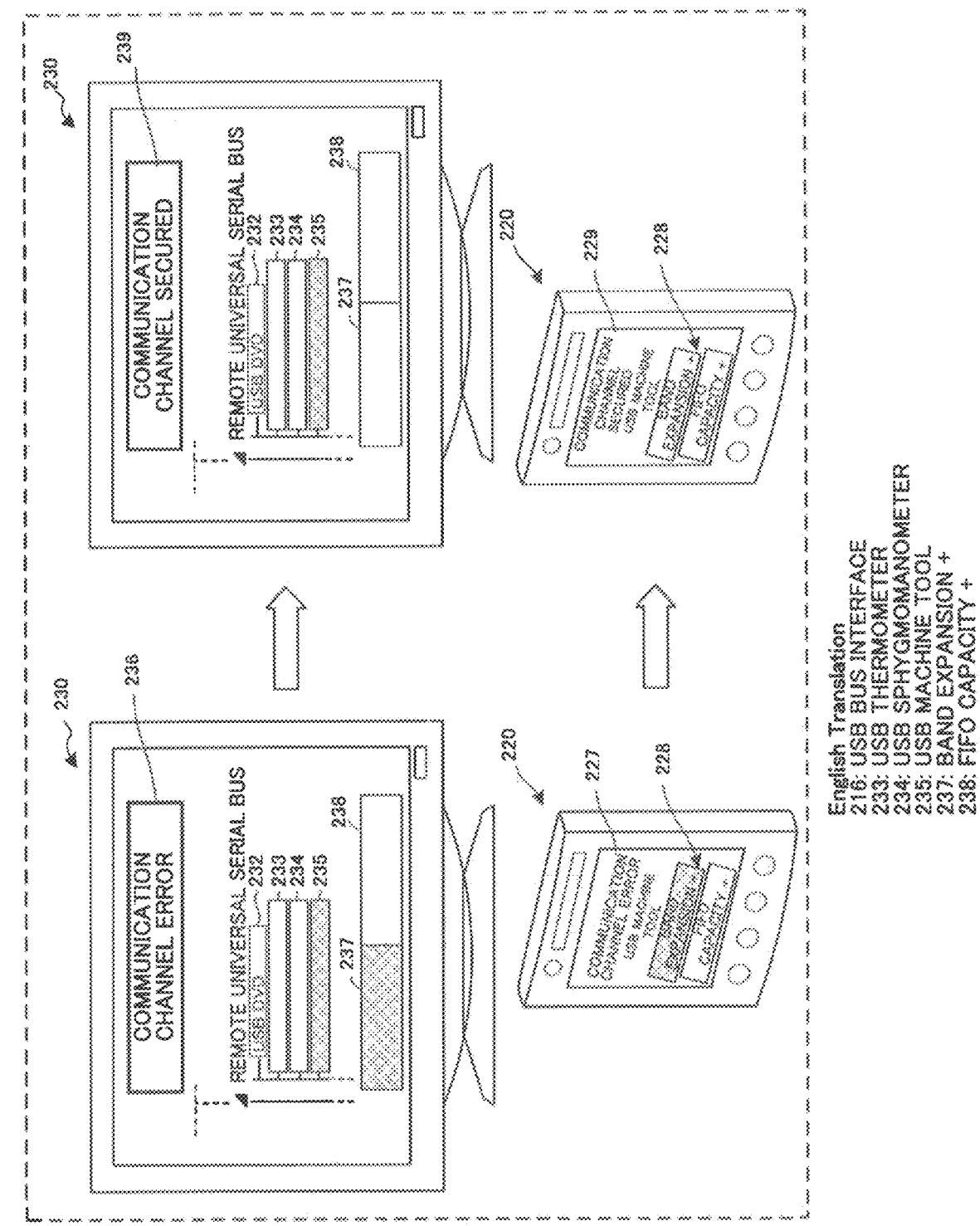
FIG. 2D is a diagram illustrating communication channel error processing of the information processing system according to the second example embodiment of the present invention.

Referring to the drawings, example embodiments of the present invention will be exemplarily described in detail. Note that components described in the following example embodiments are merely exemplifications and are not intended to limit the technical scope of the present invention thereto.

First Example Embodiment

An information processing system 100 according to a first example embodiment of the present invention will be described using FIG. 1. The information processing system 100 is a system controlling a device connected.

As illustrated in FIG. 1, the information processing system 100 includes a device 110, a device control unit 120, a device interface unit 130, an information processing device 140, a channel establishment unit 150, and an error suppression unit 160. The device control unit 120 controls the device 110. The device interface unit 130 interlaces with the device control unit 120. The information processing device 140 includes an application 141 and an application interface unit 142 that interfaces with the application 141. The channel establishment unit 150 connects the application interface unit 142 and the device interface unit 130 through a communication unit 151, and establishes a control channel and a data channel between the application 141. The error suppression unit 160 suppresses occurrence of error caused by a data transfer through a channel established by the channel establishment unit 150.

The first example embodiment suppresses the occurrence of error caused by the data transfer through the channel, and therefore is able to normally input and output data even when a serial communication bus is extended by network communication.

Second Example Embodiment

Next, an information processing system according to a second example embodiment of the present invention will be described. The information processing system according to the second example embodiment controls a remote USB device connected to a remote communication terminal by a universal serial has (USB) cable, from a host as an information processing device through a network, and operates the remote USB device similarly to a device connected with an own device. In that case, a first-in first-out (FIFO) buffer is arranged in order to suppress an error caused by delay in the data transfer in network communication.

Further, the information processing system informs about the occurrence of error in the data transfer, receives a suppression instruction to suppress the occurrence of error and suppresses the occurrence of error in response to the suppression instruction received. The device is connected to the communication terminal through USB, HDMI®, SCSI, a SD card connector, or short-distance communication. In a data communication means, data is transferred in a layer proper for device control selected from a plurality of layers.

<<Information Processing System>>

Before describing the information processing system according to the first example embodiment, an information processing system according to an underlying technology will be described in order to clarify a feature of the first example embodiment.

(Underlying Technology)

Figure 3A:
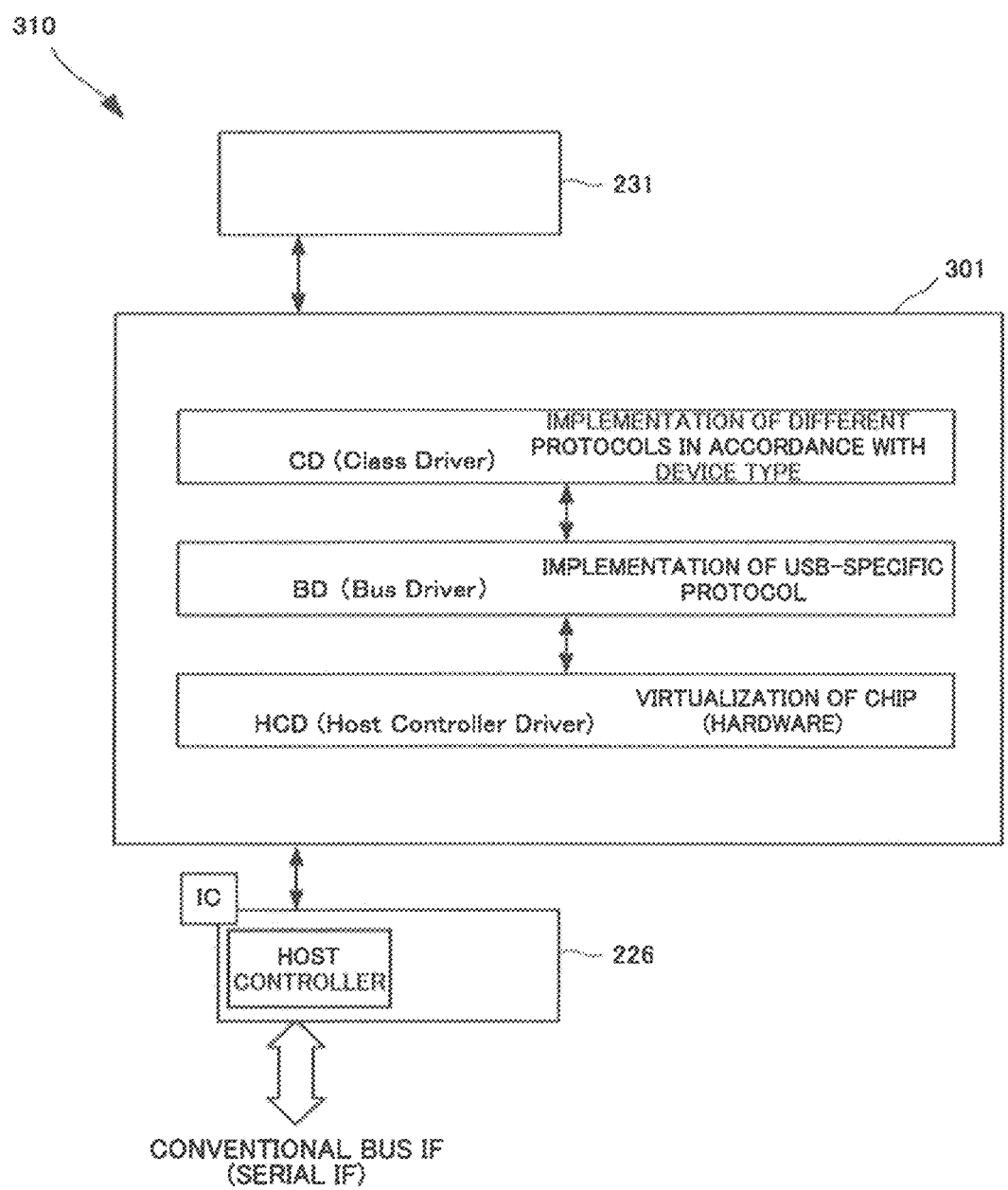
FIG. 3A is a diagram illustrating an overview of an information processing system according to an underlying technology.

FIG. 3A is a diagram illustrating an overview of an information processing system 310 according to the underlying technology.

The information processing system 310 includes an operating system (OS) and an application 231 executed on a host computer, a device driver 301 being system software executed on the host computer, and a USB bus interface 226. For example, the device driver 301 includes a class driver (CD) for implementation of different protocols according to varieties of device, a bus driver (BD) for implementation of a USB-specific protocol, and a host controller driver (HCD) for abstraction of a hardware chip. Further, the USB bus interface 226 is provided by an IC chip including a host controller, and the like.

With such a configuration, when a device control unit such as the host computer connected to a device does not include a device driver accommodating the device, the connected device does not operate.

Figure 3B:
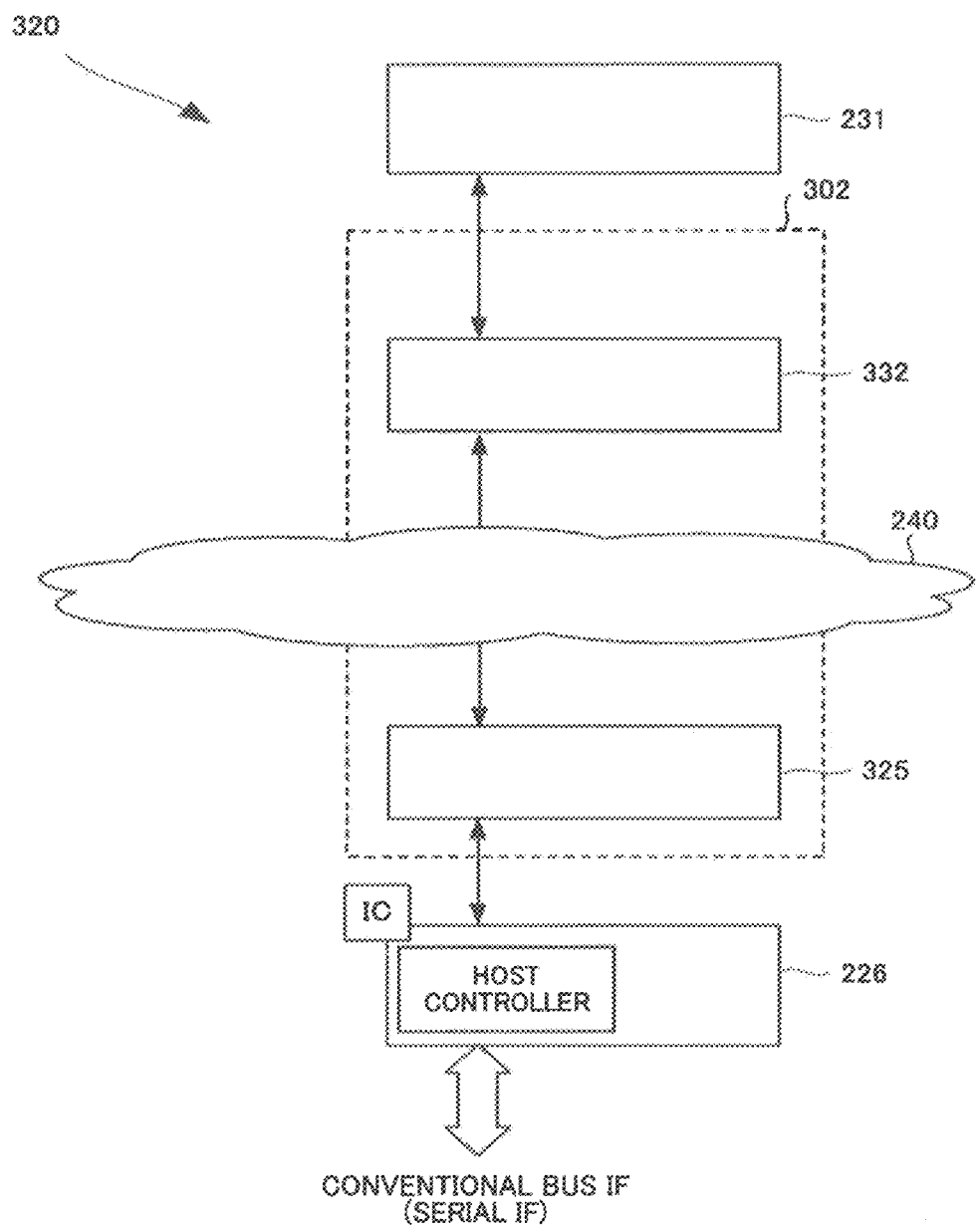
FIG. 3B is a diagram illustrating an overview of an information processing system according to the underlying technology.

FIG. 3B is a diagram illustrating art overview of au information processing system 320 according to the underlying technology. The information processing system 320 has a configuration proposed by the present inventor in which a control unit remotely connected through a network 240 (e.g., another computer or a communication terminal) controls a device. Even when the remotely connected control unit does not include a device driver accommodating the device, as long as an interface with a USB bus interface 226 including a host controller is available, control of the device at a remote location can be performed by cooperation with an interface with an OS or an application in a host computer.

The information processing system 320 includes an OS (application) 231 executed on the host computer, a device driver 302, and the USB bus interface 226. The device driver 302 includes interface software 332, interlacing with the OS or the application executed on the host computer, and interface software 325 interfacing with the USB bus interface 226 including the host controller executed on the remotely connected control unit. Further, the device driver 302 includes a communication control unit (unillustrated) connecting the interface software 332 and 325 through the network 240.

With such a configuration, the host computer is able to control a device at a remote location its a same manner as a device directly connected to a local bus I/F or a serial I/F. However, when deviation or delay occurs between a communication format and a communication rate of a communication channel connecting the host computer and the control unit, and a format and a rate of a bus I/F and a serial I/F in the remotely connected device, a data transfer error occurs. In USB connection, an interrupt transfer or an isochronous transfer in particular, the data transfer error brings a critical result.

FIG. 3C is a diagram illustrating USB transfer modes according to the underlying technology.

The USB transfer modes basically include a control, transfer 311, a bulk transfer 312, an interrupt, transfer 313, and an isochronous transfer 314. The control transfer 311 is half-duplex communication for setup, and transfer of a setting parameter, and data traffic thereof is light. The bulk transfer 312 is unidirectional communication for respective IN and OUT of large-capacity, high-speed data of a storage device, a scanner, and the like, and controls transferred data. The interrupt transfer 313 is a periodic transfer (basically by a request from a host) of small-capacity data of measurement and a machine, and the data transfer error leads to an operational error of equipment, and the like. The isochronous transfer 314 is a transfer that should guarantee real-time data traffic such as voice and video, within a certain period, and reliability in the data transfer is important since retransmission processing is not supported.

In relation to the features and purposes of the transfer modes, an operation of a transfer rate, a transfer cycle, and data traffic/USB packet 315 needs to be provided without a data overflow (overrun) or a data underflow (underrun).

The information processing system according to the second example embodiment suppresses the occurrence of error in the data transfer through a channel, and is able to normally input and output data even when serial communication bus is extended by network communication.

<<Information Processing System According to Second Example Embodiment>>

Referring to FIGS. 2A to 2G, a configuration of an information processing system 200 according to the second example embodiment will be described.

(System Configuration)

FIG. 2A is a block diagram illustrating a configuration of the information processing system 200 according to the second example embodiment.

The information processing system 200 includes communication terminals 221, 222, and 223 connected to a host 230 as an information processing device through a network 240. The communication terminals 221, 222, and 223 are connected to devices 212 to 215 through serial buses 261 to 265, respectively. The devices 213 and 214 are connected through a hub. Further, the host 230 is connected to the device 211. The devices 211 and 212 are DVD units, the device 213 is a thermometer, the device 214 is a sphygmomanometer, and the device 215 is a machine tool.

The thus connected devices are displayed as follows on a display screen of a device manager indicating a device that can be operated from the host 230. The device 211 connected to a USB connector on the host 230 is displayed as "USB DVD" 231 in an internal UNIVERSAL SERIAL BUS CONTROLLER field. The devices 212 to 215 externally connected through the network 240 are respectively displayed in a REMOTE UNIVERSAL SERIAL BUS field as "USB DVD" 232, "USB THERMOMETER" 233, "USB SPHYGMOMANOMETER" 234, and "USB MACHINE TOOL" 235. The host 230 operates a device connected to the local device and a device remotely connected through the network 240 as same connected devices.

While the network 240 according to the second example embodiment is described as remote communication including a public network and wireless communication, the network 240 may be similarly configured when being replaced by a LAN, short-distance wireless communication [e.g., Bluetooth® and Wi-Fi], or a combination thereof, and provide a same effect.

(System Overview)

FIG. 2B is a diagram illustrating an overview of the information processing system 200 according to the second example embodiment. The overview of the information processing system 200 mainly illustrates a software configuration compared with FIG. 3B.

The information processing system 200 includes an OS (application) 231 executed on the host computer, a device driver 201, and a USB bus interface 226. The device driver 201 includes an application interface (APPLICATION IF in the diagram) 232 interfacing with the OS or the application executed on the host computer. Further, the device driver 201 includes a host controller interface (HOST CONTROLLER IF in the diagram) 225 interfacing with the USB bus interface 226 in the remotely connected control unit. Further, the device driver 201 includes a communication control unit (unillustrated) communicably connecting the application interface 232 and the host controller interface 225 through the network 240.

Furthermore, the communication control unit and the application interface 232 include a FIFO 232a for absorbing jitter and the like caused by a communication format and a communication rate, and/or the communication control unit and the host controller interface 225 include a FIFO 225a for absorption of jitter caused by a communication format and a communication rate, data traffic adjustment, and the like. Capacities of the FIFO 232a and the FIFO 225a mainly depend on data traffic between the host controller and the device, and data traffic in the network. For example, a capacity determination procedure 202 measures traffic per certain time period to determine communication rate control per certain time period required to maintain data traffic between the host controller and the device.

A capacity of a FIFO is set so that accumulation for a time period corresponding to a preset number with respect to a set time slot example (1 s/125 microsecond/1 millisecond) is performed, and a predetermined number of packets can be output in the set time slot. Further, conditions thereof are set to enable, for example, (1) 1000 packets per second, (2) communicating a predetermined number of packets at time intervals of integral multiples of 125 microsecond (e.g., voice), and (3) communication keeping a number of frames per millisecond (e.g., video).

Components providing jitter absorption and data traffic adjustment are not limited to the FIFO 232a and the FIFO 225a. Other components such as a rotation memory and time division multiplexing (TDM) may be employed.

With such a configuration, the host computer is able to control a device at a remote location in a same manner as a device directly connected to a local bus I/F or a serial I/F, and, at the same time, the occurrence of error in the data transfer through a channel is suppressed, and data can be normally input and output even when a serial communication bus is extended by network communication.

(System Concept)

FIG. 2C is a diagram illustrating a concept of the information processing system 200 according to the second example embodiment. Note that, in FIG. 2C, illustration of regular software such as an OS and a basic input/output system (BIOS) is omitted.

The information processing system 200 in FIG. 2C includes the host 230 as an information processing device, a remote communication terminal 220 connected to the host 230 through the network 240, and a USB device 210 connected to a USB connector on the communication terminal 220.

The host 230 includes, as software, application software 231 and an application interface 232 as part of a device driver. The application software 231 is software for providing a service previously provided by the host 230, or a service developed by a user. The application interface 232 interprets a structure of an input-output file operation requested by the application software 231, and generates a structure defining control information and data, that are transmitted and received through the network 240, according to a target device, a protocol, a data format, and the like of the input-output file operation. Since this example handles access to an input-output file with respect to the USB device 210, the application interface 232 prepares data transmission and reception compliant with a command and a data format that conform to a USB protocol. Further, as a component shared with the communication unit, the application interface 232 includes the FIFO 232a adjusting data traffic.

The communication terminal 220 includes, as software, a host controller interface 225 as part of a device driver, and a USB bus interface 226 including a host controller and a serial interface engine (SIE). The host controller interface 225 passes a command, data, and the like, conforming to a USB protocol and being received from the application interface 232 through the network 240, to the host controller in the USB bus interface 226, in a format understandable to the host controller. Further, the host controller interface 225 transmits data, device status, and the like, being passed from the host controller in the USB bus interface 226, to the application interface 232 through the network 240. Further, as a component shared with the communication unit, the host controller interface 225 includes the FIFO 225a adjusting data traffic.

The host controller in the USB bus interface 226 performs serial communication through a USB cable 260 based on a USB protocol, while exchanging a command, data, and the like with the host controller interface 225. The SIE in the USB bus interface 226 controls a signal over the USB cable 260 based on a USB communication specification.

The USB device 210 includes, as software, a USB bus interface 216 in the USB device 210 that is connected to the USB bus interface 226 in the communication terminal 220 through the USB cable 260 and exchanges a signal with the USB bus interface 226. Further, the USB device 210 includes an endpoint0 217 composed of a FIFO 0 that stores a descriptor including device information and control information, and endpoints1 to n 218 composed of FIFOs 1 to n that store input-output data.

By such connection, the communication terminal 220 and the USB device 210 perform physical-level communication by the own USB bus interfaces 226 and 216. Further, by a system-level control transfer through the application interface 232, the network 240, and the host controller interface 225, control communication as basic processing is provided between the application software 231 and the endpoint0 217 through a default pipe 251. Further, in an application-level data, transfer, data communication as each method of a device class is provided between the application software 231 and the endpoints1 to n 218 through, a data pipe group 252.

As described above, a unified communication channel (pipe) can be formed by network communication between the application interface 232 in the host 230 and the host controller interface 225 in the communication terminal 220 through the network 240, and serial communication between the USB bus interfaces 226 and 216 through the USB cable.

Furthermore, jitter absorption and data traffic adjustment are provided by the FIFO 232a and/or the FIFO 225a shared by the application interface 232, the host controller interface 225, and the communication unit to suppress the occurrence of error in the data transfer through the channel, and data are normally input and output even when serial communication bus is extended by network communication.

(Communication Channel Error Processing)

FIG. 2D is a diagram illustrating communication channel error processing of the information processing system 200 according to the second example embodiment.

An upper section of FIG. 2D illustrates a coping example at the host 230 in occurrence of the data transfer error in a communication channel. COMMUNICATION CHANNEL ERROR 236 is displayed, and a remote USB bus 235 where the error occurs is informed. The communication channel error may be informed by sound. As a coping operation example against the communication channel error, band expansion 237 in the network and capacity increase 238 of the FIFO 232a are inquired to a user. For example, when the user instructs the band expansion 237, and the communication channel error disappears, COMMUNICATION CHANNEL SECURED 239 is notified as illustrated in an upper-right diagram.

Meanwhile, a lower section of FIG. 2D illustrates a coping example at the communication terminal 220 such as a smartphone in occurrence of the data transfer error in a communication channel. COMMUNICATION CHANNEL ERROR 227 is displayed, and a remote USB bus where the error occurs is informed. The communication channel error may be informed by sound. As a coping operation example against the communication channel error, an inquiry 228 about band expansion in the network and capacity increase of the FIFO 232a is displayed. For example, when a user instructs the band expansion, and the communication channel error disappears, COMMUNICATION CHANNEL SECURED 229 is notified as illustrated in a lower-right diagram.

The band expansion may be performed on a per user operation basis, or automatic expansion to a proper band, may be performed. For example, when a plurality of communication paths exist, band expansion may be performed by securing a plurality of communication paths. Further, the FIFO capacity increase may also be performed on a per user operation basis, or automatic adjustment, to a proper capacity may be performed. Additionally, a proper combination of band expansion and FIFO capacity increase may be selected in consideration of communication status and the like.

(Communication Message)

Figure 2E:
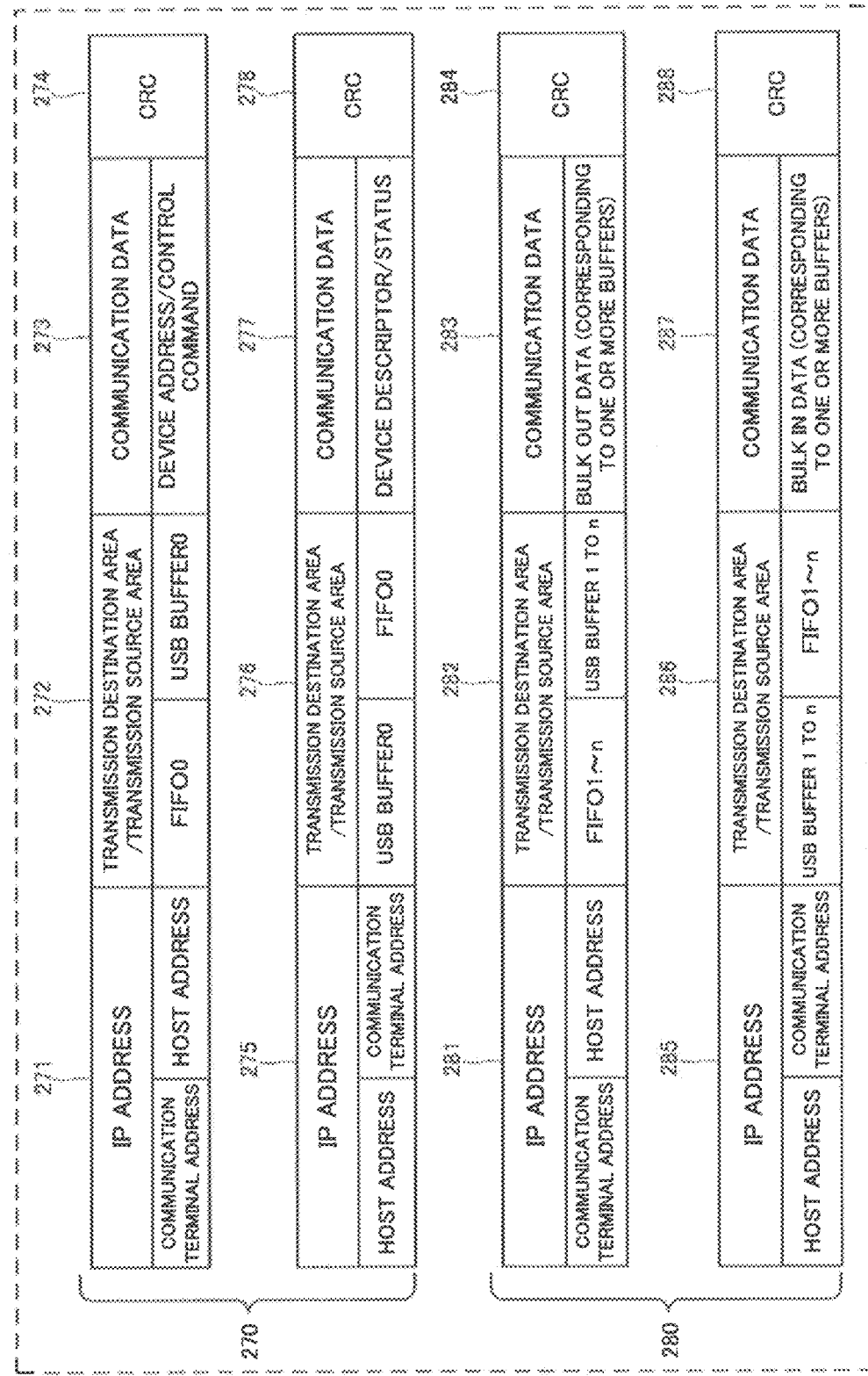
FIG. 2E is a diagram illustrating a configuration of a communication message according to the second example embodiment of the present invention.

FIG. 2E is a diagram illustrating a structure of a communication message according to the second example embodiment. Note that the format of the communication message is not limited to FIG. 2E.

FIG. 2E illustrates control messages 270 transmitted and received over a control channel being the default pipe 251, and data messages 280 transmitted and received over a data channel being the data pipe group 252.

Out of the control messages 270, a control message transmitted from the host 230 to the communication terminal 220 includes an IP address 271, a transmission destination area/transmission source area 272, communication data 273, and, for example, a CRC 274 for error correction. As the IP address 271, a communication terminal address of a destination and a host address of a source are set. As the transmission destination area/transmission source area 272, a FIFO 0 in a USB device 211 (212) is designated in the transmission destination area, and a USB buffer0 in the host 230 is designated in the transmission source area. Further, as the communication data 273, a device address assigned by the host 230 and a control command of the USB device 211 (212) are transmitted.

Out of the control messages 270, a control message transmitted from the communication terminal 220 to the host 230 includes an IP address 275, a transmission destination area/transmission source area 276, communication data 277, and, for example, a CRC 278 for error correction. As the IP address 275, a host address of a destination and a communication terminal address of a source are set. As the transmission destination area/transmission source area 276, the USB buffer0 in the host 230 is designated in the transmission destination area, and the FIFO 0 in the USB device 211 (212) is designated in the transmission source area. Further, as the communication data 277, a device descriptor and device status of the USB device 211 (212) are transmitted.

Out of the data messages 280, a data message transmitted from the host 230 to the communication terminal 220 includes an IP address 281, a transmission destination area/transmission source area 282, communication data 283, and, for example, a CRC 284 for error correction. As the IP address 281, a communication, terminal address of a destination and a host address of a source are set. As the transmission destination area/transmission source area 282, FIFOs 1 to n in the USB device 211 (212) are designated in the transmission destination area, and USB buffers 1 to n in the host 230 are designated in the transmission source area, in a mutually associated manner. Further, as the communication data 283, one or more pieces of bulk OUT data are transmitted.

Out of the data messages 280, a data message transmitted from the communication terminal 220 to the host 230 includes an IP address 285, a transmission destination area/transmission source area 286, communication data 287, and, for example, a CRC 288 for error correction. As the IP address 285, a host address of a destination and a communication terminal address of a source are set. As the transmission destination area/transmission source area 286, USB buffers 1 to n in the host 230 are designated in the transmission destination area, and FIFOs 1 to n in the USB device 211 (212) are designated in the transmission source area, in a mutually associated manner. Further, as the communication data 287, one or more pieces of bulk IN data are transmitted.

While another varieties of transfer include an interrupt transfer and an isochronous transfer, in addition to the control transfer and the bulk transfer, the another s of transfer include similar data message structures except that the "SETUP" stage is omitted, and therefore description of the messages thereof is omitted.

While network communication is performed between the host 230 and the communication terminal 220 in terms of encapsulated IP addresses, data are transmitted between a USB buffer secured in the host 230 by the application software 231, and a FIFO being an endpoint in the USB device 211 (212).

(Communication Data Configuration Example)

Figure 2F:
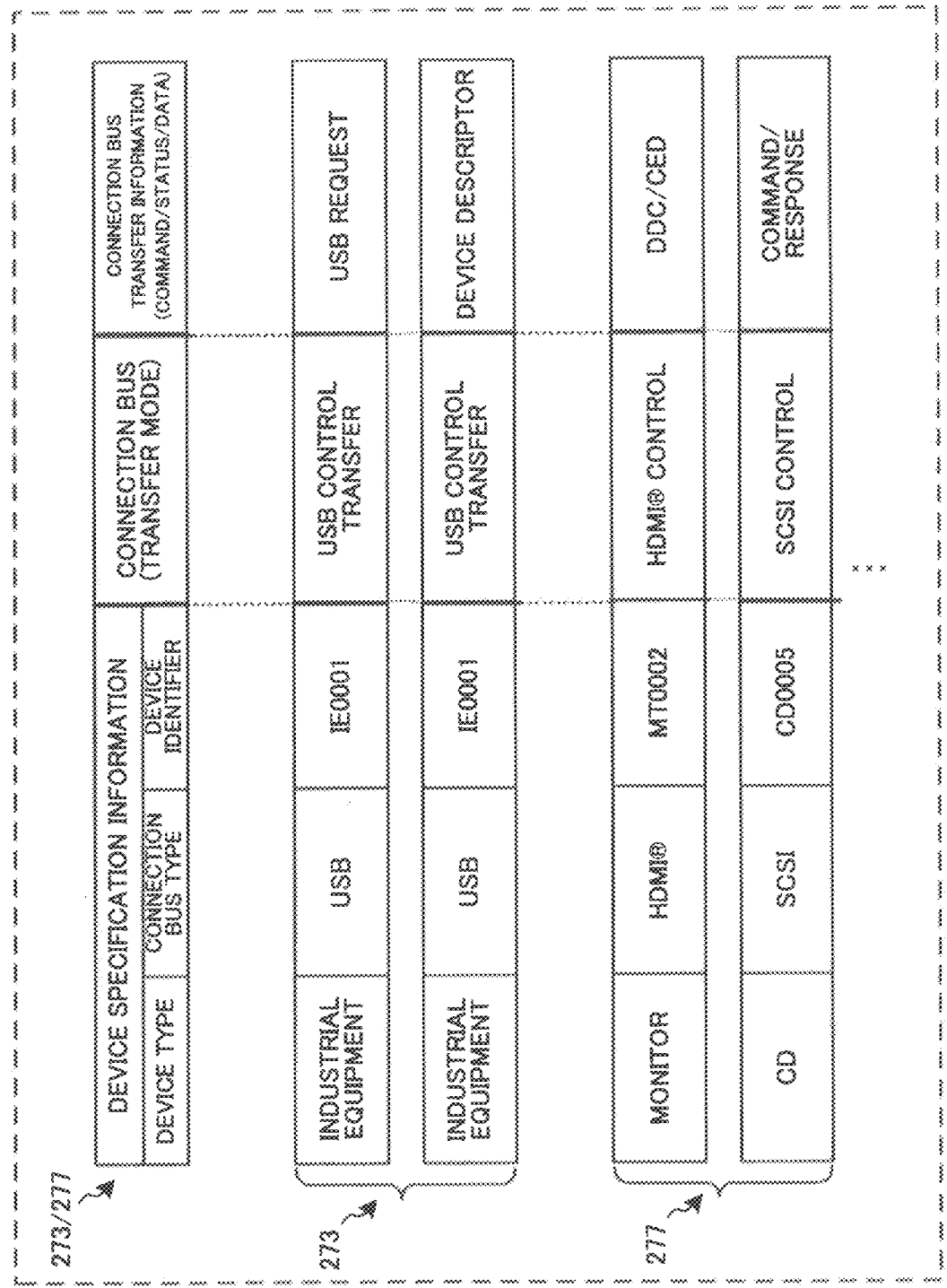
FIG. 2F is a diagram illustrating a communication data configuration according to the second example embodiment of the present invention.

FIG. 2F is a diagram illustrating a communication data configuration according to the second example embodiment. Note that, in FIG. 2F, an IP address for encapsulation and the like in FIG. 2E are omitted. While FIG. 2F illustrates an example of a communication data configuration providing the second example embodiment, the structure is not limited thereto. For example, as communication data in an upper layer of a device driver, a parameter (argument) of a function may be transmitted, and received, or the function itself may be transmitted and received.

FIG. 2F illustrates a basic communication data configuration 273/277, a communication data configuration 273 in USB, and a communication data configuration 277 in the other varieties of interface being HDMI® and SCSI.

The communication data configuration 273/277 includes device specification information. The device specification information includes varieties of device, varieties of connection bus, and a device identifier. The communication data configuration 273/277 includes a transfer mode over a connection bus and information to be transferred through the connection bus. The information to be transferred includes a command, status, and data.

The communication data configuration 273 in USB includes industrial equipment being varieties of the device, USB being the connection bus, and IE001 being the device identifier, as the device specification information. The communication data configuration 273 in the USB includes a USB control transfer as the transfer mode, and a USB request or a device descriptor as the transfer information. Such a structure eliminates the need to consider a limitation of a maximum number of 127 in conventional USB connection.

The communication data configuration 277 in the other varieties of interface being HDMI® and SCSI includes a monitor, HDMI®, MT0002, and a CD, SCSI, and CD0005 as the device specification information. Further, the structure includes HDMI® control and SCSI control as the transfer mode, and DDC/CED and command/response as the transfer information.

(Data Transmission Example)

FIG. 2G is a diagram illustrating data transmission in the information processing system 200 according to the second example embodiment. While FIG. 2G illustrates L2-level communication at the USB device, the communication may be performed in a lower layer or a higher layer.

FIG. 2G is a sequence diagram illustrating a descriptor acquisition procedure of a USB-connected USB device.

A descriptor set to the device 210 is acquired by a USB request such as GET DESCRIPTOR. Each USB request is exchanged with the device 210 by a control transfer. Each control transfer includes a setup stage, a data stage, and a status stage. Each stage is composed of a token packet, a data packet, and a handshake packet. A descriptor is acquired in a data packet in each data stage. A descriptor acquired from the device 210 is IP encapsulated by an IP header and a TCP header, and is transmitted from a USB hub 220 composed of a mobile terminal to the information processing device 230.

In response to a device input-output request by the application 231, a class driver and a bus driver constituting the application interface 232 in the information processing device 230 first generates a control transfer and a USB request GET DESCRIPTOR in order to check a connected device, and passes the control transfer and the USB request to the communication control unit.

The control transfer and the USB request GET DESCRIPTOR that are IP encapsulated by an IP header and a TCP header are received by the communication control unit in the USB hub 220 composed of a communication terminal, and are IP decapsulated. The control transfer and the USB request GET DESCRIPTOR are passed to the host controller interface 225. The host controller interface 225 instructs the USB bus interface (unillustrated) to generate each packet to the device 210 over the USB bus, based on the control transfer and the USB request GET DESCRIPTOR.

The host controller interface 225 extracts a data packet received from the device 210 in a data stage as a device descriptor, and passes the data packet to the communication control unit as a control transfer and a device descriptor. The control transfer and the device descriptor that are IP encapsulated by an IP header and a TCP header are transmitted from the communication control unit in the communication terminal 220 to the communication control unit in the information processing device 230.

When the communication control unit in the information processing device passes the decapsulated control transfer and the decapsulated device descriptor to the bus driver and the class driver constituting the application interface 232, the class driver 232 notifies connected device information in response to the device input-output request by the application 231.

Similar data transmission is subsequently performed in another control transfer, a bulk transfer, an interrupt transfer, and an isochronous transfer. The host controller interface 225 and the USB bus interface 226 may be integrated into one piece of software.

<<Functional Configuration of Information Processing Device>>

Figure 4:
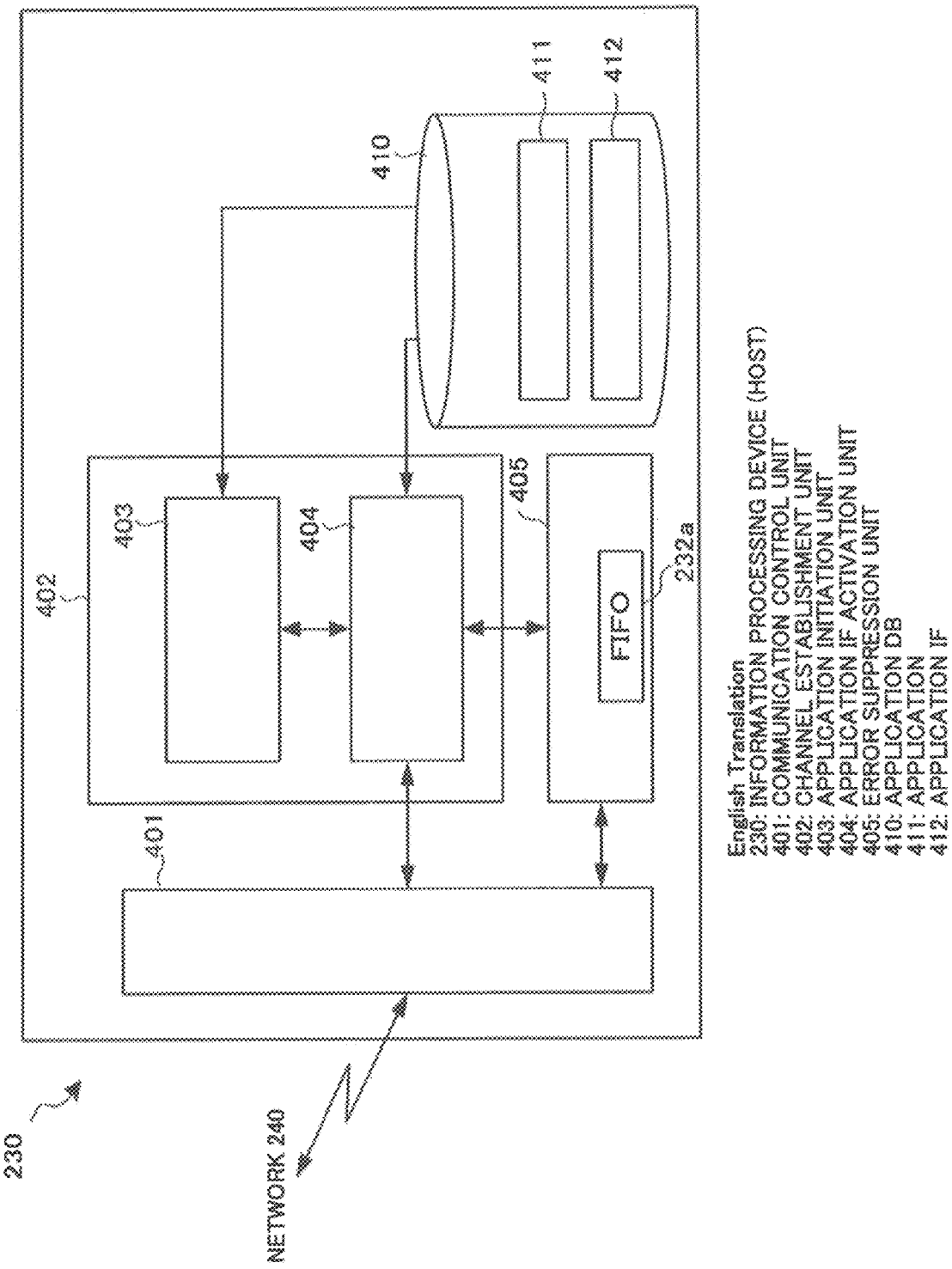
FIG. 4 is a block diagram illustrating a functional configuration of an information processing device according to the second example embodiment of the present invention.

FIG. 4 is a block diagram illustrating a functional configuration of the information processing device 230 according to the second example embodiment. Note that, in FIG. 4, functional components deeply related to an operation according to the second example embodiment are illustrated, and a regular functional component included in the information processing device 230 is not illustrated. For example, varieties of processing functions are not illustrated when the information processing device 230 is a personal computer (hereinafter PC).

The information processing device 230 includes a communication control unit 401, a channel establishment unit 402, an error suppression unit 405, and an application database (APPLICATION DB in the diagram) 410. The communication control unit 401 controls communication with the communication terminal 220 through the network 240. The channel establishment unit 402 includes an application initiation unit 403 and an application interface activation unit 404, and establishes a channel between the information processing device 230 and the communication terminal 220, and further, the USB device 210. The error suppression unit 405 includes the FIFO 232*a* and adjusts data traffic in the network 240 to prevent the occurrence of error. The application database 410 stores a plurality of applications 411 and a plurality of application interfaces 412 being part of a device driver.

The application initiation unit 403 selects an application from the application database 410 and initiates the application, in order to provide a service to a user. The application interface activation unit 404 searches the application database 410 for an application interface for providing an input-output file operation instructed by an application initiated by the application initiation unit 403, and activates the operation, <<Functional Configuration of Communication Terminal>>

Figure 5:
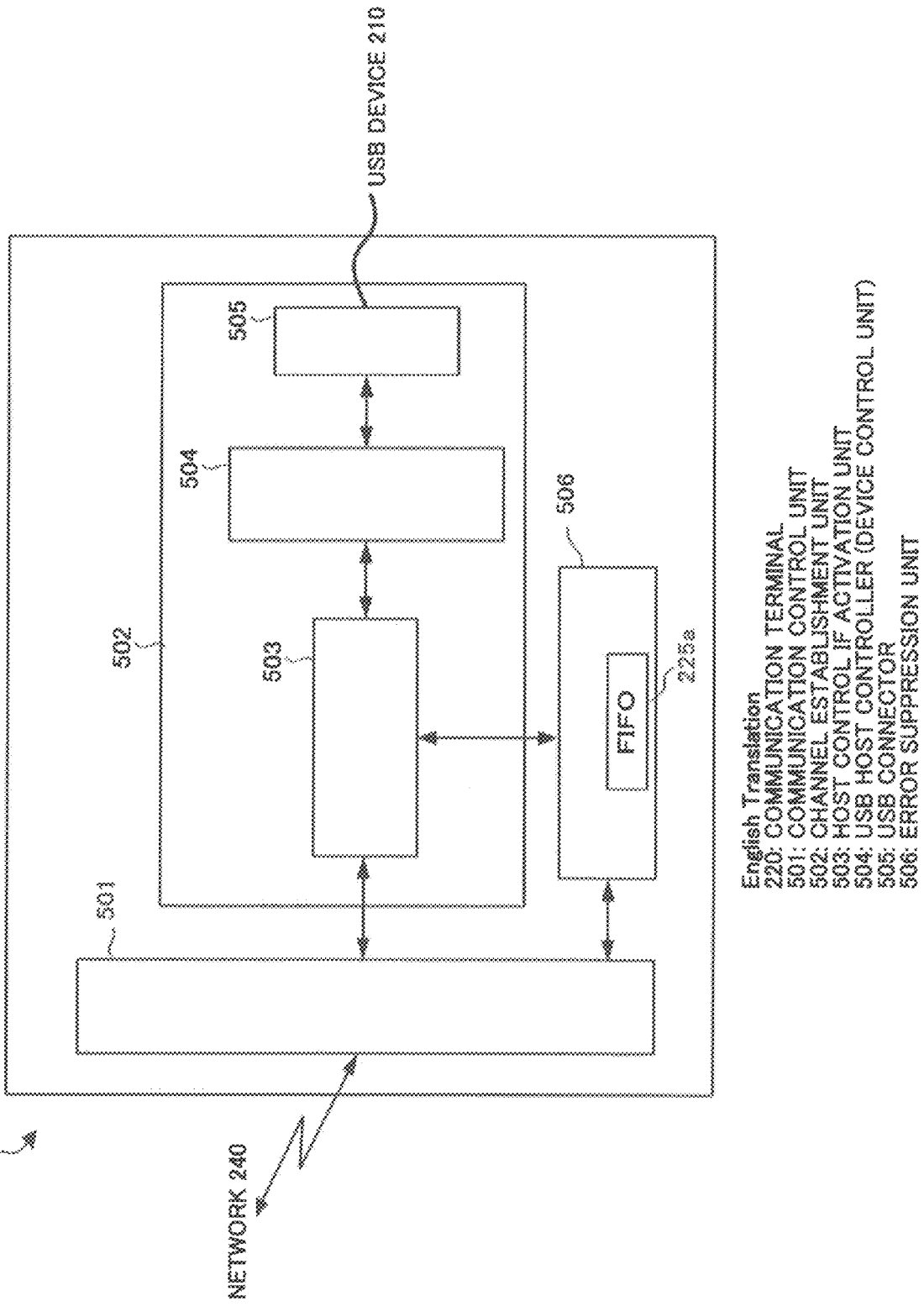
FIG. 5 is a block diagram illustrating a functional configuration of a communication terminal according to the second example embodiment of the present invention.
Figure 6:
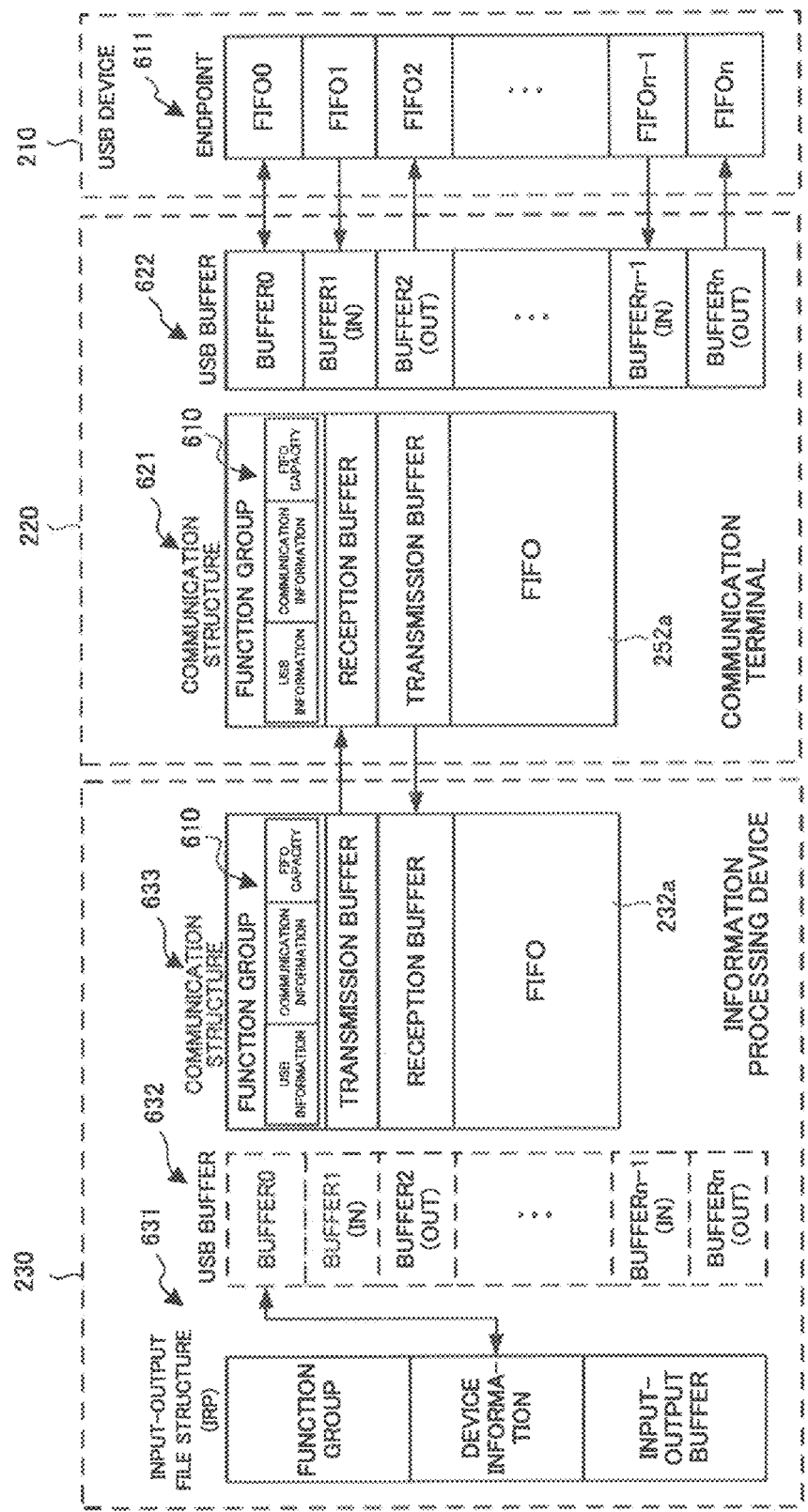
FIG. 6 is a diagram illustrating an information flow in the information processing system according to the second example embodiment of the present invention.

FIG. 5 is a block diagram illustrating a functional configuration of the communication terminal 220 according to the second example embodiment. Note that, in FIG. 5, functional components deeply related to an operation according to the second example embodiment are illustrated, and a regular functional component included in the communication terminal 220 is not illustrated. For example, varieties of processing functions are not illustrated when the communication terminal 220 is a smartphone or a tablet.

The communication terminal 220 includes a communication control unit 501, a channel establishment unit 502, and an error suppression unit 506. The communication control unit 501 controls communication with the information processing device 230 through the network 240. The channel establishment unit 502 includes a host controller interface activation unit 503, a USB host controller 504 as a device control unit, and a USB connector 505 including a SIE. The host controller interface activation unit 503 activates a host controller interface that interfaces with the USB host controller 504 being part of a device driver, in response to an input-output file operation. The USB host controller 504 controls packet switching by the USB bus interface 226, in order to provide an input-output file operation instructed by an application initiated by the application initiation unit 403. The USB connector 505 is connected to the USB cable for packet switching with the USB device 210.

The error suppression unit 506 includes the FIFO 225*a* and adjusts data traffic in the network 240 to prevent the occurrence of error.

An input-output file structure 631, a USB buffer 632, a communication structure 633, and the FIFO 232*a* are secured in the information processing device 230. The input-output file structure 631 is secured when the application software 231 instructs an input-output file operation and, for example, includes a function group performing predetermined processing according to a file storage destination, varieties of device, an input-output protocol, and the like, device information, and an input-output buffer. The USB buffer 632 includes a buffer corresponding to each endpoint secured by the application interface 232 according to processing by the function group in the input-output file structure 631, when varieties of device is a USB device. The communication structure 633 is a structure secured by the application interface 232 according to processing by the function group in the input-output file structure 631, when a device is at a remote location through the network. The communication structure 633 includes a function group for setting a protocol and a message format that are related to communication, a communication rate, and the like, a transmission buffer temporarily storing transmitted data, and a reception buffer temporarily storing received data.

For example, as a function group in the communication structure 633, a FIFO capacity table 610 storing a FIFO capacity in relation to information related to USB and information related to communication is stored to secure a proper capacity of the FIFO 232a. Such a securing procedure of the FIFO 232a is not limited to this example. A procedure of previously preparing a maximum FIFO capacity, and adjusting a capacity to be used while measuring data traffic during device control may be employed.

The USB buffer 632 is optional Data transfer may be directly performed between the input-output buffer in the input-output file structure 631, and the transmission buffer and the reception buffer in the communication structure 633.

A communication structure 621, a USB buffer 622, and the FIFO 225a are secured in the communication terminal 220. The communication structure 621 is a structure associated with the communication structure 633 secured by the application interface 232. The communication structure 621 includes a function group for setting a protocol and a message format related to communication, a communication rate, and the like, a reception buffer temporarily storing received data, and a transmission buffer temporarily storing transmitted data. The USB buffer 623 includes a buffer secured in a USB device, corresponding to each endpoint in the USB device 210.

For example, as a function group in the communication structure 621, a similar FIFO capacity table 610 storing a FIFO capacity in relation to information related to USB and information related to communication is stored to secure a proper capacity of the FIFO 225a. Such a securing procedure of the FIFO 225a is not limited to this example. A procedure of previously preparing a maximum FIFO capacity, and adjusting a capacity to be used while measuring data traffic during device control may be employed.

FIFOs 0 to n are prepared in the USB device 210 as endpoints 611 according to varieties of device.

(FIFO Capacity Table)

Figure 7A:
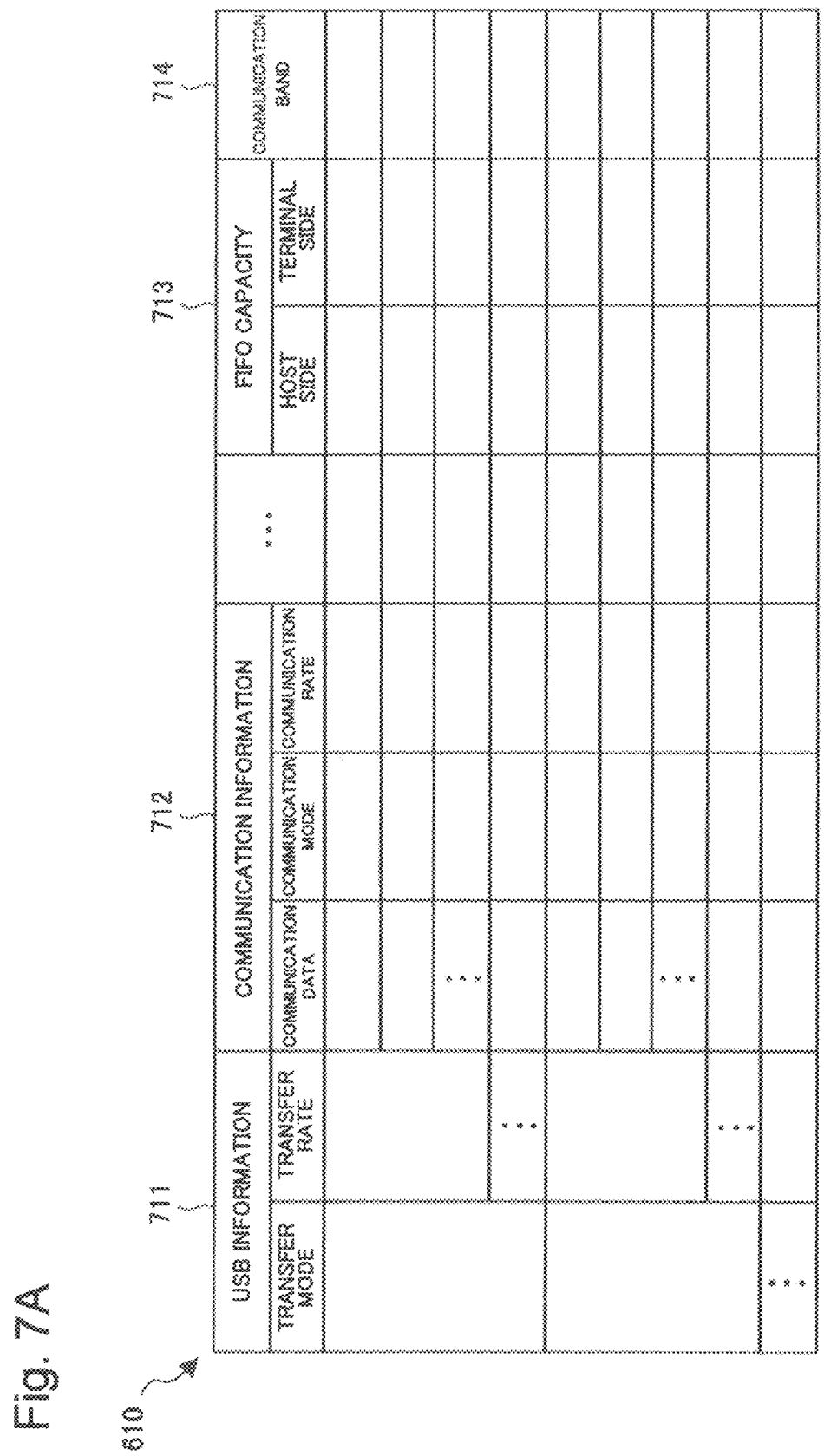
FIG. 7A is a diagram illustrating a configuration of a FIFO capacity table according to the second example embodiment of the present invention.

FIG. 7A is a diagram illustrating a structure of the FIFO capacity table 610 according to the second example embodiment. Determination of a FIFO capacity by the FIFO capacity table is not limited to FIG. 7A. Further, determination of a communication band is also added in FIG. 7A.

The FIFO capacity table 610 stores USB information 711 including a USB transfer mode and a USB transfer rate, communication information 712 including a communication data format, a communication mode, and a communication rate, a FIFO capacity 713 on the host side and the terminal side, in consideration of the USB information 711 and the communication information 712 and a communication band 714.

The FIFO capacity 713 and the communication band 714 change according to a level at which device input-output processing in the host 230 and device input-output processing in the communication terminal 220 are divided in network communication. For example, when the host 230 generates a device input-output buffer for the application 231 and the remaining device input-output processing is performed by the communication terminal 220, data communication only requires macroscopic data traffic by which device input and output in the communication terminal 220 can be maintained. By contrast, when the host 230 generates a basic format of device input-output data and the communication terminal 220 breaks down received data to perform device input and output, data communication has to be able to microscopically maintain device input and output in the communication terminal 220.

Figure 7B:
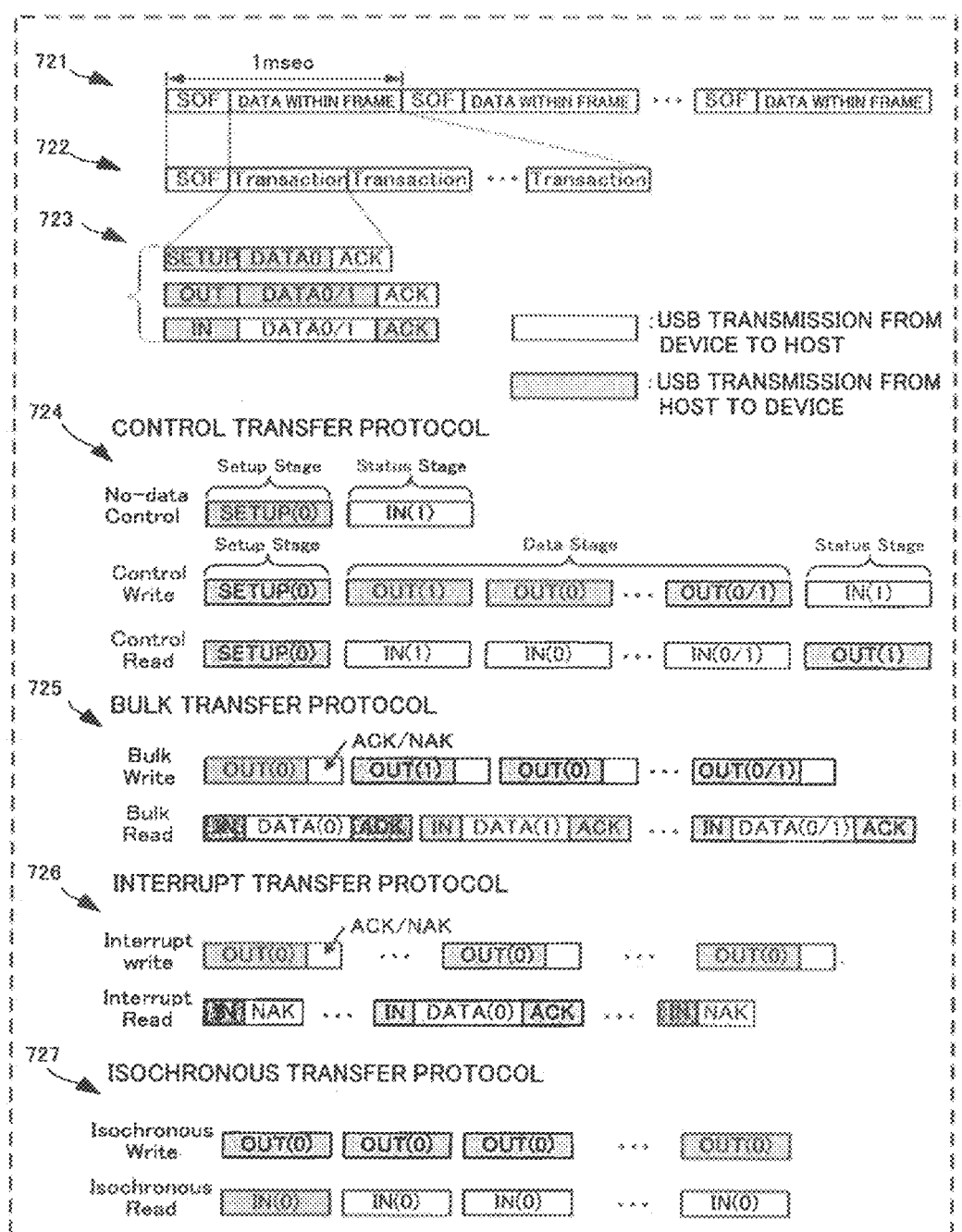
FIG. 7B is a diagram illustrating USB formats and protocols according to the second example embodiment of the present invention.

FIG. 7B is a diagram illustrating USB formats and USB protocols according to the second example embodiment. The data transfer by the communication unit according to the second example embodiment may be at any level of the following and is not limited thereto.

An overall structure 721 is composed of a plurality of frames, each frame starting from a Start of Frame (SOF) and including a transaction group being transactions grouped together, normally communicated at 1 millisecond intervals. A content communicated as communication data may be one frame or a plurality of frames. In this case, in the host 230, a transaction group is generated by a macro program (function) corresponding to each USB device 210, and is communicated to the communication terminal 220. Meanwhile, in the communication terminal 220, conversion from a frame to a transaction, and further to a packet, and data exchange with the USB device 210 are performed.

Each frame structure 722 is composed of a plurality of transaction groups, each group starting from a SOF. A transaction structure 723 includes three transmission and reception units, "SETUP," "OUT" and "IN." Further, a packet being a minimum unit of communication constituting each transaction is serially communicated through the USB cable 260. In FIG. 7B, unshaded data represent data transmitted from a device to a host computer, and shaded data represent data transmitted from the host computer to the device. A content communicated as communication data may be a plurality of transactions or per transaction. In this case, in the host 230, a transaction is generated by a program (function) for each transaction corresponding to each USB device 210, and is communicated to the communication terminal 220. In the communication terminal 220, conversion from a transaction to a packet, and data exchange with the USB device 210 are performed.

A control transfer protocol 724 is a protocol transferring a control command and a device descriptor as control data so as to generate the bidirectional default pipe 251 in FIG. 2C. The control transfer protocol 724 includes "No-data Control" not including transfer data, "Control Write" transmitting a control command to a device, and "Control Read" receiving a device descriptor and the like from the device.

A bulk transfer protocol 725 is a protocol asynchronously transferring a large amount of data so as to generate the unidirectional data pipe group 252 in FIG. 2C. The bulk transfer protocol 725 includes "Bulk Write" transmitting data to a device and "Bulk Read" receiving data from the device.

An interrupt transfer protocol 726 is a protocol transferring data apparently in response to notification from a device, by the device responding at any timing to periodic polling from a host computer, so as to generate the unidirectional data pipe group 252 in FIG. 2C. The interrupt transfer is used for data transfer when an amount of the data is small and a generation timing thereof is undetermined. The interrupt transfer protocol 726 includes "Interrupt Write" transmitting data to the device and "Interrupt Read" receiving data from the device.

An isochronous transfer protocol 727 is a protocol performing periodic data transfer so as to generate the unidirectional data pipe group 252 in FIG. 2C. The isochronous transfer protocol 727 attaches more importance to time than data reliability, and does not perform retransmission due to an error. The protocol is used for data transfer of voice, a video image of a CCD camera, and the like. The isochronous transfer protocol 727 includes "Isochronous Write" transmitting data to a device and "Isochronous Read" receiving data from the device.

Each transfer protocol may be associated with a frame, or a plurality of transfer protocols may be grouped together to form a frame. In either case, communication in various layers between the application interface 232 and the host controller interface 225 that constitute a device driver can be provided, by format negotiation between the host 230 side and the communication terminal 220 side.

<<Hardware Configuration of Information Processing Device>>

FIG. 8 is a block diagram illustrating a hardware configuration of the information processing device 230 according to the second example embodiment.

In FIG. 8, a central processing unit (CPU) 810 is a processor for arithmetic control, and provides the functional components in the information processing device 230 in FIG. 4 by executing a program. A read only memory (ROM) 820 stores initial data, fixed data for a program and the like, and a program. Further, the communication control unit 401 communicates with the communication terminal 220 through the network 240. The CPU 810 is not limited to a single CPU, and may include a plurality of CPUs or a GPU for image processing. Further, it is desirable that the communication control unit 401 include a CPU independent of the CPU 810, and write or read transmitted and received data into or from, a random access memory (RAM) 840 area. Further it is desirable that a DMAC (unillustrated) transferring data between the RAM 840 and a storage 850 be provided. Additionally, it is desirable that an input-output interface 860 include a CPU independent of the CPU 810, and write or read input-output data into or from the RAM 840 area. Accordingly, the CPU 810 processes data, recognizing that data are received by or transferred to the RAM 840. Further, the CPU 810 prepares the processing result in the RAM 840 and delegates subsequent transmission or transfer to the communication control unit 401, the DMAC, or the input-output interface 860.

The RAM 840 is a random access memory used by the CPU 810 as a work area for temporary storage. An area for storing data required for providing die second example embodiment is secured in the RAM 840. The input-output file structure 631 is a structure generated by the OS in response to an input-output file operation by the application software 231. The input-output file structure 631 includes areas for a file processing function group, an input-output flag, and an input-output buffer. The communication structure 633 is a structure for the application interface 232 to pass communication control by a communication control program 858. The communication structure 633 includes areas for a network processing function group, a transmission buffer, and a reception buffer. Additionally, for example, the communication structure 633 includes the FIFO capacity table 610 and the FIFO 232a. The USB buffer 632 is a buffer associated with a FIFO (endpoint) in the USB device 210, and includes a buffer 0 for control data and buffers 1 to n for data, according to varieties of the USB device 210, and input-output processing. The USB buffer 632 is an optional component, and data exchange may be directly performed between the input-output file structure 631 and the communication structure 633.

The storage 850 stores a database, various varieties of parameters, or the following data or programs required for providing the second example embodiment. An application storage 851 stores application software provided by the information processing device 230 in a searchable manner. A function group storage 852 stores a function used by the information processing device 230 in a searchable manner. A driver storage 853 stores a device driver, an application interface being part of the device driver, and the like in a searchable manner.

The storage 850 stores the following programs. An OS 854 is a basic program controlling the entire information processing device 230. A BIOS 855 is a basic program controlling an input-output operation of the information processing device 230. The application software 231 is an application program currently under execution by the information processing device 230. The application interface 232 is a program providing an interface with the application software 231 as part of a device driver. A communication control program 858 is a program performing communication with the communication terminal 220 by the communication control unit 401.

The input-output interface 860 provides an interface for input-output data from and to input-output equipment. The input-output interface 860 is connected to a DISPLAY 861 and an operation unit 862. Further, when a device can be used through direct connection to the information processing device 230 by a serial bus cable, a USB controller (connector) 863, a SCSI controller (connector) 864, a HDMI® controller (connector) 865, and the like may be connected. Additionally, a speaker being an audio output unit, a microphone being an audio input unit, or a GPS position determination unit may be connected.

Note that a program and data related to a general-purpose function and another performable function, being implemented on the information processing device 230, are not illustrated in the RAM 840 and the storage 850 in FIG. 8.

<<Processing Procedure of Information Processing Device>>

Figure 9A:
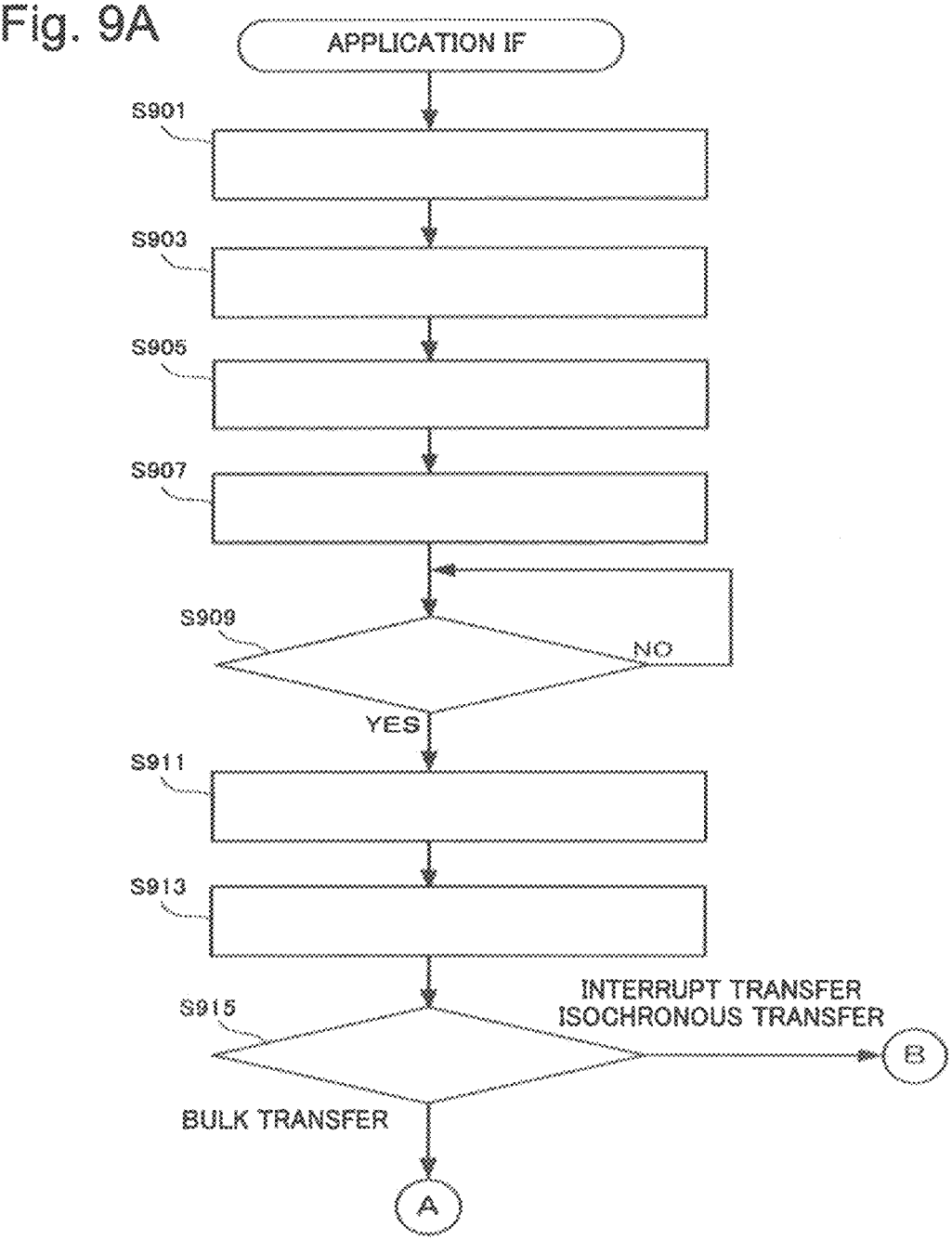
FIG. 9A is a flowchart illustrating a processing procedure of the information processing device according to the second example embodiment of the present invention.

FIGS. 9A and 9B are flowcharts illustrating a processing procedure of the information processing device 230 according to the second example embodiment. The CPU 810 in FIG. 8 executes the flowcharts using the RAM 840 to provide the functional components in FIG. 4. In FIGS. 9A and 9B, a processing procedure by the application interface 232 will be described.

In Step S901, the information processing device 230 acquires an input-output file structure passed from the application software 231. In Step S903, the information processing device 230 refers to the input-output file structure and secures a USB buffer. In Step S905, the information processing device 230 refers to the input-output file structure and generates a communication structure. In Step S907, die information processing device 230 requests a device descriptor of the USB device 210. Then, in Step S909, the information processing device 230 awaits receipt of the device descriptor of the USB device 210.

Upon receipt of the device descriptor of the USB device 210, in Step S911, the information processing device 230 sets the received device descriptor to the secured USB buffer0. Then, in Step S913, the information processing device 230 transfers the received device descriptor to the input-output file structure. Analysis of the received device descriptor is performed by the OS, the BIOS, the application interface 232, the application software 231, or cooperation of there.

Next, in USB, in Step S915, the information processing device 230 determines whether the data transfer mode is a bulk transfer, an interrupt transfer, or an isochronous transfer.

When the data transfer mode is a bulk transfer, in Step S921, the information processing device 230 instructs a bulk transfer. In Step S923, the information processing device 230 performs the data transfer between the USB buffer 632 and the input-output file structure 631. Then, in Step S925, the information processing device 230 determines whether or not the data transfer is completed, and, when the transfer is not completed, returns to Step S923 to repeat the data transfer.

By contrast, when the data transfer is an interrupt transfer or art isochronous transfer, in Step S931, the information processing device 230 instructs an interrupt transfer or an isochronous transfer. Next, in Step S933, the information processing device 230 secures the FIFO 232a based on the FIFO capacity table 610 in terms of a USB transfer mode, a USB transfer rate, a communication mode, a communication method, and the like. Then, in Step S935, the information processing device 230 performs the data transfer between the USB buffer 632 and the input-output file structure 631. In Step S937, the information processing device 230 determines whether or not the occurrence of error in communication channel data exists. When the occurrence of error in communication channel data exists, in Step S939, the information processing device 230 changes the FIFO capacity and the communication band, and returns to Step S935 to repeat the data transfer. When the occurrence of error in communication channel data does not exist, in Step S941, the information processing device 230 determines whether or not the data transfer is completed, and, when the transfer is not completed, returns to Step S935 to repeat the data transfer.

When determining that the bulk transfer is completed, or the interrupt transfer or the isochronous transfer is completed, in Step S951, the information processing device 230 acquires input-output processing status. Then, in Step S953, the information processing device 230 passes the input-output processing status to the input-output file structure to notify the status to the application software 231.

<<Hardware Configuration of Communication Terminal>>

FIG. 10 is a block diagram illustrating a hardware configuration of the communication terminal 220 according to the second example embodiment.

In FIG. 10, a CPU 1010 is a processor for arithmetic control, and provides the functional components in the communication terminal 220 in FIG. 5 by executing a program. A ROM 1020 stores initial data, fixed data for a program and the like, and a program. Further, the communication control unit 501 communicates with the information processing device 230 through the network 240. The CPU 1010 is not limited to a single CPU, and may include a plurality of CPUs or a GPU for image processing. Further, it is desirable that the communication control unit 501 include a CPU independent of the CPU 1010, and write or read transmitted and received data into or from a RAM 1040 area. Further, it is desirable that a DMAC (unillustrated) transferring data between the RAM 1040 and a storage 1050 be provided. Additionally, it is desirable that an input-output interface 1060 include a CPU independent of the CPU 1010, and write or read input-output data into or front the RAM 1040 area. Accordingly, the CPU 1010 processes data, recognizing that data are received by or transferred to the RAM 1040. Further, the CPU 1010 prepares the processing result in the RAM 1040 and delegates subsequent transmission or transfer to the communication control unit 501, the DMAC, or the input-output interface 1060.

The RAM 1040 is a random access memory used by the CPU 1010 as a work area for temporary storage. An area for storing data required for providing the second example embodiment is secured in the RAM 1040. The communication structure 621 is a structure for the host controller interface 225 to pass communication control by a communication control program 1057. The communication structure 621 includes areas for a network processing function group, a transmission buffet; and a reception buffer. Additionally, for example, the communication structure 621 includes the FIFO capacity table 610 and the FIFO 225a. The USB buffer 622 is a buffer associated with a FIFO (endpoint) in the USB device 210, and includes a buffer0 for control data and buffers 1 to n for data, according to varieties of the USB device 210, and input-output processing.

The storage 1050 stores a database, various varieties of parameters, or the following data or programs required for providing the second example embodiment. A function group storage 1051 stores a function used by the communication terminal 220 in a searchable manner. A core driver storage 1052 stores a core driver in a device driver, a host controller interface being part of the device driver, and the like in a searchable manner.

The storage 1050 stores the following programs. An OS 1053 is a basic program controlling the entire communication terminal 220. A BIOS 1054 is a basic program controlling an input-output operation of the communication terminal 220. The host controller interface 225 is a program providing an interface with the host controller, as part of the device driver. A core driver 1056 including the host controller is a program for controlling USB serial communication. A communication control program 1057 is a program performing communication with the information processing device 230 by the communication control unit 501.

The input-output interface 1060 provides an interface for input-output data from and to input-output equipment. The input-output interface 1060 is connected to a DISPLAY 1061, an operation unit 1062, and the USB controllers (connectors) 504 and 505. Further, a speaker being an audio output unit, a microphone being an audio input unit, or a GPS position determination unit may be connected.

Note that a program and data related to a general-purpose function and another performable function, being implemented on the communication terminal 220, are not illustrated in the RAM 1040 and the storage 1050 in FIG. 10.

<<Processing Procedure of Communication Terminal>>

FIGS. 11A and 11B are flowcharts illustrating a processing procedure of the communication terminal 220 according to the second example embodiment. The CPU 1010 in FIG. 10 executes the flowcharts using the RAM 1040 to provide the functional components in FIG. 5. In FIGS. 11A and 11B, a processing procedure by the host controller interface 225 will be described.

In Step S1101, the communication terminal 220 secures a USB buffer associated with a FIFO (endpoint) in the USB device 210. In Step S1103, the communication terminal 220 generates a communication structure. In Step S1105, the communication terminal 220 requests a device descriptor to the USB device 210. Then, in Step S1107, the communication terminal 220 awaits acquisition of the device descriptor from the USB device 210.

Upon acquisition of the device descriptor of the USB device 210. In Step S1109, the communication terminal 220 sets the acquired device descriptor to the secured USB buffer0. Then, in Step S1111, the communication terminal 220 transmits the acquired device descriptor to the information processing device 230.

Next, in USB, in Step S1113, the communication terminal 220 determines whether the data transfer mode is a bulk transfer, an interrupt transfer, or an isochronous transfer.

When the data transfer mode is a bulk transfer, in Step S1121, the communication terminal 220 instructs a bulk transfer. In Step S1123, the communication terminal 220 performs the data transfer between the USB buffer 622 and the USB device 210. Then, in Step S1125, the communication terminal 220 determines whether or not the data transfer is completed, and, when the transfer is not completed, returns to Step S1123 to repeat the data transfer.

By contrast, when the data transfer is an interrupt transfer or an isochronous transfer, in Step S1131, the communication terminal 220 instructs an interrupt transfer or an isochronous transfer. Next, in Step S1133, the communication terminal 220 secures the FIFO 225a based on the FIFO capacity table 610 in terms of a USB transfer mode, a USB transfer rate, a communication mode, a communication method, and the like. Then, in Step S1135, the communication terminal 220 performs the data transfer between the USB buffer 622 and the USB device 210. In Step S1137, the communication terminal 220 determines whether or not the occurrence of error in communication channel data exists. When the occurrence of error in communication channel data exists, in Step S1139, the communication terminal 220 changes the FIFO capacity and the communication band, and returns to Step S1135 to repeat the data transfer. When the occurrence of error in communication channel data does not exist, in Step S1141, the communication terminal 220 determines whether or not the data transfer is completed, and, when the transfer is not completed, returns to Step S1135 to repeat the data transfer.

When determining that the bulk transfer is completed, or the interrupt transfer or the isochronous transfer is completed, in Step S1151, the communication terminal 220 acquires device status and stores the device status into a USB buffer. Then, in Step S1153, the communication terminal 220 transmits the device status to the information processing device 230.

The second example embodiment enables a USB device connected to a remote communication terminal to be operated in a same manner as a USB device directly connected to an information processing device, and, at the same time, the occurrence of error in the data transfer through a channel is suppressed, and data can be normally input and output.

Third Example Embodiment

Next, an information processing system according to a third example embodiment of the present invention will be described. The information processing system according to the third example embodiment differs from the aforementioned second example embodiment in performing a communication test before remote device input-output processing, determining whether or not a communication channel data error occurs in the device input and output, and setting a FIFO capacity and a communication band so as to prevent occurrence of a communication channel data error. That is to say, the data transfer through a data channel is communication tested, and the occurrence of error is suppressed based on the communication test result. The remaining configuration and operation are similar to the second example embodiment, and therefore a same configuration and a same operation are respectively given same reference signs, and detailed description thereof is omitted.

<<System Overview>>

FIG. 12 is a diagram illustrating an overview of an information processing system 1200 according to the third example embodiment. In FIG. 12, a same reference sign is given to a component similar to a component in FIG. 2B, and description thereof is omitted.

The information processing system 1200 includes an OS (application) 231 executed on a host computer, a device driver 1201, and a USB bus interface 226. The device driver 1201 includes a communication test function 1202 transmitting a test packet (TEST PKT) from an application interface 232 to a host controller interface 225 through a network 240 to test communication status. A communication time can be measured by a test packet with a time stamp or a serial number.

The communication test function 1202 causes a test packet with a single-packet capacity to make a round trip through a communication channel, tests delay and jitter in the first half or delay and jitter in the second half, and prevents occurrence of a communication channel data error by setting each capacity and communication band of the FIFO 232a and the FIFO 225a based on the test result.

Instead of measuring a communication time by looping back a test packet with a single-packet capacity, traffic enabling stable communication and device input and output may be grasped by gradually increasing data traffic. Further, components providing jitter absorption and data traffic adjustment are not limited to the FIFO 232a and the FIFO 225a. Other components such as a rotation memory and time division multiplexing (TDM) may be employed.

With such a configuration, the host computer is able to control a device at a remote location similarly to a device directly connected to a local bus I/F or a local serial I/F. Additionally, since a communication test is previously performed, data can be normally input and output without the occurrence of error in the data transfer through a channel, even when a serial communication bus is extended by network communication.

<<Functional Configuration of Information Processing Device>>

Figure 13A:
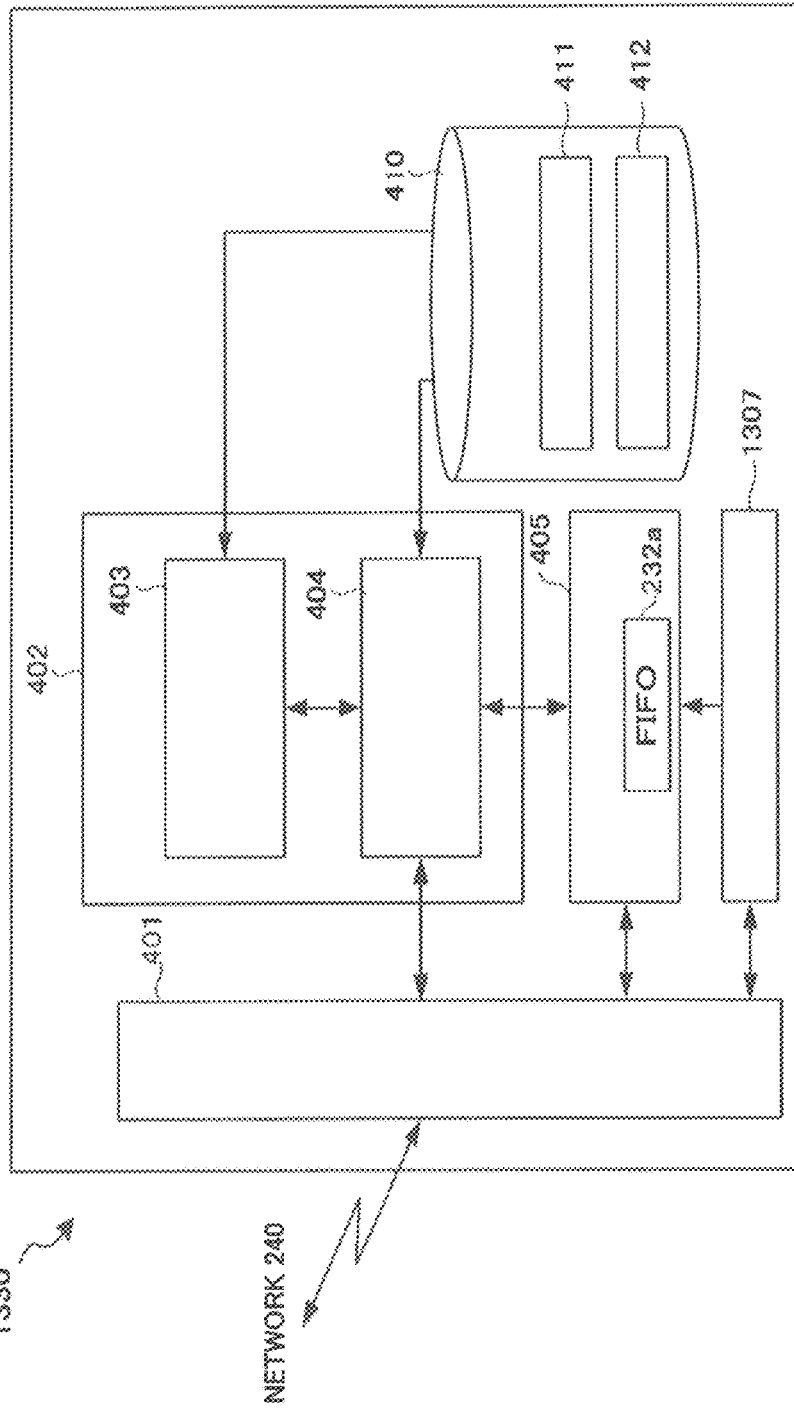
FIG. 13A is a block diagram illustrating a functional configuration of an information processing device according to the third example embodiment of the present invention.

FIG. 13A is a block diagram illustrating a functional configuration of an information processing device 1330 according to the third example embodiment. Note that, in FIG. 13A, a same reference sign is given to a functional component similar to FIG. 4, and description thereof is omitted.

A communication test unit 1307 causes a test packet with a single-packet capacity to make a round trip through a communication channel through the communication control unit 401, tests delay and jitter in the first half or delay and jitter in the second half, and properly sets a capacity and a communication band of the FIFO 232a included in the error suppression unit 405.

(Communication Test Unit)

FIG. 13B is a block diagram illustrating a functional configuration of the communication test unit 1307 according to the third example embodiment. The functional configuration of the communication test unit 1307 is not limited to FIG. 13B.

The communication test unit 1307 includes a single-packet transmission unit 1131, a destination reception time acquisition unit 1312, and a transmitted packet reception time acquisition unit 1313. Further, the communication test unit 1307 includes a transmission delay calculation unit 1314, a loop delay calculation unit 1315, a USB information acquisition unit 1316, and a communication information acquisition unit 1317. Further, the communication test unit 1307 includes a FIFO capacity and communication band control unit 1318, a FIFO capacity change unit 1320, and a communication band change unit 1321.

The single-packet transmission unit 1311 transmits a packet including a time stamp and a serial number for testing. The destination reception time acquisition unit 1312 receives a response including a test packet reception time from the communication terminal 220 being a destination. The transmitted packet reception time acquisition unit 1313 receives a looped back packet and acquires a loop time based on a time stamp and a serial number.

The transmission delay calculation unit 1314 calculates a transmission delay time from transmission and reception times obtained by the single-packet transmission unit 1311 and the destination reception time acquisition unit 1312. The loop delay calculation unit 1315 calculates a loop delay time from transmission and reception times obtained by the single-packet transmission unit 1311 and the transmitted packet reception time acquisition unit 1313. The USB information acquisition unit 1316 acquires USB information including a USB transfer mode and a USB transfer rate, in relation to connection of an input-output controlled device. The communication information acquisition unit 1317 acquires communication information including a communication mode and a communication rate in the network and the like.

The FIFO capacity and communication band control unit 1318 includes a control table 1319, and controls a FIFO capacity and a communication band based on calculation results by the transmission delay calculation unit 1314 and the loop delay calculation unit 1315, and acquired information by the USB information acquisition unit 1316 and the communication information acquisition unit 1317. The FIFO capacity change unit 1320 changes a FIFO capacity to a proper value based on a test result. Meanwhile, the communication band change unit 1321 changes a communication band to a proper value i based on the test result.

(Control Table)

Figure 14:
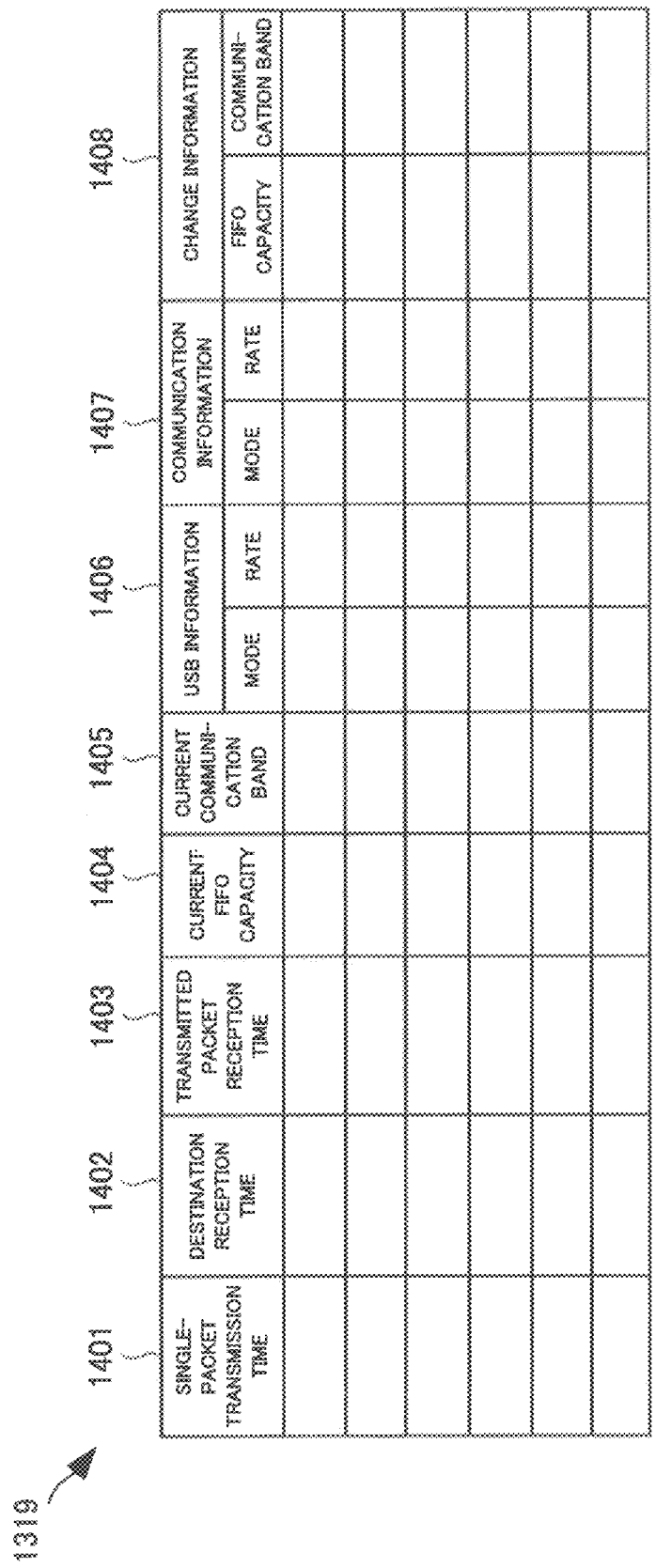
FIG. 14 is a diagram illustrating a structure of a control table of a FIFO capacity and a communication band, according to the third example embodiment of the present invention.

FIG. 14 is a diagram illustrating a structure of the control table 1319 of a FIFO capacity and a communication band, according to the third example embodiment. The control table 1319 is a table used for determining a proper FIFO capacity and a proper communication band, based, on a test communication result of a test packet, in the FIFO capacity and communication band control unit 1318.

The control table 1319 stores a single-packet transmission time 1401, a destination reception time 1402, a transmitted packet reception time 1403, a current FIFO capacity 1404, and a current communication band 1405. Further, the control table 1319 stores acquired USB information 1406 and acquired communication information 1407. The control table 1319 stores change information 1408 including a new FIFO capacity and a new communication band, in association with the respective aforementioned test results and the acquired information.

In addition to being generated in the RAM 840 and used for setting a proper FIFO capacity and a proper communication band, such a control table 1319 may be accumulated and further used for subsequent setting of a proper FIFO capacity and a proper communication band.

<<Processing Procedure of Information Processing Device>>

Figure 15:
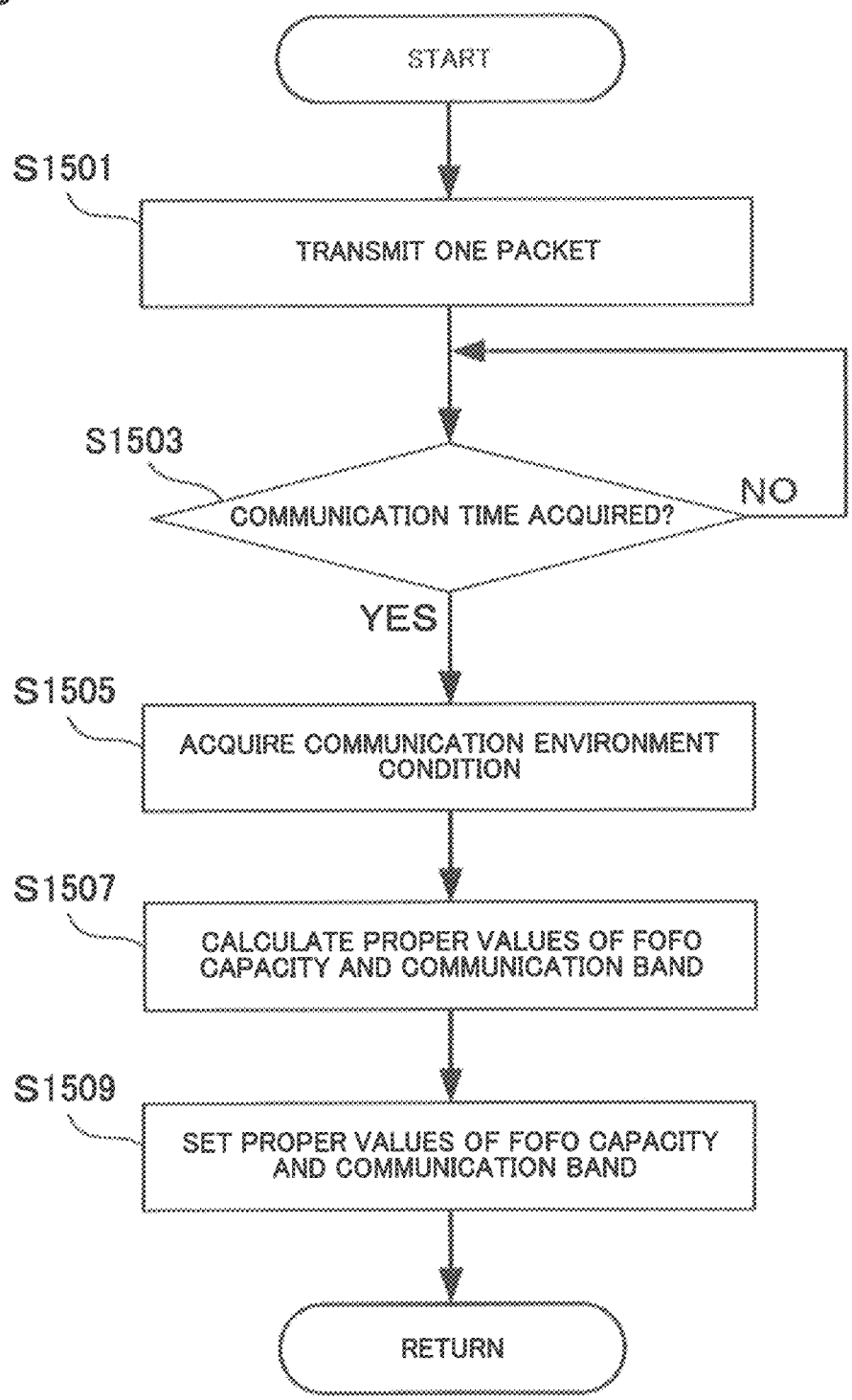
FIG. 15 is a flowchart illustrating a processing procedure of the information processing device according to the third example embodiment of the present invention.

FIG. 15 is a flowchart illustrating a processing procedure of the information processing device 1330 according to the third example embodiment. FIG. 15 illustrates a processing procedure of setting a proper FIFO capacity and a proper communication band by test transmission of a test packet according to the third example embodiment, and the remaining processing procedure is similar to FIGS. 9A and 9B.

In Step S1501, the information processing device 1330 transmits a test packet to a communication terminal for device connection. Then, in Step S1503, the information processing device 1330 awaits acquisition of a communication time including a transmission time or a loop time.

Upon acquisition of a communication time including a transmission time or a loop time, in Step S1505, the information processing device 1330 acquires a communication environment condition including USB information and communication information. Next, in Step S1507, the information processing device 1330 calculates a proper FIFO capacity and a proper communication band based on the communication time obtained by the test and the communication environment condition. Then, in Step S1509, the information processing device 1330 sets the calculated proper values of the FIFO capacity and the communication band.

The third example embodiment previously performs a communication test, and therefore is able to normally input and output data without the occurrence of error in the data transfer through a channel, even when a serial communication bus is extended by network communication.

<<Application to Other Information Processing Systems>>

Other information processing systems applying remote device control according to the second or third example embodiment will be described below. A similar effect can be provided in the information processing systems.

(Application to USB Hub)

Figure 16:
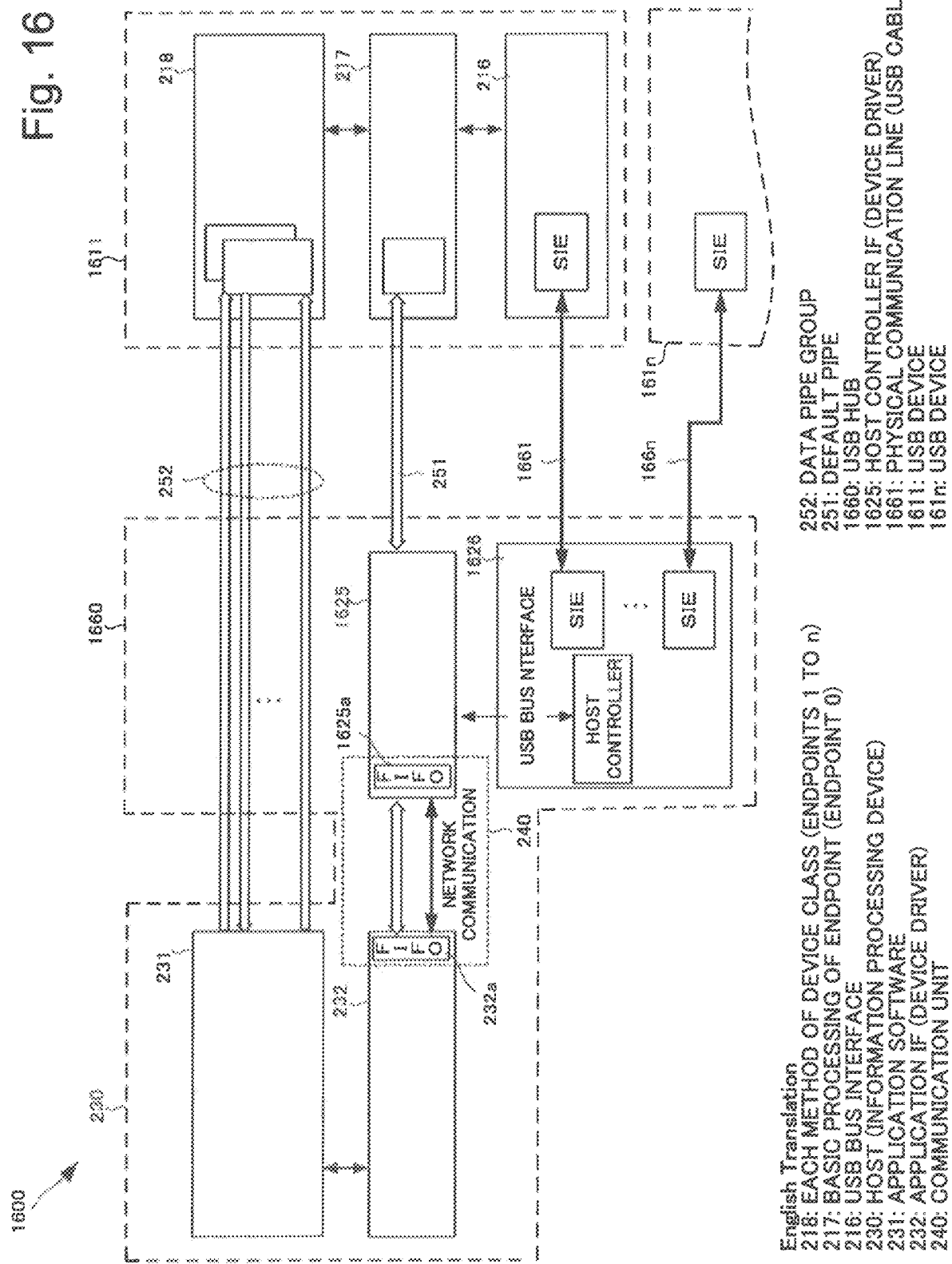
FIG. 16 is a block diagram illustrating a functional configuration of an information processing system applying the present example embodiment to a USB hub.

FIG. 16 is a block diagram illustrating a functional configuration of an information processing system 1600 applying the third example embodiment to a USB hub. Note that, in FIG. 16, a same reference sign is given to a component similar to a component its FIG. 2C, and description thereof is omitted.

The information processing system 1600 includes a USB hub 1660 and a plurality of USB devices 1611 to 161n. The USB hub 1660 includes a host controller interface 1625 and a USB bus interface 1626 branching into a plurality of SIEs. The host controller interface 1625 has a function for branching into a plurality of USB cables. Further, the respective plurality of SIEs are connected to respective SIEs in a plurality of USB devices 1611 to 161n through a plurality of USB cables 1661 to 166n.

Further, an application interface 232 in a host 230 as an information processing device includes a FIFO 232a adjusting communication channel data traffic, and a host controller interface 1625 in the USB hub 1660 includes a FIFO 1625a adjusting communication channel data traffic.

(Application to HDMI®)

Figure 17:
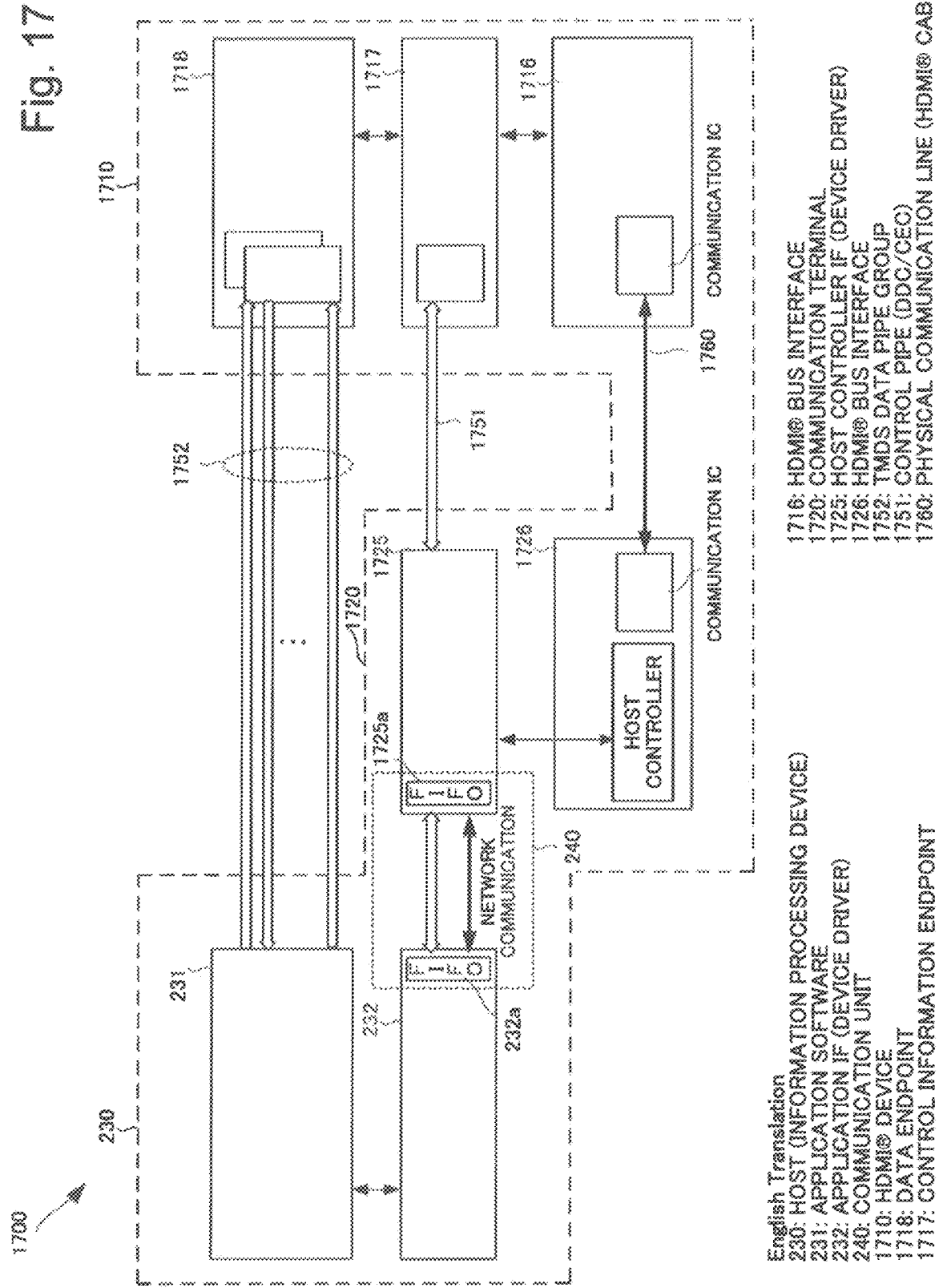
FIG. 17 is a block diagram illustrating a functional configuration of an information processing system applying the present example embodiment to HDMI®.

FIG. 17 is a block diagram illustrating a functional configuration of an information processing system 1700 applying the third example embodiment to HDMI®. Note that, in FIG. 17, a same reference sign is given to a component similar to a component in FIG. 2C, and description thereof is omitted.

The information processing system 1700 in FIG. 17 includes a host 230 as an information processing device, a remote communication terminal 1720 connected to the host 230 through a network 240, and a HDMI® device 1710 connected to a HDMI® connector on the communication terminal 1720.

The communication terminal 1720 includes, as software, a host controller interface 1725 as part of a device driver, and a HDMI® bus interface 1726 including a host controller and a communication IC. The host controller interface 1725 passes a command, data, and the like, conforming to a HDMI® protocol and being received from an application interface 232 through the network 240, to the host controller in the HDMI® bus interface 1726 in a format understandable to the host controller. Further, the host controller interface 1725 transmits data, device status, and the like, being passed from the host controller in the HDMI® bus interface 1726, to the application interface 232 through the network 240. The host controller in the HDMI® bus interface 1726 performs serial communication through a HDMI® cable 1760 based on a HDMI® protocol, while exchanging a command, data, and the like with the host controller interface 1725. The communication IC in the HDMI® bus interface 1726 controls a signal over the HDMI® cable 1760 based on a HDMI® communication specification.

Further, the application interface 232 in the host 230 includes a FIFO 232a adjusting communication channel data traffic, and the host controller interface 1725 in the communication terminal 1720 includes a FIFO 1725a adjusting communication channel data traffic.

The HDMI® device 1710 includes, as software, a HDMI® bus interface 1716 in the HDMI® device 1710 that is connected to the HDMI® bus interface 1726 in the communication terminal 1720 through the HDMI® cable 1760 and exchanges a signal with the HDMI® bus interface 1726. Further, the HDMI® device 1710 includes a control information endpoint 1717 storing a descriptor including device information and control information, and an endpoint 1718 storing input-output data.

By such connection, the communication terminal 1720 and the HDMI® device 1710 perform physical-level communication by the own HDMI® bus interfaces 1726 and 1716. Further, by a system-level control transfer through the application interface 232, the network 240, and the host controller interface 1725, control communication as basic processing is provided between application software 231 and the endpoint 1717 through a control pipe (DDC/CEC) 1751. Further, in an application-level data transfer, TMDS data communication as each method of a device class is provided without a communication channel data error between the application software 231 and the endpoint 1718 through a data pipe group 1752.

As described above, a unified communication channel (pipe) can be formed by network communication between the application interface 232 in the host 230 and the host controller interface 1725 in the communication terminal 1720 through the network 240, and serial communication between the HDMI® bus interfaces 1726 and 1716 through the HDMI® cable. Additionally, the occurrence of error in communication channel data can be suppressed.

(Application to SCSI)

Figure 18:
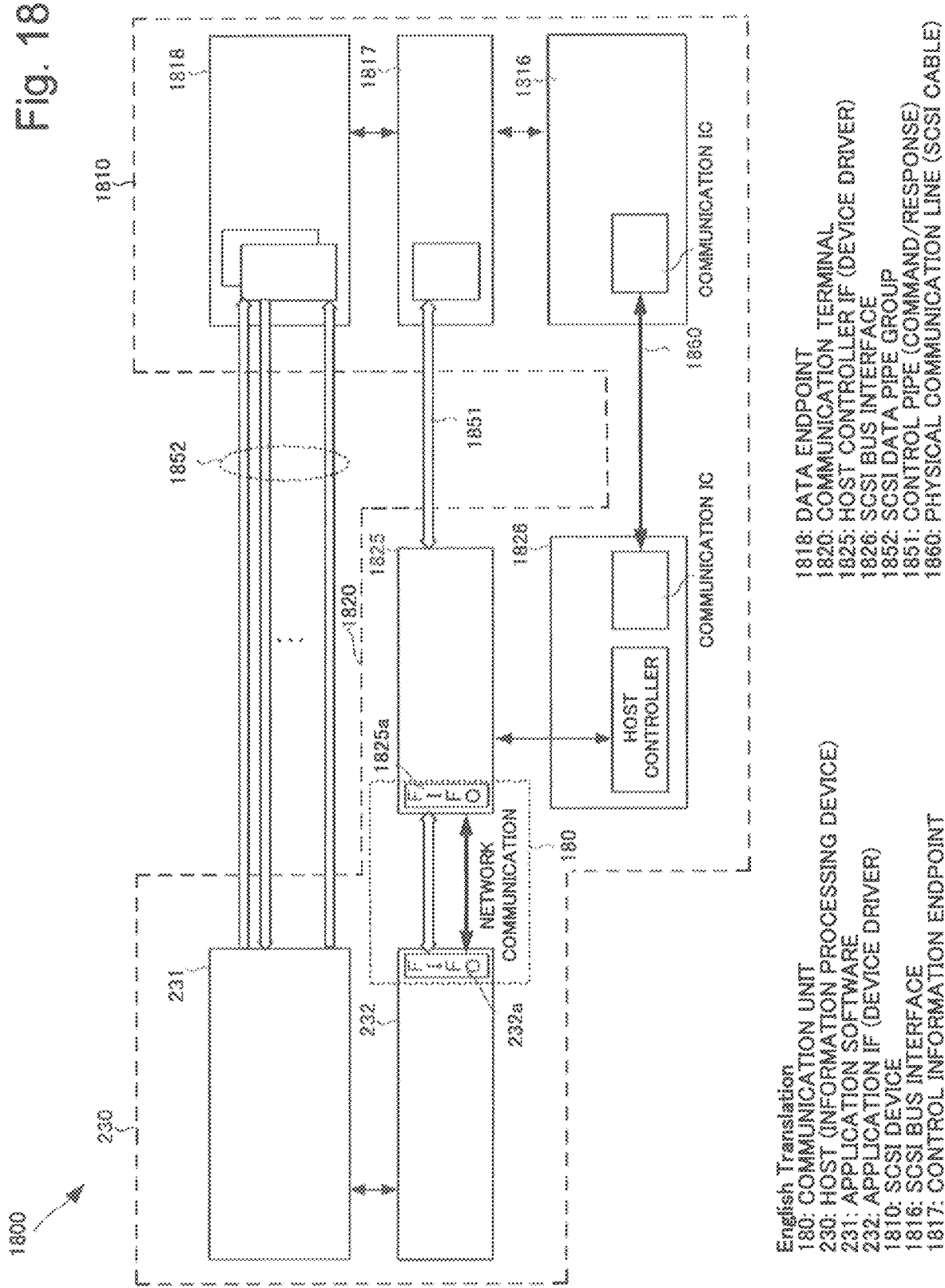
FIG. 18 is a block diagram illustrating a functional configuration of an information processing system applying the present example embodiment to SCSI.

FIG. 18 is a block diagram illustrating a functional configuration of an information processing system 1800 applying the third example embodiment to SCSI Note that, in FIG. 18, a same reference sign is given to a component similar to a component in FIG. 2C, and description thereof is omitted.

The information processing system 1800 in FIG. 18 includes a host 230 as an information processing device, a remote communication terminal 1820 connected to the host 230 through a network 240, and a SCSI device 1810 connected to a SCSI connector on the communication terminal 1820.

The communication terminal 1820 includes, as software, a host controller interface 1825 as part of a device driver, and a SCSI bus interface 1826 including a host controller and a communication IC. The host controller interface 1825 passes a command, data, and the like, conforming to a SCSI protocol and being received from an application interface 232 through the network 240, to the host controller in the SCSI bus interface 1826 in a format understandable to the host controller. Further, the host controller interface 1825 transmits data, device status, and the like, being passed from the host controller in the SCSI bus interface 1826, to the application interface 232 through the network 240. The host controller in the SCSI bus interface 1826 performs serial communication through a SCSI cable 1860 based on a SCSI protocol, while exchanging a command, data, and the like with the host controller interface 1825. The communication IC in the SCSI bus interface 1826 controls a signal over the SCSI cable 1860 based on a SCSI communication specification.

Further, the application interface 232 in the host 230 includes a FIFO 232a adjusting communication channel data traffic, and the host controller interface 1825 in the communication terminal 1820 includes a FIFO 1825a adjusting communication channel data traffic.

The SCSI device 1810 includes, as software, a SCSI has interface 1816 in the SCSI device 1810 that is connected to the SCSI bus interface 1826 in the communication terminal 1820 through the SCSI cable 1860 and exchanges a signal with the SCSI bus interface 1826. Further, the SCSI device 1810 includes a control information endpoint 1817 storing a descriptor including device information and control information, and an endpoint 1818 storing input-output data.

By such connection, the communication terminal 1820 and the SCSI device 1810 perform physical-level communication by the own SCSI bus interfaces 1826 and 1816. Further, by a system-level control transfer through the application interface 232, the network 240, and the host controller interface 1825, control communication as basic processing is provided between application software 231 and the control information endpoint 1817 through a control pipe (SCSI command/SCSI response) 1851. Further, in an application-level data transfer, data communication as each method of a device class is provided without a communication channel data error between the application software 231 and the endpoint 1818 through a data pipe group 1852.

As described above, a unified communication channel (pipe) can be formed by network communication between the application interface 232 in the host 230 and the host controller interface 1825 in the communication terminal 1820 through the network 240, and serial communication between the SCSI bus interfaces 1826 and 1816 through the SCSI cable. Additionally, the occurrence of error in communication channel data can be suppressed.

(Application to SD Card)

Figure 19:
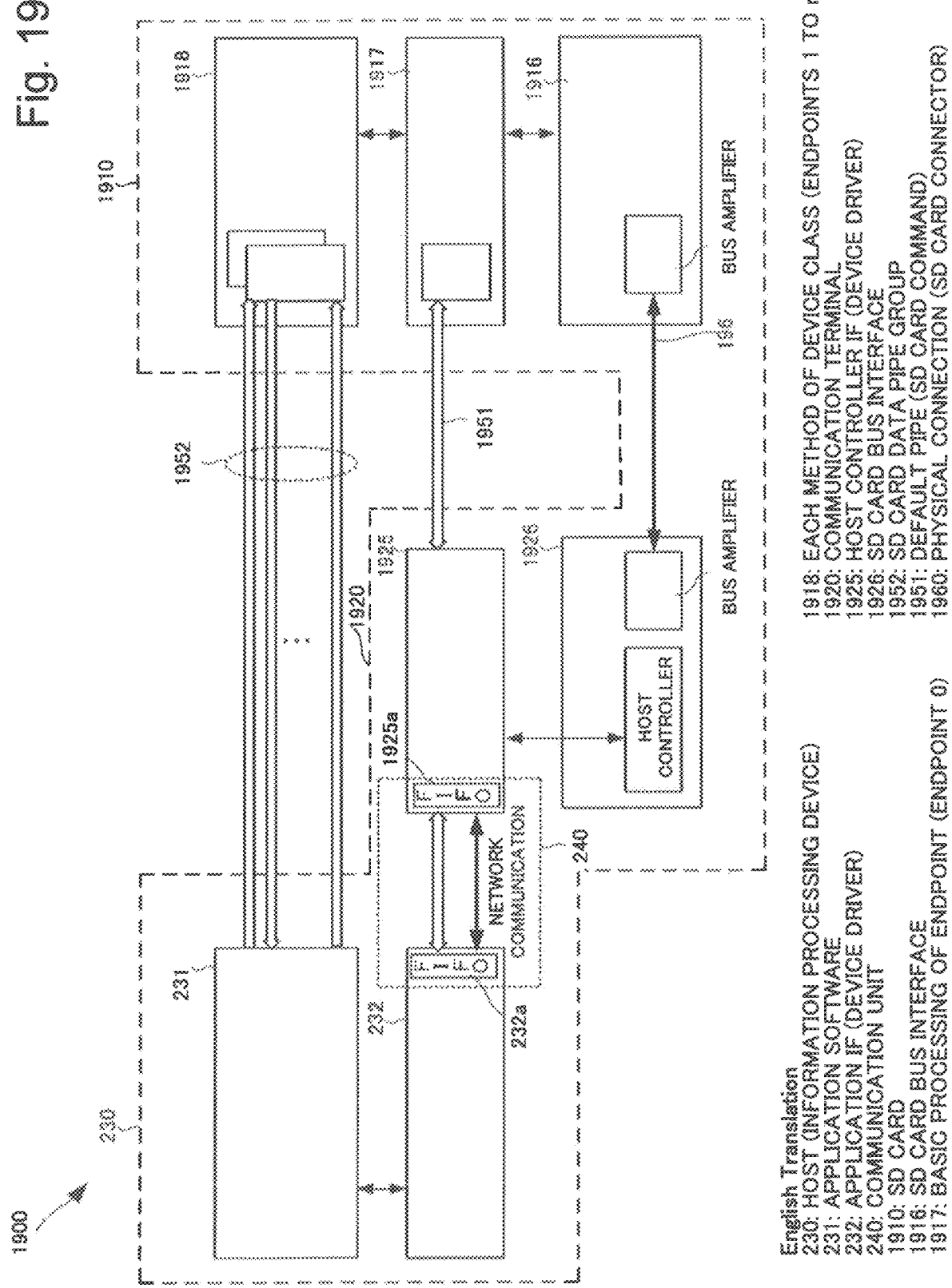
FIG. 19 is a block diagram illustrating a functional configuration of an information processing system applying the present example embodiment to a SD card.

FIG. 19 is a block diagram illustrating a functional configuration of an information processing system 1900 applying the third example embodiment to a SD card. Note that, in FIG. 19, a same reference sign is given to a component similar to a component in FIG. 2C, and description thereof is omitted.

The information processing system 1900 in FIG. 19 includes a host 230 as an information processing device, a remote communication terminal 1920 connected to the host 230 through a network 240, and a SD card 1910 connected to a connector on the communication terminal 2620.

The communication terminal 1920 includes, as software, a host controller interface 1925 as part of a device driver, and a SD card bus interface 1926 including a host controller and a bus amplifier. The host controller interface 1925 passes a command, data, and the like, conforming to a SD card protocol and being received from an application interface 232 through the network 240, to the host controller in the SD card bus interface 1926 in a format understandable to the host controller. Further, the host controller interface 1925 transmits data, device status, and the like, being passed from the host controller in the SD card bus interface 1926, to the application interface 232 through the network 240. The host controller in the SD card bus interface 1926 performs serial communication through a SD card connector 1960 based on a SD card protocol, while exchanging a command, data, and the like with the host controller interface 1925. The bus amplifier in the SD card bus interface 1926 controls a signal on the SD card connector 1960 based a SD card communication specification.

Further, the application interface 232 in the host 230 includes a FIFO 232a adjusting communication channel data traffic, and the host controller interface 1925 in the communication terminal 1920 includes a FIFO 1925a adjusting communication channel data traffic.

The SD card 1910 includes, as software, a SD card bus interface 1916 in the SD card 1910 that is connected to the SD card bus interface 1926 in the communication terminal 1920 through the SD card connector 1960 and exchanges a signal with the SD card bus interface 1926. Further, the SD card 1910 includes a control information endpoint 1917 storing a descriptor including device information and control information, and an endpoint 1918 storing input-output data.

By such connection, the communication terminal 1920 and the SD card 1910 perform physical-level communication by the own SD card bus interfaces 1926 and 1916. Further, by a system-level control transfer through the application interface 232, the network 240, and the host controller interface 1925, control communication as basic processing is provided between application software 231 and the control information endpoint 1917 through a control pipe (SD card command) 1951. Further, in an application-level data transfer, data communication as each method of a device class is provided without a communication channel data error between the application software 231 and the endpoint 1918 through a data pipe group 1952.

As described above, a unified communication channel (pipe) can be formed by network communication between the application interface 232 in the host 230 and the host controller interface 1925 in the communication terminal 1920 through the network 240, and serial communication between the SD card bus interfaces 1926 and 1916 through the SD card connector. Additionally, the occurrence of error in communication channel data can be suppressed.

(Application to Equipment Sharing System)

Figure 20:
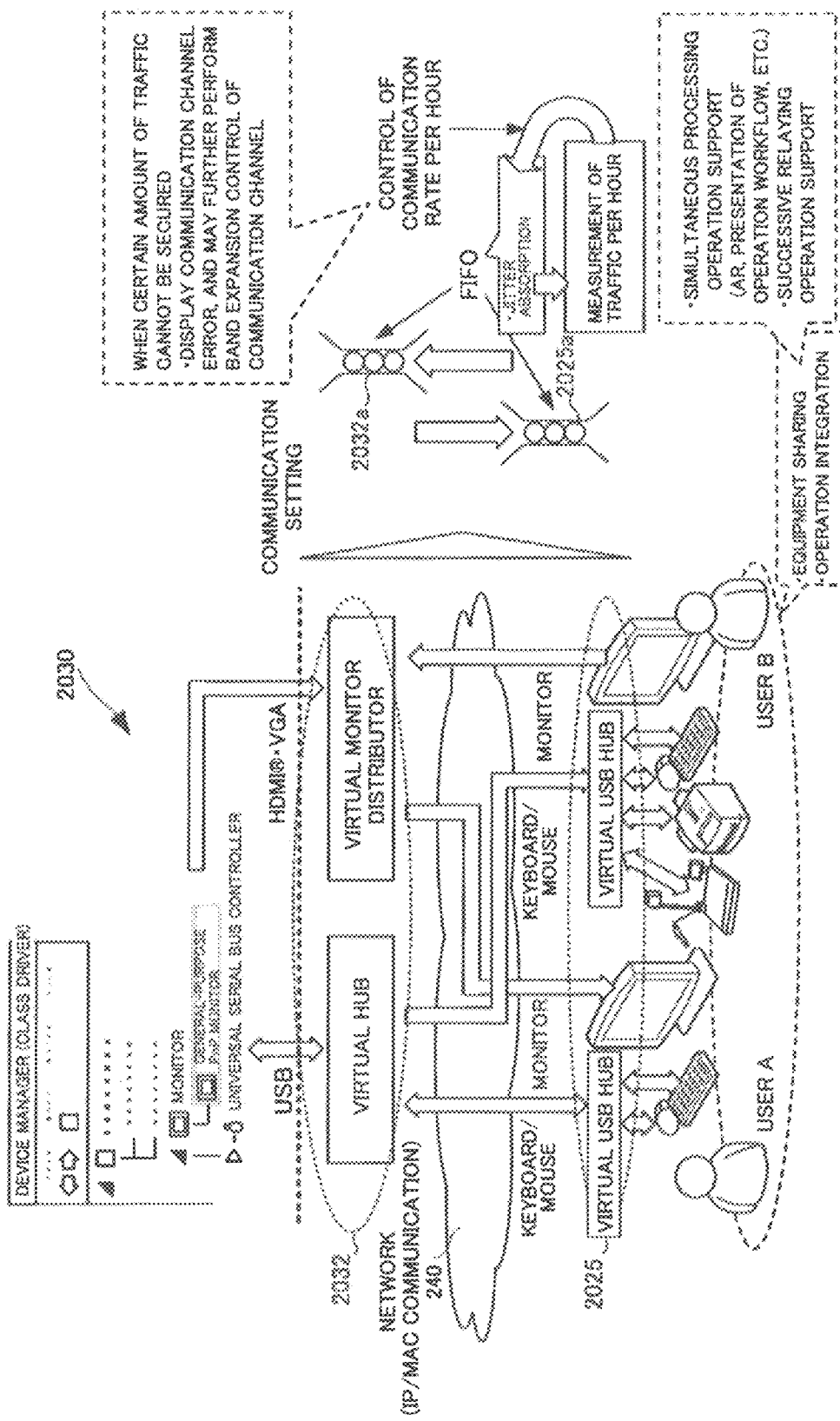
FIG. 20 is a block diagram illustrating a functional configuration of an information processing system applying the present example embodiment to an equipment sharing system.

FIG. 20 is a block diagram illustrating a functional configuration of an information processing system 2000 applying the third example embodiment to an equipment sharing system. Note that, in FIG. 20, a same reference sign is given to a component similar to a component in FIG. 2B, and description thereof is omitted.

FIG. 20 illustrates a conference system formed by a plurality of users A and B sharing a virtual PC 2030 with keyboards, mice (pointing devices), and monitors, and also sharing a printer and a document camera through a USB hub.

In FIG. 20, a unified communication channel (pipe) can also be formed between the virtual PC 2030 and each device by communicably connecting an application interface 2032 such as a virtual HUB and a virtual monitor distributor on the virtual PC 2030 side, and a host controller interface 2025 including a virtual USB HUB, through a network 240.

Furthermore, the occurrence of error in communication channel data can be suppressed by the application interface 2032 including a FIFO 2032a adjusting communication channel data traffic, and the host controller interface 2025 including a FIFO 2025a adjusting communication channel data traffic.

Fourth Example Embodiment

Next, an information processing system according to a fourth example embodiment of the present invention will be described. The information processing system according to the Fourth example embodiment differs from the aforementioned second and third example embodiments in that a setting parameter in a cloud server and the like being connected to a device is accumulated as knowledge to provide a proper setting parameter. That is to say, a parameter set for error suppression is accumulated, and, when a channel is established, a parameter selected and acquired from the accumulated parameter is set for error suppression. The remaining configuration and operation are similar to the second and third example embodiments, and therefore a same configuration and a same operation are respectively given same reference signs, and detailed description thereof is omitted.

<<Configuration of Information Processing System>>

Figure 21:
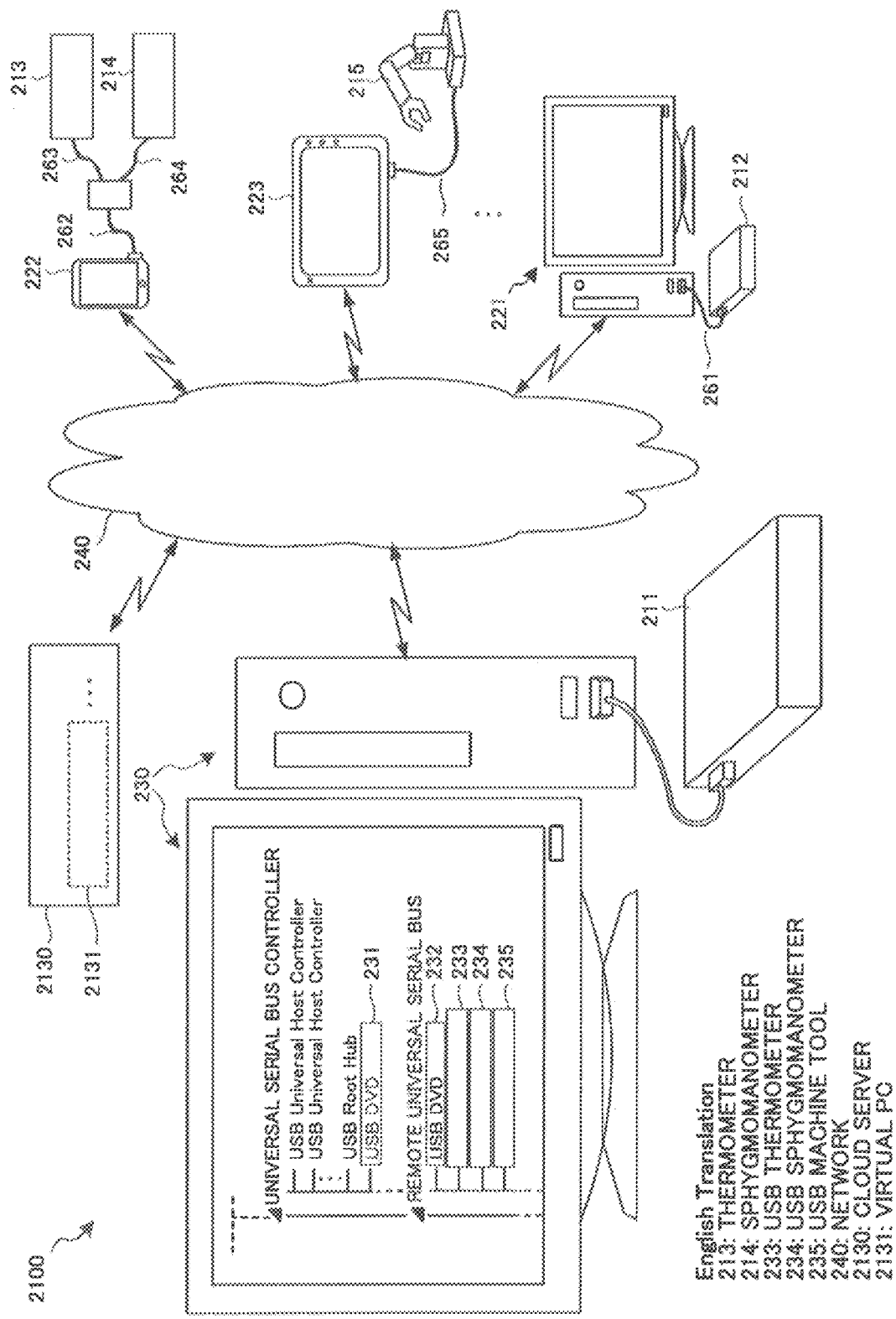
FIG. 21 is a block diagram illustrating a configuration of an information processing system according to a fourth example embodiment of the present invention.

FIG. 21 is a block diagram illustrating a configuration of an information processing system 2100 according to the fourth example embodiment. Note that, in FIG. 21, a same reference sign is given to a component similar to a component in FIG. 2A, and description thereof is omitted.

A cloud server 2130 accumulates system parameters set in device input and output, from a host 230, communication terminals 221 to 223, or a locally formed virtual PC 2131. The system parameters include a proper transfer level, a proper communication mode, a proper communication band, a proper FIFO capacity, and the like, in association with varieties of device, a data transfer mode and a transfer rate of a connected bus, a communication mode and a communication rate in the network 240, and the like.

When controlling a device connected to the communication terminals 221 to 223 by the local virtual PC 2131, the cloud server 2130 searches for and sets a proper system parameter based on a connection condition. Further, in response to a system parameter request from the host 230, the cloud server 2130 searches for and notifies a proper system parameter based on a connection condition.

<<Functional Configuration of Cloud Server>>

Figure 22:
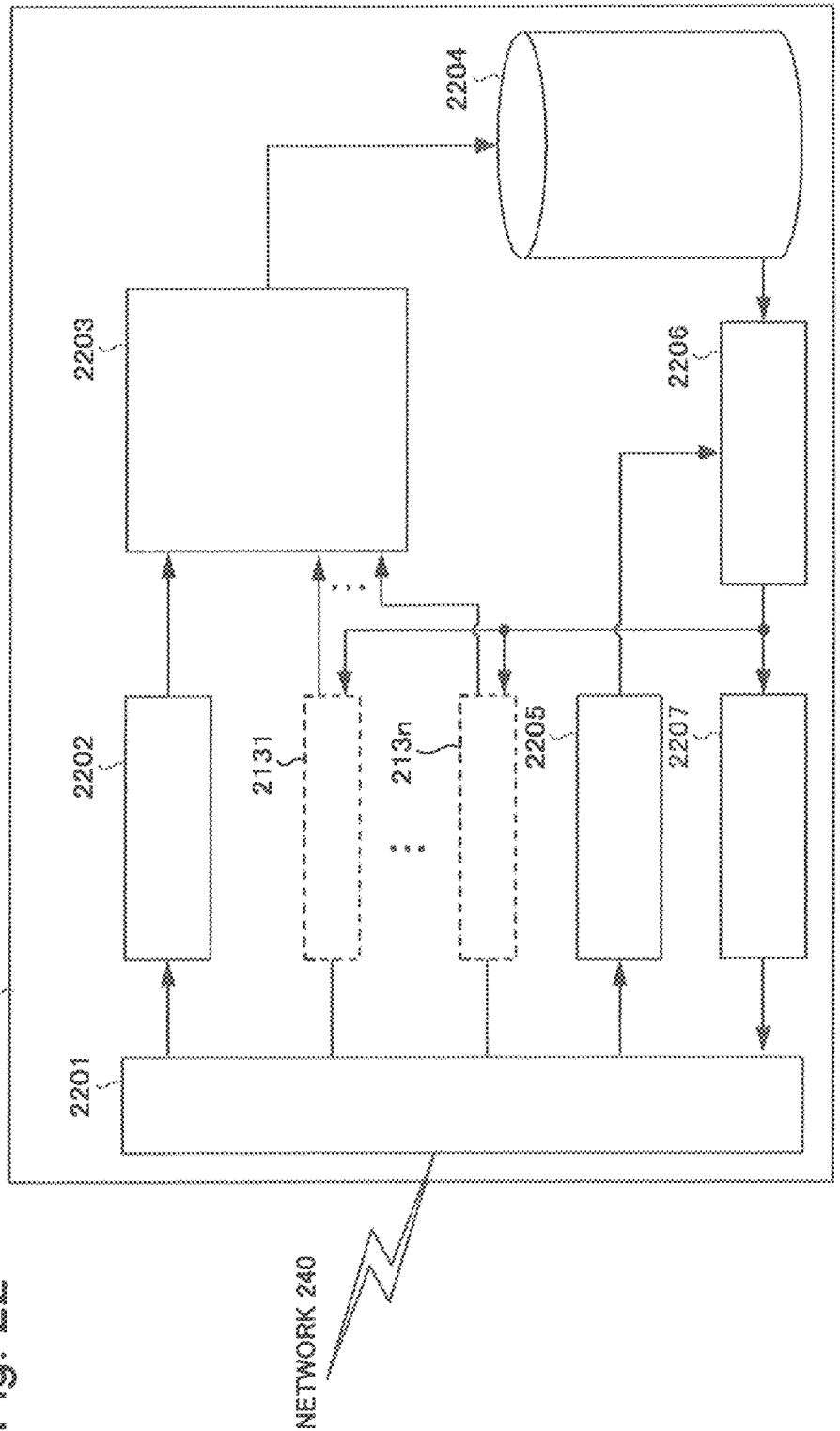
FIG. 22 is a block diagram illustrating a functional configuration of a cloud server according to the fourth example embodiment of the present invention.

FIG. 22 is a block diagram illustrating a functional configuration of the cloud server 2130 according to the fourth example embodiment.

The cloud server 2130 includes a communication control unit 2201, a parameter reception unit 2202, one or more virtual PCs 2131 to 243n, a connection-environment-and-condition-based setting parameter accumulation unit 2203, and a system parameter database 2204. Further, the cloud server 2130 includes a parameter request reception unit 2205, a parameter selection unit 2206, and a parameter transmission unit 2207.

The communication control unit 2201 controls communication with the host 230 and the communication terminals 221 to 223 through the network 240. The parameter reception unit 2202 receives a setting parameter associated with a connection environment at device input and output and a condition, from the host 230 and the communication terminals 221 to 223.

The connection-environment-and-condition-based setting parameter accumulation unit 2203 accumulates, in an organized manner, a setting parameter associated with a connection environment and a condition received from the external host 230 and communication terminals 221 to 223, and a setting parameter associated with a connection environment and a condition acquired from the virtual PCs 2131 to 213n. The system parameter database 2204 stores, in a searchable manner, data accumulated by the connection-environment-and-condition-based setting parameter accumulation unit 2203, including an evaluation value.

The parameter request reception unit 2205 receives a request for a setting parameter from the external host 230 and communication terminals 221 to 223. The parameter selection unit 2206 selects and acquires a proper setting parameter from the system parameter database 2204 in accordance with a condition of a request received by the parameter request reception unit 2205. The parameter transmission unit 2207 transmits an acquired proper setting parameter to the external host 230 and communication terminals 221 to 223. When a request is received from the virtual PCs 2131 to 213n, a proper setting parameter is set to the virtual PCs 2131 to 313n.

(System Parameter Database)

Figure 23:
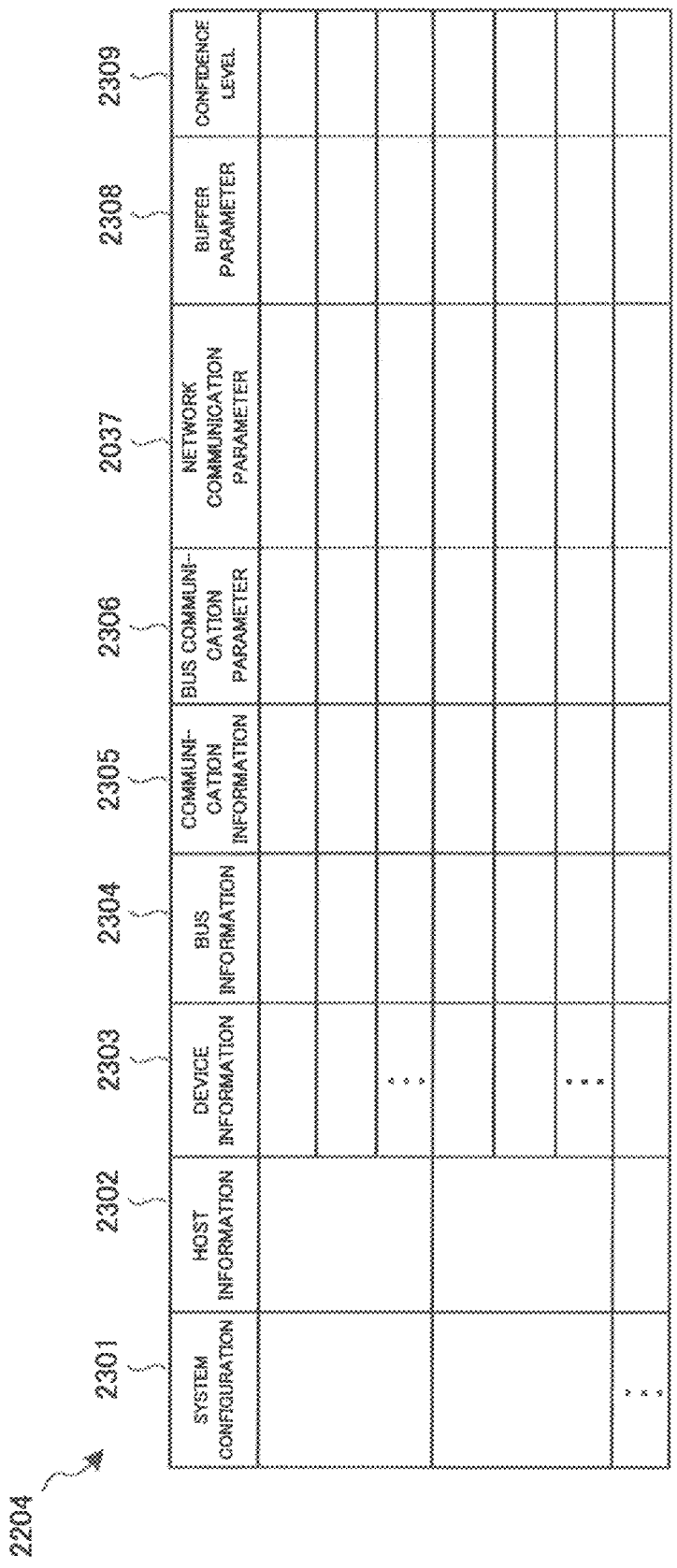
FIG. 23 is a diagram illustrating a configuration of a system parameter database according to the fourth example embodiment of the present invention.

FIG. 23 is a diagram illustrating a structure of the system parameter database 2204 according to the fourth example embodiment. The system parameter database 2204 is used for accumulating a setting parameter including a confidence level thereof in a device being remotely connected through the network, and providing a proper setting parameter at subsequent setting.

The system parameter database 2204 accumulates the following data in association with a system configuration 2301 of the information processing system and host information 2302 about the host computer including the virtual PC. The system parameter database 2204 stores each piece of device information 2303, bus information 2304, communication information 2305, used bus communication parameter 2306, a network communication parameter 2307 including a communication band, a buffer parameter 2308 including a FIFO capacity, and a confidence level 2309 of device input and output. Searching and sorting are performed based on one or more conditions, and the result is output in descending order of reliability.

<<Hardware Configuration of Cloud Server>>

Figure 24:
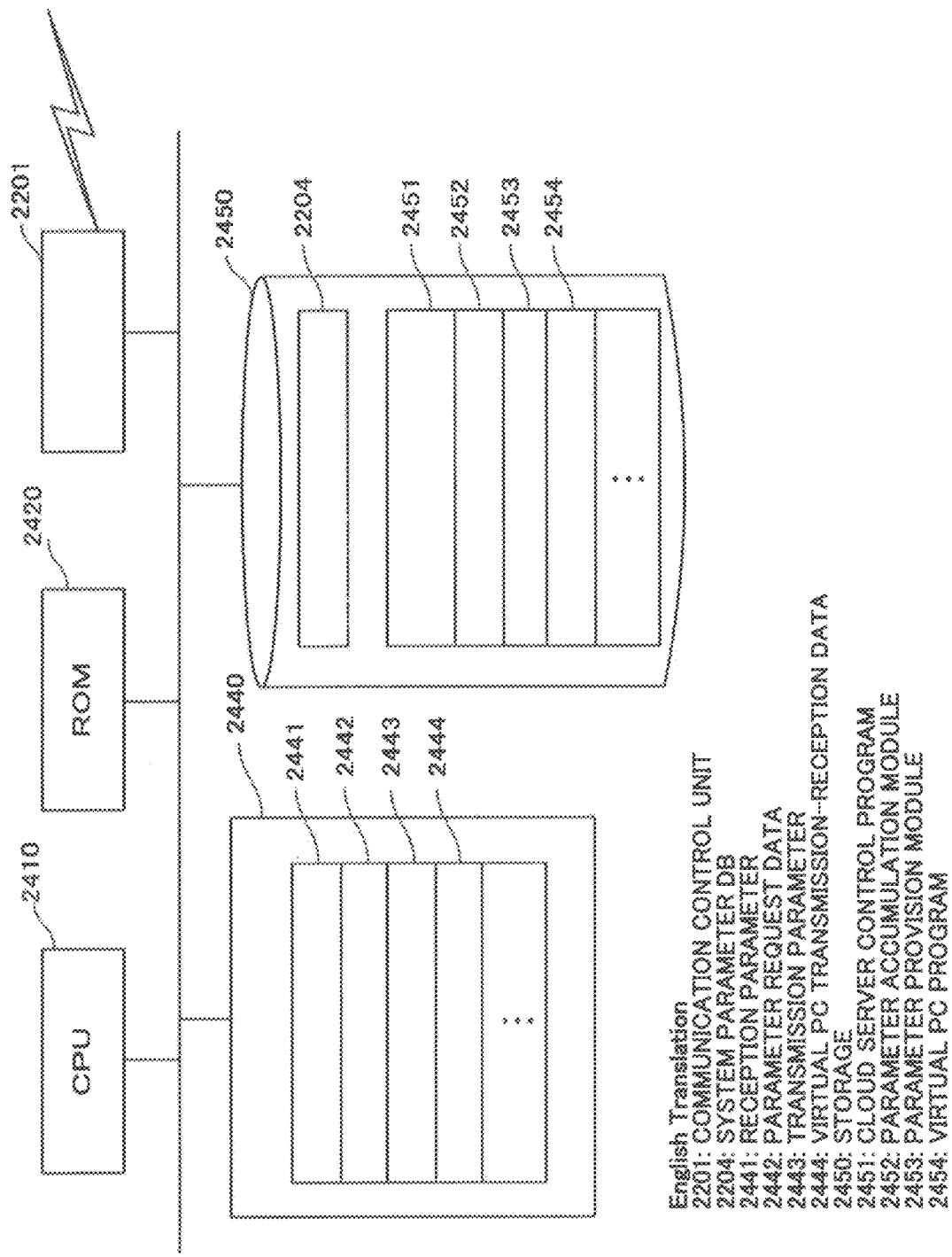
FIG. 24 is a block diagram illustrating a hardware configuration of the cloud server according to the fourth example embodiment of the present invention.

FIG. 24 is a block diagram illustrating a hardware configuration of the cloud server 2130 according to the fourth example embodiment.

In FIG. 24, a CPU 2410 is a processor for arithmetic control, and provides the functional components in the cloud server 2130 in FIG. 22 by executing a program. A ROM 2420 stores initial data, fixed data for a program and the like, and a program. Further, the communication control unit 2201 communicates with the host 230 and a communication terminal 220 through the network 240. The CPU 2410 is not limited to a single CPU, and may include a plurality of CPUs or a GPU for image processing. Further, it is desirable that the communication control unit 2201 include a CPU independent of the CPU 2410, and write or read transmitted and received data into or front a RAM 2440 area. Further, it is desirable that a DMAC (unillustrated) transferring data between the RAM 2440 and a storage 2450 be provided. Accordingly, the CPU 2410 processes data, recognizing that data are received by or transferred to the RAM 2440. Further, the CPU 2410 prepares the processing result in the RAM 2440 and delegates subsequent transmission or transfer to the communication control unit 2201 or the DMAC.

The RAM 2440 is a random access memory used by the CPU 2410 as a work area for temporary storage. An area for storing data required for providing the fourth example embodiment is secured in the RAM 2440. A reception parameter 2441 is a parameter received from the external host 230 and communication terminals 221 to 223, or acquired from the virtual PCs 2131 to 213n. Parameter request data 2442 are data indicating a condition of device input and output sharing a setting parameter. A transmission parameter 2443 is a parameter transmitted to the external host 230 and communication terminals 221 to 223, or set to the virtual PCs 2131 to 213n. Virtual PC transmission-reception data 2444 are data transmitted and received to and from the virtual PC formed in the cloud server 2130.

The storage 2450 stores a database, various varieties of parameters, or the following data or program required for providing the fourth example embodiment. The system parameter database 2204 accumulates setting parameters as indicated in FIG. 23 in a searchable and sortable manner.

The storage 2450 stores the following programs. A cloud server control program 2451 is a program controlling the entire cloud server 2130. A parameter accumulation module 2452 is a module receiving a parameter from the external host 230 and communication terminals 221 to 223, acquiring a parameter from the virtual PCs 2131 to 213n, and accumulating the parameters into the system parameter database 2204. A parameter provision module 2453 is a module searching for and sorting a proper parameter accumulated in the system parameter database 2204, transmitting the parameter to the external host 230 and communication terminals 221 to 223, and setting the parameter to the virtual PCs 2131 to 213n. A virtual PC program 2454 is a program for forming the virtual PCs 2131 to 213n in the cloud server 2130.

Note that a program and data related to a general-purpose function and another performable function, being implemented on the cloud server 2130, are not illustrated in the RAM 2440 and the storage 2450 in FIG. 24.

Operation Procedure of Cloud Server

Figure 25:
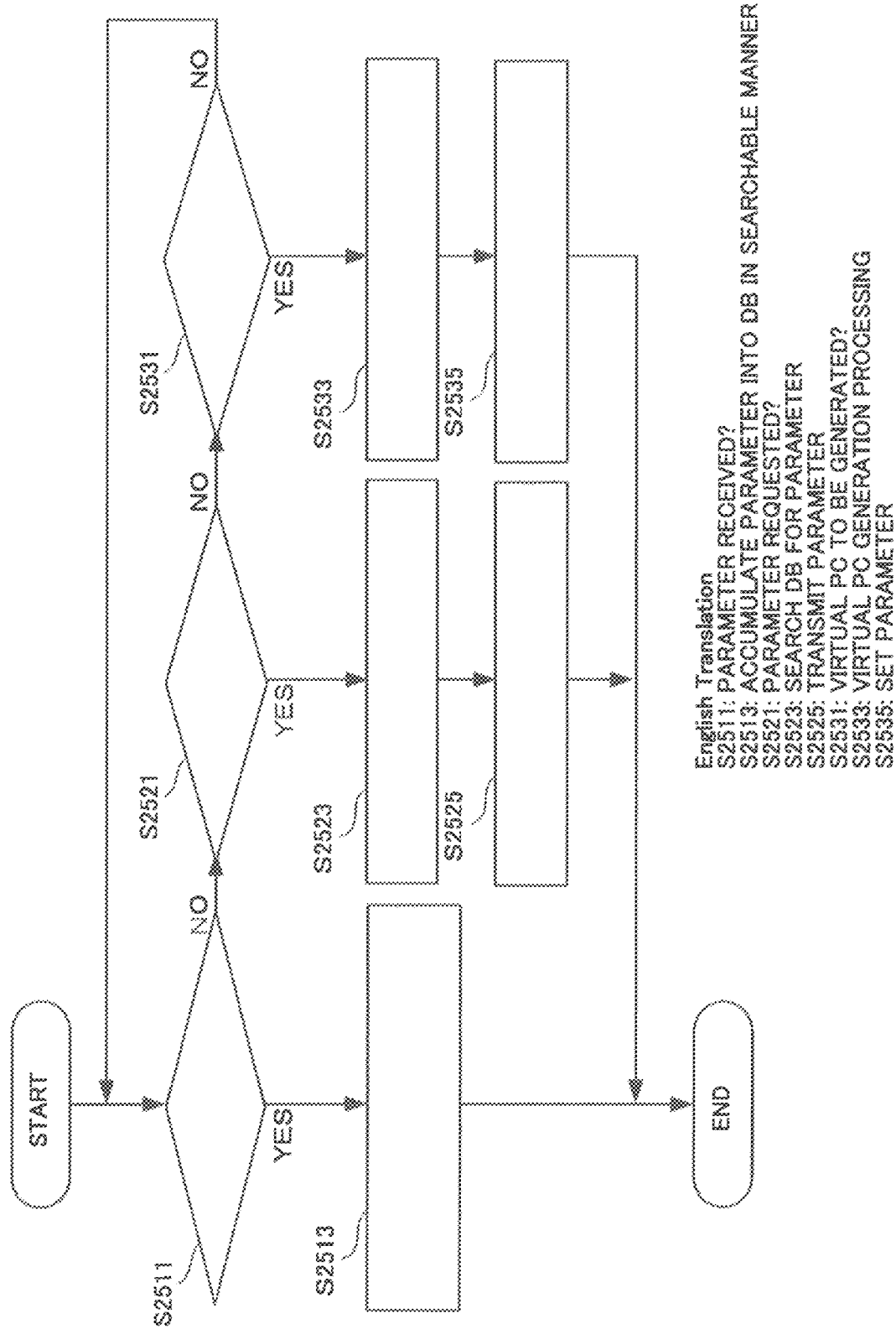
FIG. 25 is a flowchart illustrating an operation procedure of the cloud server according to the fourth example embodiment of the present invention.

FIG. 25 is a flowchart illustrating an operation procedure of the cloud server 2130 according to the fourth example embodiment. The CPU 2410 in FIG. 24 executes the flowchart using the RAM 2440 to provide the functional components in FIG. 22.

In Step S2511, the cloud server 2130 determines whether or not a setting parameter is received. When a setting parameter is received, in Step S2513, the cloud server 2130 accumulates the received setting parameter into the system parameter database 2204 in a searchable and sortable manner.

When a setting parameter is not received, in Step S2521, the cloud server 2130 determines whether or not a setting parameter is requested. When a setting parameter is requested, in Step S2523, the cloud server 2130 refers to a device connection condition in the system parameter database 2204 to search for and sort the setting parameter. Then, in Step S2525, the cloud server 2130 transmits the acquired setting parameter.

When a setting parameter is not received or requested, in Step S2531, the cloud server 2130 determines whether or not a virtual PC is to be generated. When a virtual PC is to be generated, in Step S2533, the cloud server 2130 performs generation processing of a virtual PC. Then, in Step S2535, the cloud server 2130 sets a setting parameter acquired from the system parameter database 2204 by referring to a device connection condition.

The fourth example embodiment is able to set a proper FIFO capacity and a proper communication band based on accumulated knowledge, in a combination of a device, a device connection bus mode, a communication mode, and the like.

Fifth Example Embodiment

Next, an information processing system according to a fifth example embodiment of the present invention will be described. The information processing system according to the fifth example embodiment differs from the aforementioned second to fourth example embodiments in that different varieties of data are communicated between an information processing device 230 (virtual PC) and a communication terminal 220 connected to a device. That is to say, according to the fifth example embodiment, an application IF in the information processing device 230 and a host controller IF in the communication terminal 220 are separated at parts different from the second example embodiment. For example, when an entire device driver including a host controller chip (HC) is provided by software, a set of a host controller driver and a host controller chip in particular is separated in various layers in consideration of communication efficiency and a communication rate. Then, information between separated layers is designed to be communicated through a network between the information processing device 230 and the communication terminal 220. The remaining configuration and operation are similar to the second to fourth example embodiments, and therefore a same configuration and a same operation are respectively given same reference signs, and detailed description thereof is omitted.

(Data Transmission Example)

FIG. 26 is a diagram illustrating data transmission in the information processing system according to the fifth example embodiment. FIG. 26 is a diagram illustrating a descriptor acquisition procedure of a USB connected USB device, similarly to FIG. 2G. Accordingly, in FIG. 26, a same reference sign is given to a component similar to a component in FIG. 2G, and description thereof is omitted.

A descriptor set to a device 210 is acquired by a USB request such as GET DESCRIPTOR. A frame including a USB protocol of a USB request being a control transfer is exchanged between the information processing device 230 and the device 210. Each control transfer is composed of a setup stage, a data stage, and a status stage. Each stage is composed of a token packet, a data packet, and a handshake packet. A descriptor is acquired in a data packet in each data stage. A descriptor acquired from the device 210 is inserted into a frame IP encapsulated by an IP header and a TCP header, and is transmitted from the communication terminal 220 to the information processing device 230.

In response to a device input-output request by an application 231, an application interface 2632 in the information processing device 230 first generates a frame including a USB protocol of a USB request GET DESCRIPTOR and passes the frame to a communication control unit 401, in order to check a connected device.

The frame including the USB request GET DESCRIPTOR IP encapsulated by an IP header and a TCP header is received and IP decapsulated by a communication control unit 501 in the communication terminal 220. The USB request GET DESCRIPTOR is passed to a host controller interface 2625. The host controller interface 2625 instructs a USB bus interface 226 (unillustrated) to transfer each packet to the device 210 over a USB bus, based on the frame including the USB protocol of the USB request GET DESCRIPTOR.

The host controller interface 2625 passes a frame including, as a device descriptor 2663, a data packet received from the device 210 in a data stage to the communication control unit 501. The frame including the device descriptor 2663 IP encapsulated by an IP header and a TCP header is transmitted from the communication control unit 501 in the communication terminal 220 to the communication control unit 401 in the information processing device 230.

When the communication control unit 401 in the information processing device passes a frame including the decapsulated device descriptor 2663 to the application interface 2632, the application interface 2632 makes notification of connected device information in response to the device input-output request by the application 231.

Similar data transmission is subsequently performed in another control transfer, a bulk transfer, an interrupt transfer, and an isochronous transfer. The host controller interface 2625 and the USB bus interface 226 may be integrated into one piece of software.

FIG. 27 is a diagram illustrating another varieties of data transmission in the information processing system according to the fifth example embodiment. FIG. 27 is a diagram illustrating a descriptor acquisition procedure of a USB device connected by USB, similarly to FIGS. 2G and 26. Accordingly, in FIG. 27, a same reference sign is given to a component similar to a component in FIGS. 2G and 26, and description thereof is omitted.

A descriptor set to a device 210 is acquired by a USB request such as GET DESCRIPTOR. A control transfer including a USB protocol of a USB request is composed of a setup stage, a data stage, and a status stage. Each stage is composed of a token packet, a data packet, and a handshake packet. Each of a setup stage including a USB protocol of a USB request being a control transfer, a data stage, and a status stage is exchanged between an information processing device 230 and the device 210. A descriptor is acquired in a data packet in each data stage. A descriptor acquired from the device 210 is inserted into a data stage IP encapsulated by an IP header and a TCP header, and is transmitted from a mobile terminal 220 to the information processing device 230.

In response to a device input-output request by an application 231, an application interface 2732 in the information processing device 230 first generates a setup stage including a USB protocol of a USB request GET DESCRIPTOR and passes the setup stage to a communication control unit 401, in order to check a connected device.

The setup stage including the USB request GET DESCRIPTOR IP encapsulated by an IP header and a TCP header is received and IP decapsulated by a communication control unit 501 in the communication terminal 220. The USB request GET DESCRIPTOR is passed to a host controller interface 2725. The host controller interface 2725 instructs a USB bus interface 226 (unillustrated) to transfer each packet to the device 210 over a USB bus, based on the setup stage including the USB protocol, of the USB request GET DESCRIPTOR.

The host controller interface 2725 passes a data stage including, as a device descriptor 2763, a data packet received from the device 210 in the data stage to the communication control unit 501. The data stage including the device descriptor 2763 IP encapsulated by an IP header and a TCP header is transmitted from the communication control unit 501 in the communication terminal 220 to the communication control unit 401 in the information processing device 230.

When the communication control unit 401 in the information processing device passes the data stage including the decapsulated device descriptor 2763 to the application interface 2732, the application interface 2732 makes notification of connected device information in response to the device input-output request by the application 231.

Further, the host controller interface 2725 passes a status stage including, as status data 2764, a data packet received from the device 210 in die status stage to the communication control unit 501. The status stage including the stains data 2764 IP encapsulated by an IP header and a TCP header is transmitted from the communication control unit 501 in the communication terminal 220 to the communication control unit 401 in the information processing device 230.

When the communication control unit 401 in the information processing device passes the status stage including the decapsulated status data 2764 to the application interface 2732, the application interface 2732 makes notification of connected device information in response to the device input-output request by the application 231.

While the application interface 2732 does not make a determination of a handshake packet in the description above, the application interface 2732 may be configured to check a handshake packet in each stage.

Similar data transmission is subsequently performed in another control transfer; a bulk transfer, an interrupt transfer, and an isochronous transfer. The host controller interface 2725 and the USB bus interface 226 may be integrated into one piece of software.

Whether communication between an information processing device (virtual PC) and a communication terminal is communication separating the own drivers on a frame-by-frame basis or on a stage-by-stage basis, the fifth example embodiment enables a USB device connected to a remote communication terminal to be operated in a same manner as a USB device directly connected to an information processing device.

Other Example Embodiments

While examples of device connection by USB and HDMI® according to the aforementioned example embodiments have been described, another varieties of connection such as SCSI provides a similar effect. Additionally, the aforementioned example embodiments may be applied to a case that a device is connected by short-distance wireless communication such as infrared communication, WiFi, and Bluetooth®, providing a similar effect.

Further, while the present invention has been described with reference to the example embodiments, the present invention is not limited to the aforementioned example embodiments. Various changes and modifications that can be understood by a person skilled in the art may be made to the configurations and details of the present invention, within the scope of the present invention. Further, a system or a device in which different features included in the respective example embodiments are appropriately combined is also included in the scope of the present invention.

Further, the present invention may be applied to a system composed of a plurality of pieces of equipment or a single device. Additionally, the present invention is applicable when an information processing program providing a function according to the example embodiments is supplied to a system or a device directly or remotely. Accordingly, a program installed on a computer for providing a function of the present invention by the computer, a medium storing the program, and a World Wide Web (WWW) server for downloading the program are also included in the scope of the present invention. At least a non-transitory computer readable medium storing a program that causes a computer to perform processing steps included in the aforementioned example embodiments, in particular, is included in the scope of the present invention.

This application is related to Japanese Patent Applications (Japanese Patent Application No. 2014-235108, Japanese Patent Application No. 2014-235110, and Japanese Patent Application No. 2014-235111) filed on the same day, the disclosure of which is hereby incorporated by reference thereto in its entirety.

This application claims priority based on Japanese Patent Application No. 2014-235109 filed on Nov. 19, 2014, the disclosure of which is hereby incorporated by reference thereto in its entirety.

The invention claimed is:

1. An information processing system comprising:
a device;
a device controller that controls the device;
a device interface that interfaces with the device controller; and
an information processing device that comprises:
one or more memories storing instructions; and
one or more processors connected to the one or more memories, configured to include an application and an application interface that interfaces with the application, and configured to execute the instructions to:
establish, when being connected to the application interface and the device interface, a control channel and a data channel between the application and the device; and
suppress occurrence of an error caused by a data transfer through the established channel between the application and the device by adjusting data traffic in the data channel.

2. The information processing system according to claim 1, wherein the one or more processors are further configured to:
secure a buffer arranged so as to prevent occurrence of an overflow or an underflow in the data transfer between the device interface and the device controller.

3. The information processing system according to claim 1, wherein the one or more processors are further configured to:
inform occurrence of the error caused by the data transfer;
receive a suppression instruction to suppress occurrence of an error; and
suppress occurrence of the error in accordance with the suppression instruction.

4. The information processing system according to claim 1, wherein the one or more processors are further configured to:
test the data transfer through the data channel; and
suppress occurrence of the error using a test result.

5. The information processing system according to claim 1, wherein the one or more processors are further configured to:
accumulate a parameter set in order to suppress the error; and
set the parameter in order to suppress the error, when the channel is established.

6. The information processing system according to claim 1, wherein
the device controller controls a device connected through at least one of USB, HDMI®, SCSI, a SD card connector, and short-distance communication.

7. The information processing system according to claim 1, further comprising:
a communicator that transfers data in a layer proper for device control selected from a plurality of layers.

8. An information processing method comprising:
activating a device interface that interfaces with a device controller that controls a device in a communication terminal;
activating an application interface that interfaces with an application in an information processing device;
connecting the application interface in the information processing device to the device interface in the communication terminal through a communicator and establishing a control channel and a data channel between the application and the device; and
suppressing occurrence of an error caused by a data transfer through the established data channel between the applications and the device by adjusting data traffic in the data channel.

9. An information processing device comprising:
one or more memories storing instructions; and
one or more processors connected to the one or more memories, configured to include an application and an application interface that interfaces with the application, and configured to execute the instructions to:
connect through a communicator, the application interface to a device interface that interfaces with a device controller that controls a device, and establishes a control channel and a data channel between the application and the device; and
suppress occurrence of an error caused by a data transfer through the established data channel between the application and the device by adjusting data traffic in the data channel.

10. The information processing device according to claim 9, wherein the one or more processors are configured to:
test a data transfer through the data channel; and
suppress occurrence of the error using a test result.

* * * * *